United States Patent [19]

White et al.

[11] 3,970,830

[45] July 20, 1976

[54] COMPUTER CONTROLLED MACHINE TOOL CONTOURING SYSTEM

[75] Inventors: Philip H. White; Bernard W. Wilterdink, both of Claremont; Guy J. Andrews, Londonderry, all of N.H.

[73] Assignee: Cone-Blanchard Machine Company, Windsor, Vt.

[22] Filed: June 24, 1974

[21] Appl. No.: 482,782

[52] U.S. Cl. .................. 235/151.11; 51/165.71; 444/1; 91/361; 318/567
[51] Int. Cl.² .................. B24B 17/10; B24B 19/08; G06F 15/46
[58] Field of Search .................. 51/165.71, DIG. 32, 51/165 TP; 235/151.11

[56] References Cited
UNITED STATES PATENTS 3,123,657  3/1964  Clark, Jr. et al. ........... 235/151.11 X
3,816,996  6/1974  Uhtenwoldt .................. 51/DIG. 32

OTHER PUBLICATIONS

*Century–Detroit High–performance Grinding Machines* – Babcock & Wilcox pamphlet, 5-1972.
Gleason No. 808 *Trochoid Generating Grinder – Gleason works*, Rochester, N.Y., Form No. SD2212, 11-1972.

*Primary Examiner*—Eugene G. Botz
*Attorney, Agent, or Firm*—Kenway & Jenney

[57] ABSTRACT

A computer controlled machine tool contouring system having a cutting element which is positioned relative to a workpiece support table. An actuating means controls the workpiece support table to synchronously rotate about a first axis and slide along a second axis in response to a set of control signals. The actuating means further controls the cutting element to translate along a third axis (the third axis being parallel to the first axis and perpendicular to the second axis) in response to a further set of control signals. The control signals are generated by a control means from stored data signals which are representative of the coordinates of points on the desired workpiece contour, the desired pressure angle of the cutting element at each contour point, the current radius of the cutting element, and the desired cutting element motion along the third axis. The control means includes (1) a minicomputer programmed to establish overall system control and to transform input data signals to suitable form for subsequent processing, (2) a high speed computation network for generating digital control signals for driving the actuating means, and (3) an interface unit for transferring digital control signals between the computer, computation network, machine tool and an operator station. The signal processing performed by the mini-computer and the computation network is arranged in accordance with a programmed algorithm to provide control signals for directing the actuating means to position the workpiece support table and cutting element in a manner to accommodate a cutting element having a changing radius due to wear. In addition, the control signals produce (in accordance with the programmed algorithm) directed movement of the contact point of the cutting element relative to a point on the workpiece contour at a predetermined surface velocity and feedrate.

54 Claims, 23 Drawing Figures

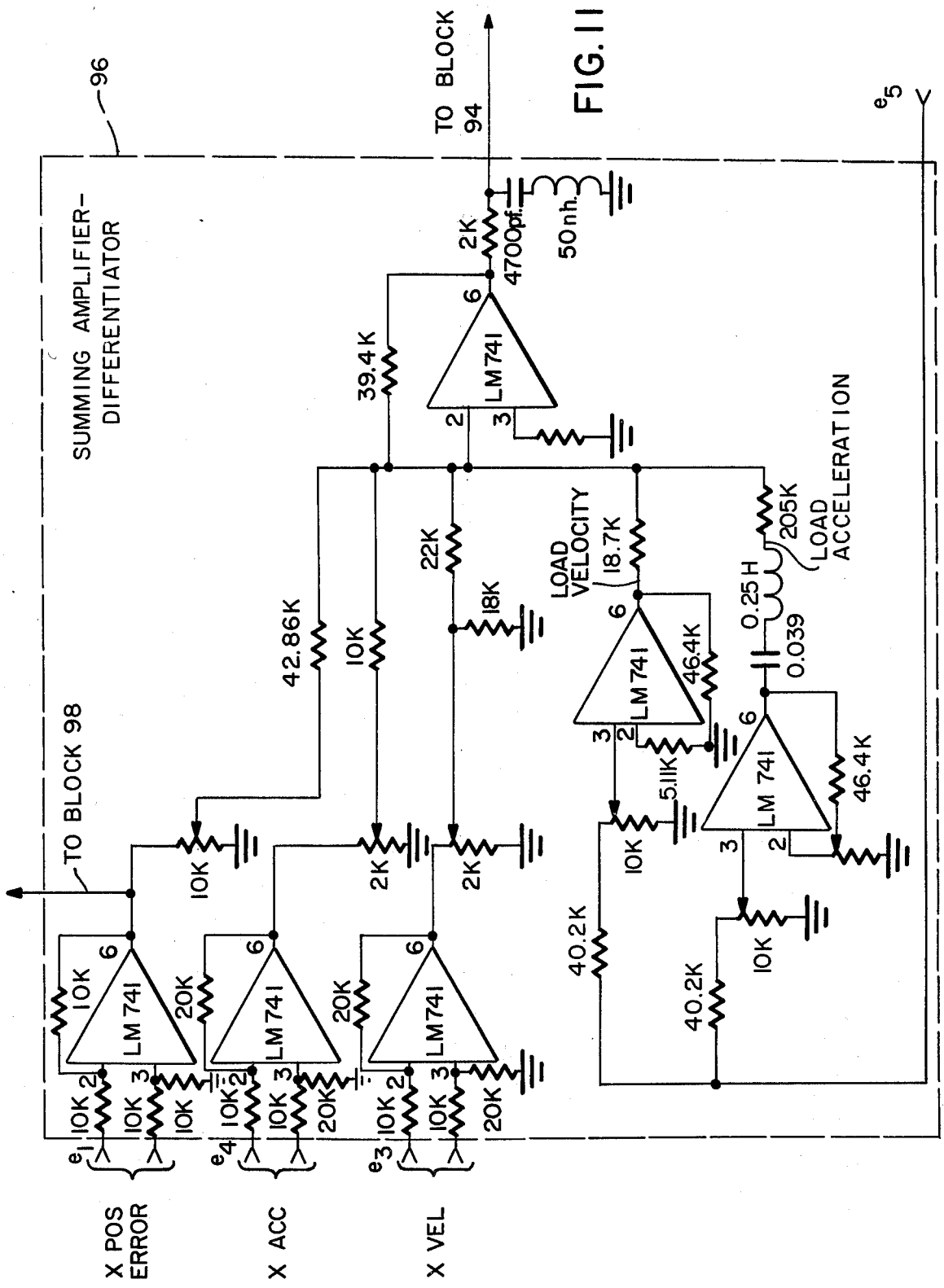

COMPUTER CONTROLLED MACHINE TOOL CONTOURING SYSTEM

BACKGROUND OF THE INVENTION

This invention relates to machine tools and, more particularly, to computer controlled machine tool contouring systems.

The use of digital computers to direct and control machine tools in the production of non-round contours is well known in the art, particularly for machine tools utilizing a generally cylindrical cutting element and wherein the workpiece support table is positioned in relation to the cutting element in response to computer generated control signals. Non-round contours which may be produced by such contouring systems particularly include the interior surfaces of rotary engine chambers (e.g. the epitrochoid-shaped contours of Wankel engine chambers), and also the inner and outer surface of various cams. The end uses for such contoured workpieces often require precision of contour within 0.001 inches. To obtain contours with this precision, the control portion of the contouring system must accommodate continuing wear of the cutting element. In addition, the relative velocity of the point of contact of the grinding wheel with respect to the work surface must be substantially constant.

Generally, contouring systems for non-round contour generation use a complex cam-following apparatus for guiding the cutting element against the workpiece. In such systems, the cam-following apparatus provides a controlled movement of the workpiece relative to the cutting element along a suitable path to accommodate changes in radius of the grinding tool and the desired feedrate. However, in the grinding of complex non-round contours, it is difficult and correspondingly expensive to produce a mechanism (such as a tapered cam follower) for achieving the desired cutting element wear compensation. Further, in view of the substantial dynamic forces on the tracking and drive cams during high speed grinding operations, such contouring systems are subject to severe grinding speed limitations resulting from the deleterious effects of those forces on the cam surfaces. Further, although the cam-following contouring systems often do provide for a nominally constant surface velocity of the workpiece with reference to the contour of the cutting element by providing a separate surface velocity control cam, the surface velocity may vary substantially from the nominal value. Consequently, localized regions of heating occur on the workpiece during low speed portions of the cutting cycle and result in damage to the workpiece surface. In addition, the localized heating causes thermal expansion of the workpiece which must be compensated for in the generation of the cam tracks in order to provide precision contouring. It will be noted that the latter effect is difficult to effectively offset for complex non-round contours.

A further limitation on cam-following contouring systems is the relative inflexibility of such systems in that only a specific contour (designed into the system by the cam) may be produced without requiring system modification.

It is further known in the art to utilize digital computers for the control of machine tools wherein the computer generates control signals for directing the relative movement of the cutting element with respect to the workpiece so that the central axis of the cutting element is positioned to pass through a predetermined series of spatial points. The computer in such systems may be used to first calculate the coordinates of these predetermined spatial points in a manner accommodating a current radius of the cutting element, a required offset for achieving a desired feedrate, and a desired surface velocity, and then to generate appropriate signals to the associated positioning systems. However, the workpiece positioning systems are generally limited in the speed to which they can respond to the computer generated control signals. The limitation restrains this type of contouring system to surface velocities of less than 20 feet per minute or rotational velocities of less than 10 RPM.

SUMMARY OF THE INVENTION

Accordingly, it is an object of this invention to provide a computer controlled, high speed machine tool contouring system for producing a workpiece contour passing through a sequence of predetermined points on the workpiece.

A further object is to provide a computer controlled high speed, machine tool contouring system having a cutting element which is positioned relative to a workpiece support table where the workpiece table synchronously rotates and slides in response to computer generated control signals.

Another object is to provide a computer controlled, high speed machine tool contouring system which controls the movement of the contact point of the cutting element relative to a point on the workpiece contour at a predetermined surface velocity.

The computer controlled, high speed machine tool contouring system of the present invention includes a fast response actuating means for controlling the position of the workpiece in relation to the cutting element in response to a series of signals generated by a control means. In this manner, the cutting element may be controlled to have a point of contact with and be tangent to the workpiece on a contour defined by line segments connecting a series of predetermined spatial points.

More particularly, the actuating means includes a plurality of servo controlled positioning systems which are directed by the control means to synchronously drive a workpiece support table in a rotational motion about a first or C axis (C axis servo system) and in a translational motion along a second or X axis (X axis servo system), and further drive a cutting element in a translational motion along a third or Z axis (Z axis servo system). The X axis is perpendicular to both the C and Z axes. A fourth or P axis, parallel to the X axis, may further be provided along which a dressing means for the cutting element may travel.

The actuating means includes means for generating signals which are representative of the angular position of the support table about the C axis, the transverse position of the support table along the X axis, the velocity of the support table along the X axis, the vertical position of the cutting element along the Z axis, and the transverse position of the dressing element along the P axis. As input driving signals, the X axis servo system requires an X position error signal, and X acceleration signal, and an X velocity signal. The rotational or C axis servo system requires an angular velocity error signal.

The control means comprises a programmed minicomputer for establishing overall system control in response to an externally generated sequence of process instructions and workpiece description data (defining the desired workpiece contour). The mini-computer includes means for transforming the workpiece description data to an intermediate form for subsequent processing. The control means further comprises a high speed computation network for generating digital control signals for driving the servo positioning systems for the several axes. The control means still further comprises an interface unit for converting the X, C and Z axis signals to analog form, and for transferring those and other control signals between the computer and computation network and the servo systems and an operator station.

The desired workpiece contour is defined for the control means by input data in polar coordinate form. These input data together with a data signal representative of a desired surface velocity, are transformed by the control means to axes control data for subsequent use in generating servo drive signals for the X and C axis servo systems. In determining these control signals for the servo systems, the control means also utilizes a stored value representative of the current radius of the cutting element. This value is obtained during wheel dressing operations which are automatically performed under the control of the control means.

In accomplishing the positional control of the workpiece support table, the control means in effect directs the cutting element to start toward a next desired workpiece contour point from a current point. To do so, the control means first compares the actual cutting element relative position to a calculated desired cutting element relative position at uniformly spaced interrogation times. At each interrogation time, the control means then determines appropriate workpiece angular and translational control signals for application to the C and X axis servo amplifiers, respectively, during the next interrogation interval. These control signals are generated based on the relationship of the "then current" position and a corresponding point on the desired workpiece contour, and, further, on the desired surface velocity and feedrate for the machine operation. By this comparison process, the control means determines appropriate control signals which direct the corresponding positional changes of the cutting elements during each interrogation interval in order to achieve the desired surface velocity and workpiece contour.

Thus, the control means provides control signals on a real time basis for positioning the workpiece relative to the cutting element in a manner to substantially minimize the positional errors between the actual cutting element relative path and the cutting element relative path as defined by a predetermined set of desired workpiece contour points.

Briefly, in operation, the operator initially enters two sets of input data signals in the computer memory. These two sets include a process description and a part description for the workpiece. The first set, the process description, may describe the steps to be performed under the direction of the control means and includes data representative of the desired surface velocity, desired feedrate, and desired cutting element motion along the Z axis (e.g. an oscillatory motion between predetermined limits, at a predetermined rate). The second set, the part description, may provide a sequence of data words representative of the desired contour points and pressure angles associated therewith for the finished contour.

As the next step in operation, the operator controls the relative position of the cutting element with respect to a cutting element dressing means in order to dress the cutting element to a diameter lying within a predetermined range, thereby establishing an initial cutting element radius. Using this radius, the computer then transforms the polar coordinate data associated with the desired contour (as previously entered by the part description) together with the surface velocity data (as previously entered by the process description) to a corresponding set of axis control data. From blocks of desired contour point data in the part description (each block defining a single contour point), a table of axis control data is generated. Following the operator-directed dressing operation and axis control data transformation, the operator directs the control means to enter an automatic cycle mode and to subsequently perform the instructions in the process description repeatedly until commanded to stop.

It will be understood that the process description may include instructions for directing the automatic re-dressing of the cutting element to a new "current" radius which is a predetermined increment less than the previous "current" radius. During the re-dressing operation, the computer determines a new set of axis control data in the same manner as noted above except that the new "current" cutting element radius is used. Thereafter the computer directs machining operations with the remaining process description instructions. In this manner, the effects of cutting element wear are substantially reduced.

In order to generate the appropriate X axis positioning control signals, the control means in effect interrogates the machine tool at uniformly spaced interrogation times to determine a set of values corresponding to the actual rotational position and translational position of the support table with respect to the various axes. In association with each interrogation interval (i.e. between successive interrogations), the control means determines an estimate of the actual rotational position of the support table to be achieved by the end of the "current" interrogation interval. The control means further performs an interpolation algorithm in order to determine a set of values corresponding to desired translational position, velocity and acceleration for the current interval based on the estimated rotational position. In addition, the control means compares the "current" actual translational position value with the desired translational position value from the immediately preceding interval, and utilizes the resultant difference value to generate an X position error signal. The X position error, X velocity and X acceleration signals are applied to the X axis servo amplifiers during the next interval. This operation is performed during each successive interrogation interval.

In this manner, the control means may generate corrective positioning signals to the servo system at interrogation intervals smaller than 500 microseconds. By basing these corrective signals on the actual workpiece support table position and through the utilization of high response servo systems, the surface velocity of the cutting element may be accurately controlled at surface velocities as high as 120 feet per minute. Further, a contouring system in accordance with the present invention provides an inherent flexibility in that any desired shape (except as limited by servo system response and the cutting element radius) may be produced by substituting an appropriate set of defining coordinates in the part description set of input data.

BRIEF DESCRIPTION OF THE DRAWINGS

The foregoing and other objects of this invention, the various features thereof, as well as the invention itself, may be more fully understood from the following description, when read together with the accompanying drawings, in which:

FIG. 11 shows in schematic form an alternative configuration for the circuit of FIG. 7;

DESCRIPTION OF THE PREFERRED EMBODIMENT

The following sections describe an embodiment of a computer controlled contouring system wherein a single computer may control as many as six asynchronous machine tools, with each tool being capable of producing a different desired contour on an associated workpiece. It will be understood that this exemplary system is illustrative of a system embodying the present invention but is not to be considered as a limitation thereof.

For example, the particular configuration of the machine tool, the specific configuration of the actuating means and elements thereof, and the sequence and content of the computer programs may all be reconfigured of differing elements and in differing formats to provide the functional relationships in keeping with the present invention.

Table I provides a summary in outline form of the following sections which describe the preferred embodiment.

Table I

I Description of System
II Description of System Operation
III Detailed Description of System
  A. Machine Tool
    1. Actuating Means
      a. X Axis Servo System
      b. C Axis Servo System
      c. Z Axis Servo System
      d. P Axis Servo System
  B. Control Means
    1. Computer
      a. Executive Program
      b. Part Program Loader Sub-program
      c. $\gamma$-C-V Table Generator Sub-program
      d. Manual Data Input Sub-program
      e. Axis Motion Control Sub-program
      f. Discrete Processor Sub-program
      g. Part Program Executer Sub-program
    2. Computation Network
  C. Operator Station
  D. Programming Station
  E. Part Program

I DESCRIPTION OF THE SYSTEM

Figure 1:
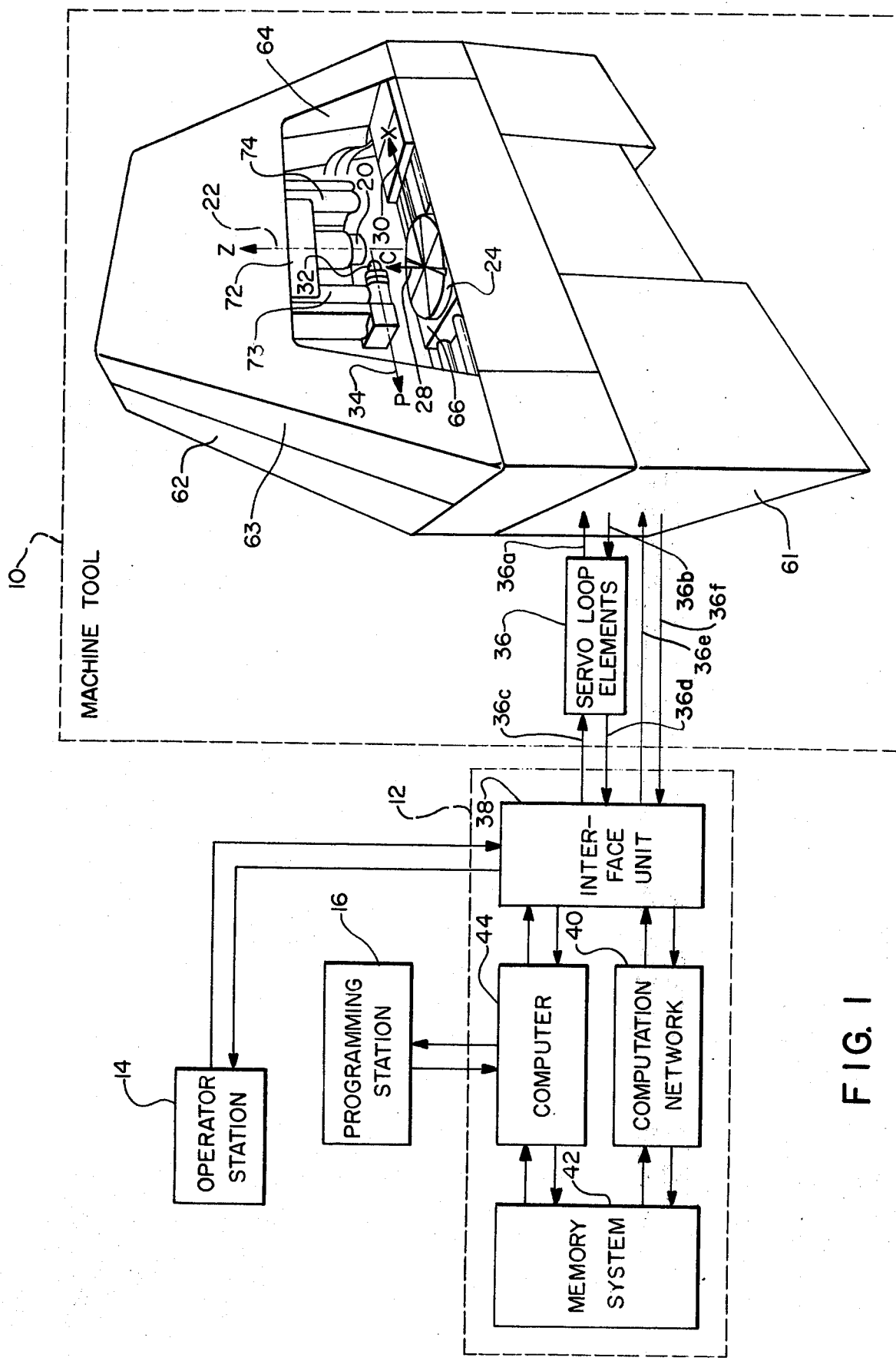
FIG. 1 shows in block diagram form an embodiment of the present invention.

A computer controlled machine tool contouring system is shown in FIG. 1 to include a machine tool 10, a control means 12, an operator station 14 and a programming station 16.

The control means 12 includes the interface unit 38, computation network 40, memory system 42, and computer 44. The computation network 40 and computer 44 are both interconnected to the interface unit 38 and to the memory system 42. In addition, the interface unit 38 is interconnected with the operator station 14. Computer 44 is interconnected with the programming station 16. It will be understood that FIG. 1 shows a configuration where the computer 44 controls a single machine tool 10. However, in the present embodiment, as many as six machine tools similar to tool 10 may be independently controlled by computer 44, provided that each tool 10 is interconnected (with an associated computation network, interface unit and operator station) to computer 44, programmer station 16 and memory station 42. The following discussion describes the configuration of FIG. 1, utilizing a single machine tool configuration.

The machine tool 10 comprises a vertical spindle, hydraulically operated, internal-external grinding machine with the actuating means including a plurality of associated servo-controlled positioning system. The grinding machine includes a cutting element 20 which is arranged to permit translation of that element along a vertical Z axis 22 in response to machine tool Z axis position drive data applied to an associated Z axis servo positioning system.

The grinding machine further includes a workpiece support table 24 which is arranged to permit rotation of that table about a vertical C axis 28 (extending from a reference point on the surface of table 24) in response to machine tool C axis drive data applied to an associated C axis servo positioning system. The workpiece support table 24 is further arranged to permit translation of that table along a horizontal X axis 30 in response to machine tool X axis drive data applied to an associated X axis servo positioning system. The grinding machine still further includes a cutting element dresser 32 which is arranged to permit translation of that dresser along a horizontal P axis 34 in response to machine tool P axis drive data applied to an associated P axis servo positioning system. It will be understood that the associated drive motors for each of the elements 20, 24 and 32 about and along their respective axes are included in the servo positioning systems described below. The machine tool also includes a means for controlling the rotation of the cutting element 20 about the Z axis.

In addition, the machine tool 10 also includes a hydraulic power unit (not shown in FIG. 1) for the actuating means and the various coolant valves associated with the workpiece coolant flow system.

The servo positioning systems each include a drive means (not shown in FIG. 1) and a position sensor and encoder associated with each of the Z, C, X and P axes. The servo systems further include additional loop elements associated with the servo systems for the respective drive means. The encoders and additional loop elements are indicated by the block 36 in FIG. 1, and are described more fully below. Block 36 of machine tool 10 is shown havng interconnections with the interface unit 38 of the control means 12.

The signal lines 36a —d are representative of the flow of control signals used in driving the elements associated with the various axes, and also of the flow of sensor data from the position encoding means associated with each of the axes. Signal lines 36e and f are representative of the flow of control signals used by the computer as discrete signals for control of tool 10.

Figure 2:
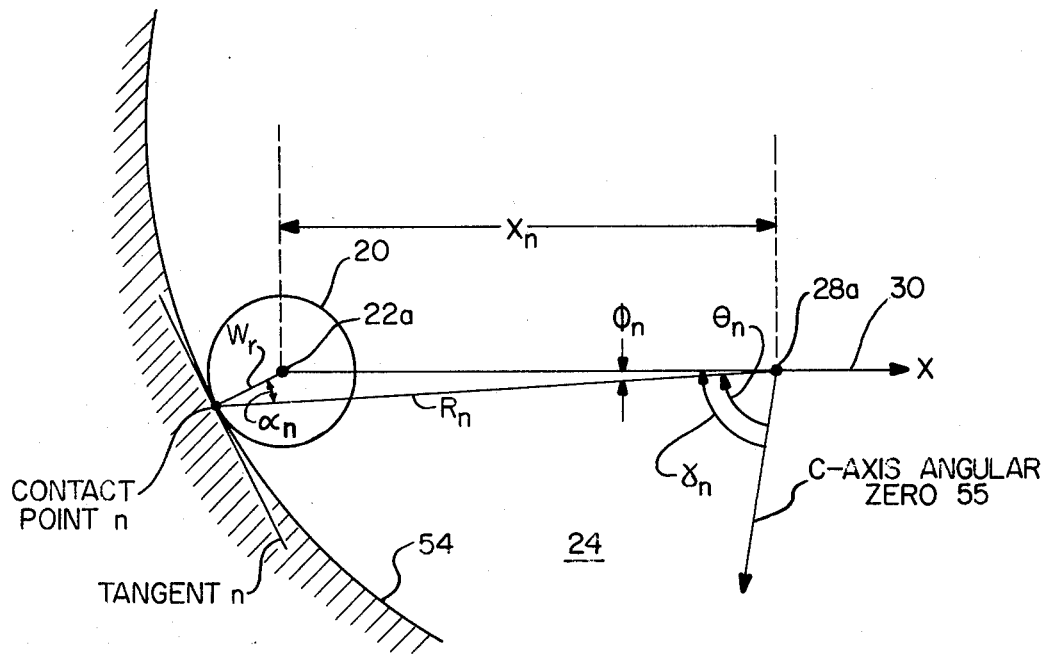
FIG. 2 shows the geometric relationships between the workpiece, cutting element and support table for the embodiment of FIG. 1.

FIG. 2 shows the geometry of the workpiece and cutting element in relation to the workpiece support table 24. In this figure, a workpiece 54 is shown affixed to the surface of the table 24. It will be understood that the desired workpiece center may be approximately specified by a set of spatial points defined in a reference coordinate system, where each spatial point has an associated tangent line segment passing therethrough and where each tangent line segment forms a predetermined angle with respect to an axis of the coordinate system. The contact point n and the associated tangent line segment in FIG. 2 are representative of a spatial point on the desired workpiece and associated relative slope contour at point n. The large dot 28a is representative of the center of rotation of table 24 (i.e. the intersection of the top surface of table 24 with the C axis). The line segment 55 representative of the C axis angular zero reference and, together with X axis 30 and C axis 28, forms a cylindrical coordinate system which may be used to define the location of the spatial points on the desired workpiece contour. The circular area of FIG. 2 denoted with reference numeral 20 is representative of a projection of the cross section of the cutting element 20 upon the top surface of table 24. The large dot 22a in the center of area 20 is representative of the intersection of the Z axis 22 with the top surface of table 24. The radius of the cutting element 20 is represented by the line segment denoted Wr. The distance denoted Xn is representative of the displacement of the center of rotation of the support table 24 (i.e. the dot 28a) from the central axis of the rotating cutting element 20 (i.e. the Z axis) along the X axis. The angle $\gamma_n$ is representative of the angulr displacement of the support table 24 from the reference position (and is measured by the angle formed by the X axis 30 and the C axis angular zero line segment 55).

As shown in FIG. 2, the support table 24 is positioned relative to the cutting element 20 so that there is a contact point between the cutting element 20 and the workpiece contour 54 at the point n, and further that the cutting element 20 is tangent to the workpiece contour 54 at the contact point n. The line segment $R_n$ extends between the contact point n on the contour 54 and the C axis intersection point 28a. The line segment $R_n$ connecting point n with point 28a forms an angle $\theta_n$ with the C axis angular zero 55. Consequently, the point n may be expressed in terms of the polar coordinates $R_n$ and $\theta_n$ as measured with respect to the C axis angular zero 55. Thus when the support table 24 is translated a distance $X_n$ along the X axis and is angularly displaced $\gamma_n$ about the C axis 28, the cutting element 20 is positioned with respect to the workpiece contour 54 to be tangent to the contour 54 at contact point n. The cutting element radial line segment, $W_r$, (which is perpendicular to the tangent line at point n and which extends from point n to the point 22a i.e. the Z axis intersection point), forms an angle $\alpha_n$ with respect to the line segment connecting point n with the C axis intersection point 28a. This angle $\alpha_n$ is defined as the pressure angle of the cutting element 20 with the workpiece contour 54 at point n.

It will be understood that the positioning system associated with the workpiece support table 24 is effective to synchronously position the workpiece support table 24 in rotational and translational motions about and along the C and X axes respectively, in order to control the cutting element to be successively repositioned relative to the workpiece contour 54 at a sequence of desired spatial points. It will be further understood that the cutting element contact point approaches the ultimate desired workpiece contour points over a time period encompassing successive revolutions of the support table 24, with the contact point first passing through a set of intermediate points which are offset from the corresponding ultimate desired points by a predetermined (and monotonically decreasing with time according to the feedrate) distance in the X axis direction. In addition, the cutting element contact point passes through each intermediate point so that at each intermediate point the cutting element is tangent to an associated line segment passing therethrough which is parallel to tangent line segment associated with the corresponding ultimate contact point. The control signals for achieving this positioning of support table 24 are generated by the control means 12 in combination with the servo loop elements in block 36 and the drive means associated with the various axes of machine 18.

II DESCRIPTION OF SYSTEM OPERATION

Operator-entered data signals define a succession of spatial points which lie on the desired contour of a finished workpiece. The control means, in effect, controls the relative position of the cutting element (by way of synchronously rotating and translating the workpiece support table relative to the cutting element) so that a contact point is maintained between the cutting element and the desired workpiece contour (modified by a predetermined offset value) at a succession of spatial points. In most applications, machining operation requires a plurality of full revolutions of the support table, with the cutting element removing an incremental amount of material from the workpiece contour during each pass. To accomplish this, the relative coordinates of the cutting element include an X axis offset component from the nominal X axis component which would otherwise control the contact point to lie on the desired workpiece contour. Generally, this X axis offset component is a monotonically decreasing function of time with the functional relationship being defined by the desired feedrate, i.e. the rate at which material on the workpiece is to be removed.

As the initial step in the contouring of a workpiece, the operator stores two sets of input data signals in the memory system. The first set, denoted as the process description, includes a sequence of coded instruction blocks for identifying machining operations to be performed by the machine tool together with predetermined parameters for defining the limits and rates associated with each step of the operation.

Typically, the initial process description blocks may specify initial manual cutting element dressing dimensions. Subsequent blocks may specify the following exemplary sequence of operations:

1. dressing of the cutting element to the predetermined initial wheel dimensions,
2. commencing the cutting element rotation at a predetermined rate,
3. commencing operation of the coolant system,
4. commencing translation and rotation of the support table along the X axis and about the C axis, respectively, in a manner so that the workpiece position is controlled in accordance with the part description data described below (but further having a predetermined X axis offset component added to the nominal X coordinate specified by the part description data),
5. controlling the cutting element to follow an oscillatory motion between predetermined Z axis limits at a predetermined rate,
6. during the continued translation and rotation of the support table, reducing the X offset component of the support table X axis position so that the cutting element contact point approaches the nominal X position on the desired workpiece contour (from an offset X position) at a predetermined feedrate,
7. translating and rotating the support table so that the contact point follows the desired nominal contour for a predetermined period.
8. backing off the positioning table to an offset X position,
9. shutting down the coolant system, and
10. withdrawing the cutting element to a reference Z position.

It will be understood that in an alternative sequence of operations, the cutting element may be redressed (to decrease its radius by predetermined increments) at predetermined times, followed by the resumption of operation and according to steps 4—7 after each redressing. It will be understood that the determination of the coordinates of the nominal X position of the support table, cited in step 4 above, is dependent on the second set of input data signals as described below. This latter determination provides the synchronism between the C axis rotation, an X axis translation of the support table, and permits computer controlled relative positioning of the cutting element along the desired workpiece contour, at the desired surface velocity. It will be noted at this point that the above described sequence of operations is exemplary and not a limitation on the particular order or of the nature of the specific operations themselves.

The second set of input data signals, denoted as the part description, comprises a sequence of data blocks, wherein the first block specified (1) the radial coordinate R of a reference point on the desired contour on the workpiece, measured along the line connecting that first reference point and the point about which the workpiece will be rotated by the support table, and (2) a desired pressure angle $\alpha$ associated therewith, i.e. the angle formed by the line segment passing through the first reference point and normal to the tangent line at that desired contour point, and the line segment connecting the contour reference point and the center of rotation of the support table.

The subsequent blocks in the part description each identify a further point on the desired workpiece contour in terms of the incremental change from the point associated with the next previous data block in the part description.

More particularly, each of these latter blocks comprise three words, the first being representative of $\Delta R$, the change in magnitude between the line segment connecting the contour point associated with the particular block and the second reference point, and the line segment connecting the contour point associated with the next previous block and the second reference point. The second word is representative of $\Delta\theta$, the change in angular position between the two line segments noted immediately above. The third word is similary representative of $\Delta\alpha$, the difference in the magnitude of the pressure angle associated with the contour point defined by the particular block and that of the next previous block.

Following the entry of the process and part description data signals into the system memory, a workpiece is affixed to the support table in a manner having the second reference point on the workpiece positioned at the rotational axis of the support table, i.e. positioned so that the workpiece rotates about an axis through the second reference point as the support table rotates about the C axis.

In response to an operator directive, the computer controls the system to operate in accordance with the stored process description. During the initial cutting element dressing operation (and each subsequent cutting element dressing operation), the part description data (which defines the desired workpiece contour) is transformed to provide a set of X–C axis control data which will be subsequently utilized to generate control signals for appropriately positioning the workpiece with respect to the cutting element so that machining may be performed at the specified contour point, with the specified pressure angle and at the specified surface velocity.

In this step, the previously stored data blocks each comprising $\Delta R$, $\Delta\theta$, and $\Delta\alpha$ part description words are transformed together with a signal $V_s$, representative of the surface velocity (as specified by the process description) to form a corresponding sequence of axis control data blocks, each comprising three data words. This sequence of axis control data blocks is stored in the memory forming the $\gamma$-C-V Table. The first word of each axis control data block C axis position (of $\gamma$) data, is representative of the magnitude of the angle formed by the line segment connecting the first and second reference points on the workpiece, and a line segment connecting the second reference point and the center of the cutting element when that element is positioned in a manner (1) having a lateral surface point in contact with the contour point associated with the particular $\Delta R$-$\Delta\theta$-$\Delta\alpha$ block, and (2) having the cutting element aligned at the specified pressure angle. The second word, X axis position change (or C) data, of each axis control block is representative of the ratio $\Delta X/\Delta\gamma$,
wherein $\Delta X$ and $\Delta\gamma$ are representative of the change in position of the support table along the X axis and about the C axis, respectively, required to position the contact point of the cutting element from the contour point associated with the next previous $\Delta R$-$\Delta\theta$-$\Delta\gamma$ block and the contour point associated with the particular $\Delta R$-$\Delta\theta$-$\Delta\gamma$ block. It will be understood that $\Delta X$ and $\Delta\gamma$ are determined by transforming the $\Delta R$, $\Delta\theta$ and $\Delta\alpha$ data together with the "next" radius, $W_r$, of the cutting element (noting at this point that the cutting element is concurrently being dressed to the "next" radius during the $\Delta R$-$\Delta\theta$-$\Delta\alpha$ data to $\gamma$-C-V (axis control) data transformation). This third word, C axis angular velocity (or V) data, of each intermediate data block is representative of the angular velocity of the support table (about the C axis) which is required to ensure that the point of contact passes the contour point associated with the particular $\Delta R$-$\Delta\theta$-$\Delta\alpha$ block at the specified velocity $V_s$. It will be understood that this surface velocity constraint is in addition to the X axis and C axis positional changes which are described above for ensuring that there is a point of contact with the workpiece and cutting element at or approaching the specified contour points.

Following the completion of the each concurrently performed cutting element dressing operation and $\gamma$-C-V table generation, the computer directs the sequential performance of the instructions of the process description. The process through which the axis control data and sensor data is transformed to machine tool drive data by which the computer controls the translational and rotational motion of the workpiece support table will now be briefly described.

Initially, it will be noted that the actuators controlling motion of table 24 along the X axis and about the C axis include sensor means (or transducers) for producing encoded position sensor data $X_{PW}$ and $\gamma_W$ which are representative of the instantaneous (or actual) relative position of the table with respect to the Z axis 22 and the C axis angular zero 55, respectively. The sensor means are, in effect, repetitively interrogated by the computation network with a predetermined repetition period having duration $\Delta t$. It will be further noted that one of the entries in the $\gamma$-C-V table is at all times denoted as "current" by the computation network and the $\gamma$ value associated therewith is assigned to a current entry identifier $\gamma_N$. Following each interrogation, the computation network effectively compares the current $\gamma_W$ with the corresponding value $\gamma_H$, as stored from the next previous interrogation time, and a difference signal is generated to be representative of $\gamma_W - \gamma_H$, i.e., the actual rotation of the support table since the last interrogation. An intermediate signal $\gamma_i$ (in accordance with the formula:

$$\frac{\gamma W - \gamma H}{2} + \gamma W$$

is generated for use in determining a "best estimate" of the appropriate entry in the $\gamma$-C-V Table to be denoted as the current entry (associated with identifier $\gamma_N$) during the current interrogation interval. This signal, $\gamma_i$ is then compared with the $\gamma$ value associated with $\gamma_N$. If $\gamma_i > \gamma_N$, then the next entry in the $\gamma$-C-V table is designated as the "current" entry and $\gamma_N$ accordingly is assigned the $\gamma$-value associated with the new "current" entry. This comparison process is repetitively performed by the computation network until $\gamma_i < \gamma_N$. At that time, the C and V values associated with the then current table entry are retrieved from the memory for use in the next step during the current interrogation interval. In this manner, a "best estimate" is made as to the proper C value $$(\text{i.e. } \frac{\Delta X}{\Delta \gamma}),$$

to be used during the current interrogation interval.

In addition, a value representative of the estimated angular position $\gamma_E$ of the support table 24 following the next interrogation interval, is generated according to the formula: $\gamma_E = \gamma_W + (\gamma_W - \gamma_H)$.

In effect, the computation network then directs the multiplication of the current C value $$(\text{i.e. } \frac{\Delta X}{\Delta \gamma})$$

with the difference between $\gamma_E$ and $\gamma_{EH}$ (where $\gamma_{EH}$ corresponds to $\gamma_E$ determined in and stored from the immediately preceding interval) to form a correction $\Delta X_d$, to the desired position $X_{dH}$ associated with the previous interrogation interval. The sum $X_{dH} + \Delta X_d$ is representative of the nominal desired position $X_d$ to which the support table is to be moved during the current interrogation interval.

As described above, the true desired position of the support table $X_D$ is dependent on the desired offset and offset reducing feedrate along the X-axis. Consequently, to obtain $X_D$, the current desired position signal $X_d$ is modified by an offset signal U and feedrate signal F (in accordance with the relations defined by the process description) to have the form $$X_D = X_d + U + F$$

The computation network then generates an X position error signal $X_E$ which is representative of the difference between the actual position signal $X_{PW}$ (provided by the X axis transducer) and the true desired position, $X_D$.

Since the interrogation intervals have a uniform duration, the $\Delta X_d$ signal from the current interval is representative of the desired X axis velocity, $X_V$, of the positioning table. In addition, the difference between the $\Delta X_D$ signal from the current interval and the corresponding signal $\Delta X_{DH}$ from the previous interval is representative of the desired X axis acceleration $X_A$, of the positioning table. The X position error signal, $X_E$, the X axis velocity signal, $X_V$, and the X axis acceleration signal, $X_A$, are applied by the computation network through the interface unit (where those signals are converted to analog form) to the servo system associated with the X axis actuator in order to control the X axis translation of the support table 24.

In addition, the computation network provides a velocity error signal $V_C$ for the C axis servo system. For a current $\gamma$ -C-V Table entry, the recalled V value is representative of the desired angular change $\Delta \gamma_D$ or $V_s$ required to be accomplished during the interrogation interval $\Delta t$ in order to achieve the specified surface velocity. During the next previous interrogation interval, the computation network, in effect, forms the sum of the angular position error from the then current interval, $V_{CH}$, with the desired change, $\Delta \gamma_D$. In the current interval, this sum is reduced by the actual angular position change, $\gamma_W - \gamma_H$ achieved during the next previous interval. The resultant value, $V_C$, thus is representative of the difference between the desired and actual angular position of the support table. Subsequently, $V_C$ is applied as the integrated velocity error signal to the servo system associated with the C axis actuator.

DETAILED DESCRIPTION OF THE SYSTEM

A. Machine Tool

The exemplary machine 18 has four steel weldments comprising the base 61, column 62 and wings 63 and 64. Base 61 provides a support for the cross-slide 66 upon which the workpiece support table 24 translates (along the X axis 30). The column 62 provides support for the cutting element slide (allowing translation of the cutting element 20 along the Z axis 22). Wings 63 and 64 provide a stiffening function for the base and column assembly and, further, enclose the work area to provide reduction of noise and coolant splash. It will be understood that a coolant flow system is provided having ducts in the top surface 70 of the base 61 for directing coolant away from the machining area and toward a collection point.

Figure 3:
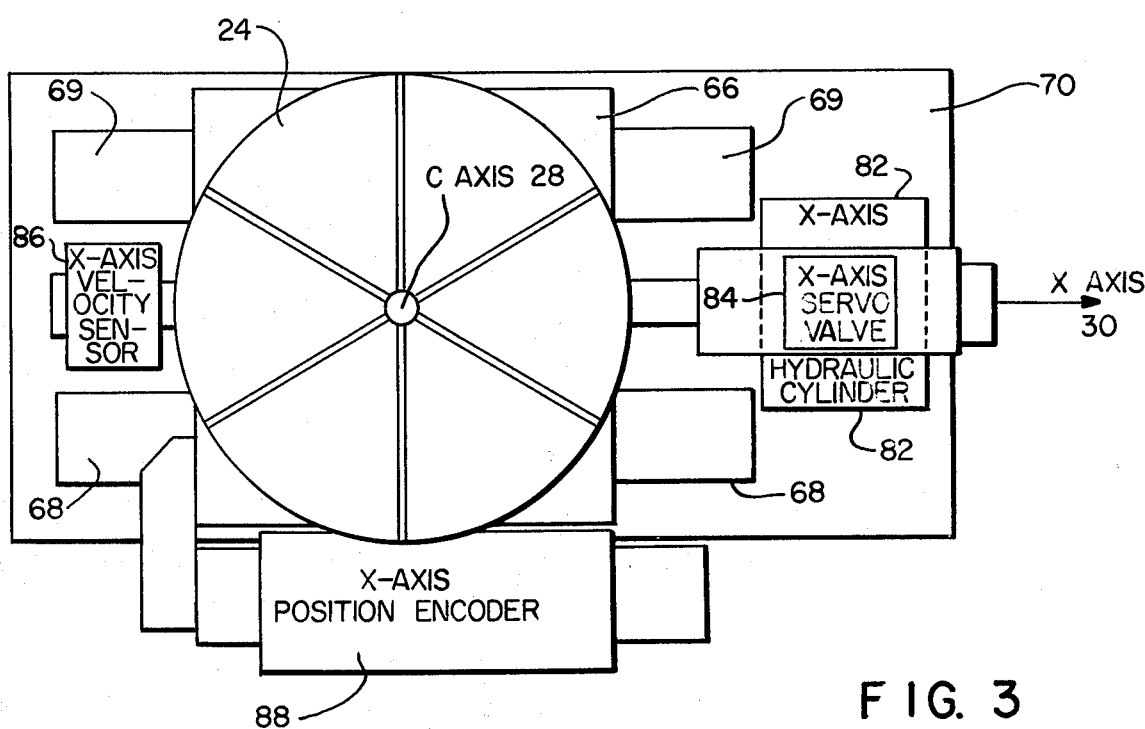
FIG. 3 shows a plan view of the workpiece support table and associated servo elements for the embodiment of FIG. 1.

A top view of the rotary support table and cross-slide unit is shown in FIG. 3. The support table 24 is affixed to a cross slide 66 for translation along the X axis 30. The cross slide 66 is mounted on hydrostatic bearings to permit translation along the round bar ways 68 and 69. The front way 68 is elastically supported to permit the round ways to accommodate thermal deformations of the cross slide. The rear way 69 is rigidly supported to provide a reference position for the cross slide 66. Also shown in FIG. 3 are the following X axis servo system elements (which are described more fully below): the hydraulic cylinder 82, servo valve 84, X axis velocity transducer 86 and X axis position transducer and encoder 88. The encoder 88 provides data signals representative of the position of cross-slide 66 along the X axis. In the exemplary system, encoder 88 produces these signals with 50 micro-inch resolution and 50 micro-inch per foot accuracy.

The workpiece support table 24 is supported by hydrostatic journal and thrust bearings which are mounted on the cross slide 66. The bearings permit rotary motion of the table 24 about the C axis 28. A hydraulic motor affixed to the underside of table 24 (not shown in FIG. 3) controls the speed and direction of the rotary motion of table 24 about the C axis 28 in response to hydraulic signals applied by a two stage servo valve which is mounted on that motor. Also included in the C axis servo system is a rotary position transducer and encoder. The C axis encoder provides data signals representative of the rotational position of table 24 about the C axis. In the exemplary system the C axis encoder produces these signals with 0.01° angular resolution and ±0.006° accuracy.

A vertically oriented cutting element slide 72 is provided for translating the cutting element 20 along the Z axis 22. The cutting element slide 72 is coupled to the column 62 by non-metallic bearings and two vertically oriented round bar ways 73 and 74. The motion of the vertical slide 72 is controlled by the Z axis servo system and more particulary by a hydraulic cylinder which is responsive to a two stage servo valve. In addition, a precision rack-and-pinion coupled rotary encoder is provided to generate Z axis position data. The Z axis encoder provides data signals representative of the position of cutting element 20 along the Z axis. The Z axis encoder produces these signals with 0.001 inch resolution and accuracy of ± 0.0005 inches.

The cutting element 20 on the vertical slide 72 is driven to rotate about the Z axis 22 (on grease-packed ball-bearing) by a coaxially mounted hydraulic motor.

The cutting element dresser 32 is driven along P axis 34 on a single, splined round way. It will be understood that the dresser 32 is driven by a stepping motor and gear train configuration for positioning.

As indicated in FIG. 1, the control system 12 receives position data signals via line 36d from the various encoders of the machine tool 10 and, in response thereto, provides driving signals via line 36c to the actuating means associated the various axis servo systems. An encoder on the stepping motor shaft provides position data to the control means 12.

It will be understood that the above described particular orientation of the rotating and translating workpiece support table (and the mechanical linkage therefor) is only an exemplary configuration and that other embodiments of the present invention may utilize an alternative configuration.

1. Actuating Means a. X Axis Servo System

The X axis servo system for the machine tool 10 of the contouring system of FIG. 1 accommodates a total moving load mas on the order of 400 pounds (including the workpiece support table 24, C axis actuating means and a 100 pound workpiece). The presently described embodiment permits the generation of complex workpiece contours (including parabolic or constant acceleration contours) requiring X axis forces as high as 5400 pounds on the load mass. The accuracy is dependent on the resultant acceleration and velocity of the load mass. The rotary velocity (about C axis 28) for the workpiece is limited to be such that a maximum surface speed of 120 surface feet per minute may be achieved along the workpiece contour.

To provide this performance, the X axis servo system comprises a linear hydraulic actuator, a servo valve and a linear velocity transducer, a position encoder, servo electronics, and control means 12, which together provide means for positioning the support table 24 to any point in a two inch range of motion for the cross slide 66, in response to control signals applied by the control means 12.

Figure 4A:
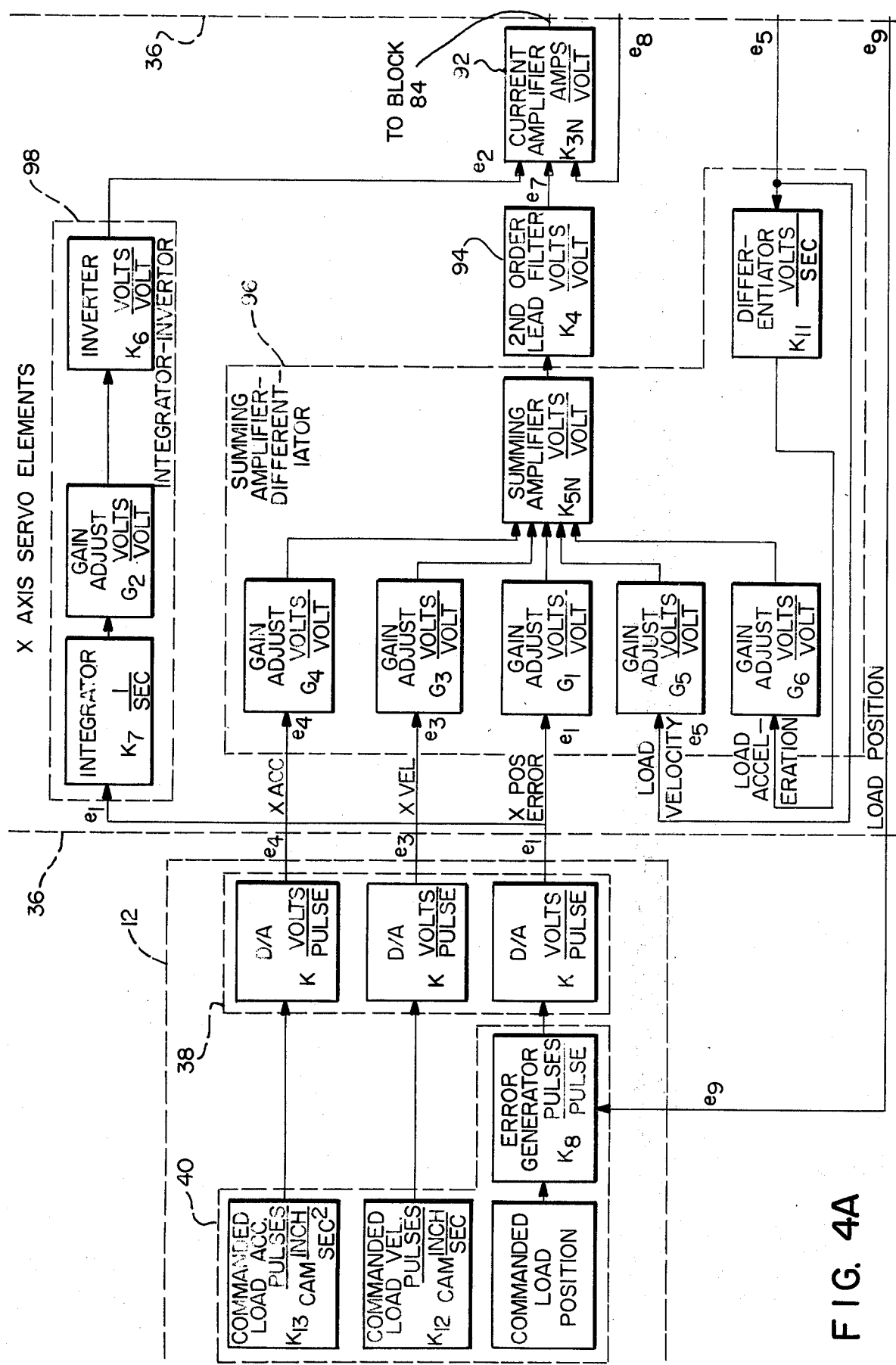
FIGS. 4A and 4B show in block diagram form the X axis servo positioning system for the embodiment of FIG. 1.
Figure 4B:
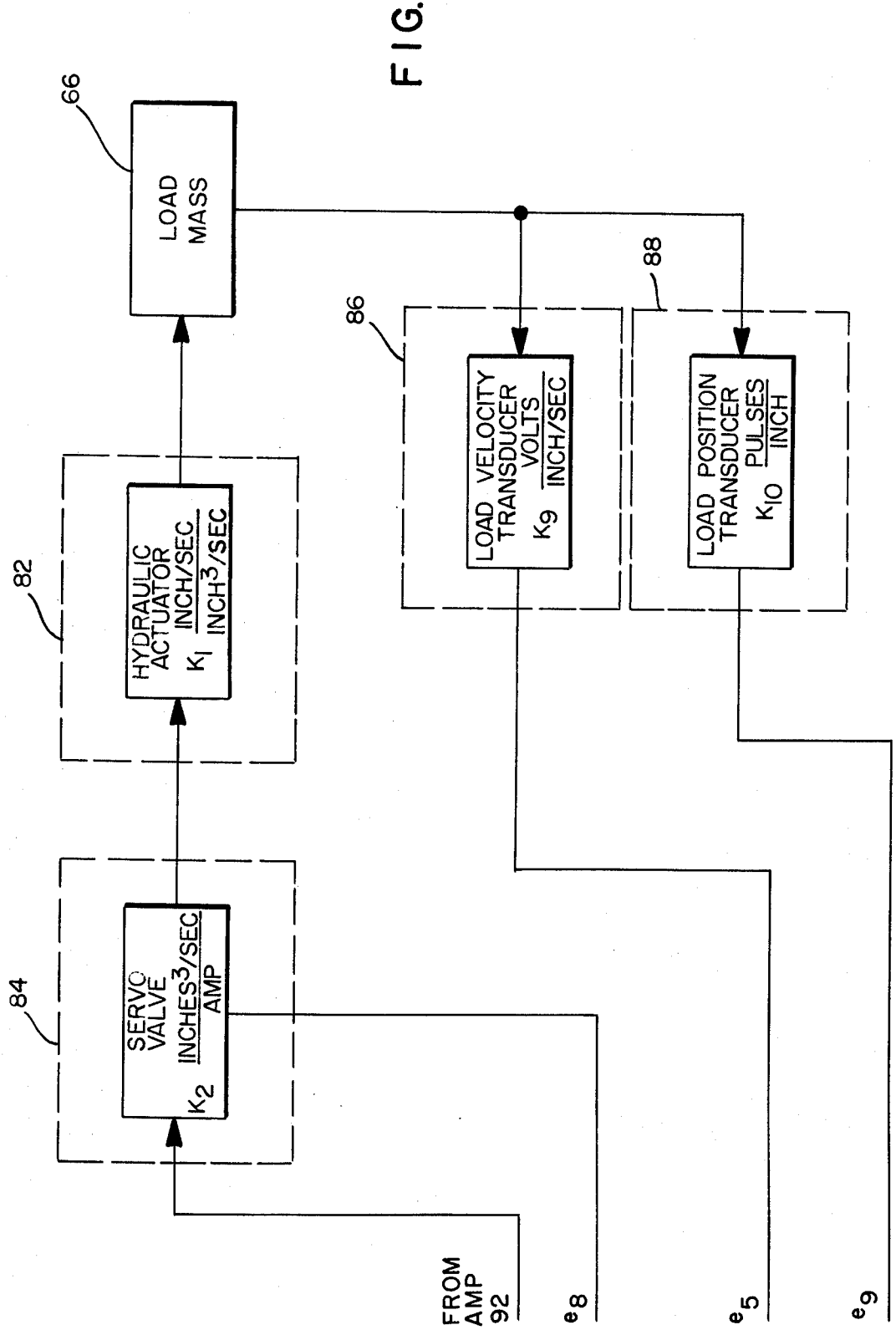

An exemplary X axis servo system is shown in block diagram form in FIGS. 4A–B. In that figure, the various blocks are shown with the associated gain constant, including the related dimensions. The elements shown in block 36 of FIGS. 4A–B comprise the X axis portion of the block 36 in FIG. 1. It will be understood that the output signals, $e_1$, $e_3$ and $e_4$ of the control means 12 are considered here to be applied directly between the computation network 40 and block 36 and to have the indicated analog form, although those signals are actually applied by network 40 in digital form by way of the interface unit 38 to the X axis servo system. The interface unit 38 includes digital-to-analog convertors which transform the signals to analog form.

It will be further understood that the servo valve, hydraulic actuator, load velocity transducer, load position transducer (shown within blocks 84, 82, 86 and 88) of FIGS. 4A–B provide effective characterizations of the servo valve 84, hydraulic cylinder 82, velocity sensor 86 and position encoder 88, respectively, as described above in conjunction with FIG. 3. Similarly, the load mass 66 of FIGS. 4A–B corresponds to the assembly of FIG. 3, including cross-slide 66, table 24, the associated C axis actuating means and further includes the workpiece.

a balanced area actuator having a lapped fit to the cylinder bore (or alternatively a double seal on the piston with the area between the seals vented to return pressure). The friction level may be as high as 40 pounds. The actuator housing is fastened to the machine base 61 with a spring rate of $4 \times 10^6$ lbs/inch. The total volume of oil under compression is assumed to be 7.5 cubic inches, with 6.0 cubic inches of this being in the actuator. The remaining 1.5 cubic inches is in the servo valve and the manifold between the valve and actuator.

The servo valve 84 is a four-way, flow control type, with the output flow proportional to input current. The associated frequency response is characterized by a second order lag with a break frequency of 160 cps and a damping ratio of 0.5 when measured at 75% rated input current. The valve has peak flow of 15 gpm (57.7 cubic inches per second) at 1800 psi. An electrical feedback valve is used to substantially reduce the hysteresis and improve the frequency response particularly at higher amplitude signals. Alternatively, a Moag series 76–104 valve, manufactured by Moag, Inc., East Aurora, N.Y., may be used in lieu of the above described valve.

Figure 5:
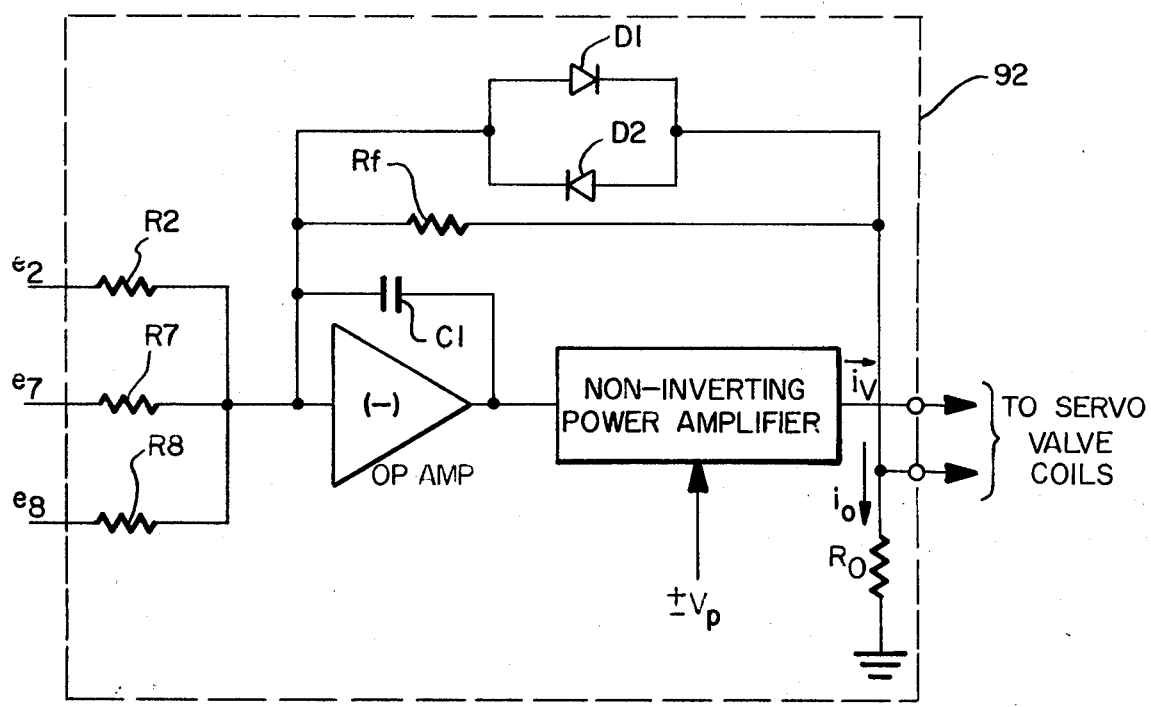
FIG. 5 shows in schematic form an exemplary circuit configuration for the current amplifier in the X axis servo positioning system of FIG. 4A.

The current amplifier 92 is shown in schematic form in FIG. 5. That configuration may be characterized by the following expressions:

$$i_o \approx i_r = -\left(\frac{R_f}{R_0 R_2}\right) e_2 - \left(\frac{R_f}{R_0 R_7}\right) e_7 - \left(\frac{R_f}{R_0 R_8}\right) e_8 \quad (1)$$

TABLE II

X-AXIS LOOP GAINS

| | | | |
|---|---|---|---|
| Position Loop Gain | $K_L = 1600$ | $\frac{\text{inches/sec}}{\text{inch}}$ | $= K_1 K_2 K_{37} K_4 K_{51} K_8 K_{10} G_1$ |
| Velocity Loop Gain | $K_{Vb} = 1.72$ | $\frac{\text{inch/sec}}{\text{inch/sec}}$ | $= K_1 K_2 K_{37} K_4 K_{55} K_9 G_5$ |
| Acceleration Loop gain | $K_{ab} = 0.00125$ | $\frac{\text{inch/sec}}{\text{inch/sec}^2}$ | $= K_1 K_2 K_{37} K_4 K_{56} K_9 K_{11} G_6$ |
| Position Error Integrator Loop Gain | $K_{Int} = 50(10^3)$ | $\frac{1}{\text{sec}^2}$ | $= K_1 K_2 K_{32} K_6 K_7 K_8 K_{10} G_2$ |
| Commanded Load Velocity | $K_{vf} = 2.69$ | $\frac{\text{load in/sec}}{\text{cam in/sec}}$ | $= K_1 K_2 K_{37} K_4 K_{53} K_{12} G_3$ |
| Commanded Load Acceleration | $K_{af} = 0.00173$ | $\frac{\text{load in/sec}}{\text{cam in/sec}^2}$ | $= K_1 K_2 K_{37} K_4 K_{54} K_{13} G_4$ |
| Actuator Area | $K_1 = \frac{1}{3}$ | $\frac{1}{\text{inch}^2}$ | |

In the system of FIGS. 4A–B, the X axis loop gain required to produce the desired position accuracy is obtained through the use of load velocity and load acceleration feedback to stabilize the X axis position feedback loop. In order to eliminate resultant large position errors proportional to these functions, the velocity and acceleration characteristics of the contour are fed forward via signals $e_3$ and $e_4$. Table II shows the various loop and command gain expressions for the exemplary system of FIGS. 4A–B. The exemplary system will now be described in detail.

The load mass is coupled to the actuator 82 through a spring rate of $4 \times 10^6$ lbs/inch, with there being no backlash between the actuator and the load.

The hydraulic actuator 82 has a stroke of ± 1 inch and an effective area of 3 square inches. Actuator 82 is $$K_{32} = -\frac{R_f}{R_0 R_2} \text{AMPS/VOLT} \quad (2)$$

$$K_{37} = -\frac{R_f}{R_0 R_7} \text{AMPS/VOLT} \quad (3)$$

$$K_{38} = -\frac{R_f}{R_0 R_8} \text{AMPS/VOLT} \quad (4)$$

Amplifier 92 forces current into the servo valve in response to a command voltage. This configuration is used to eliminate the effect of the L/R time constant of the valve coils. The capacitor $C_1$ stabalizes the overall amplifier by rolling off the operational amplifier gain at high frequencies. The rated servo valve current through resistor R. produces an approximate 0.4–0.5 voltage drop. Consequently, the diodes $D_1$ and $D_2$ limit the maximum output current to about 125–150% of rated current. The voltage V is selected so that the current amplifier has sufficient output voltage to force rated current through the valve coils at 250 cps.

Figure 6:
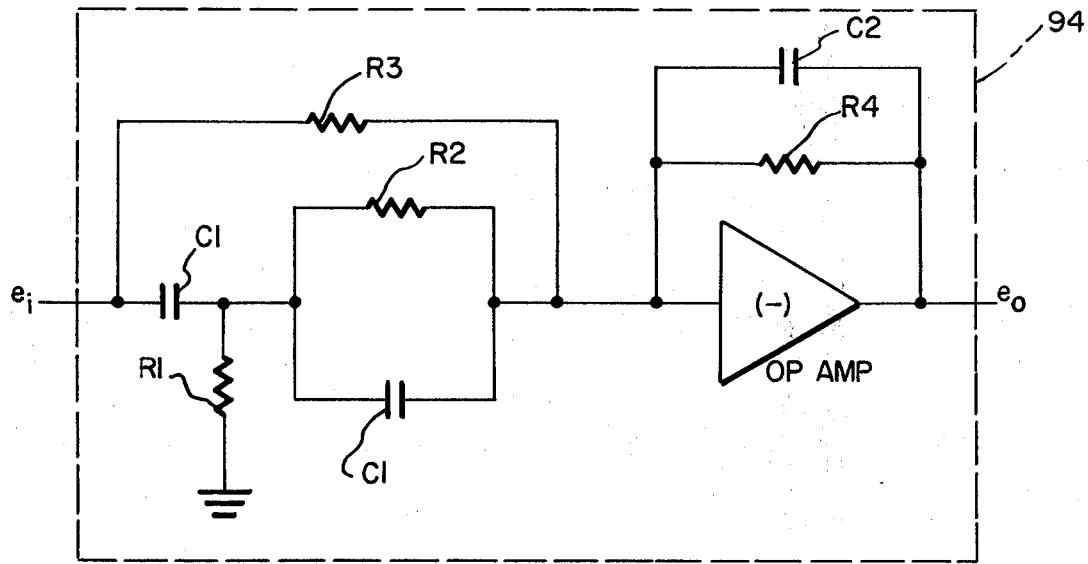
FIG. 6 shows in schematic form an exemplary circuit configuration for the lead filter in the X axis servo positioning system of FIG. 4A.

The 2nd order lead filter 94 is shown in FIG. 6 that configuration may be characterized by the following expressions:

$$\frac{e_0}{e_1} = -\left(\frac{R_4}{R_3}\right) \frac{\frac{S^2}{W_1W_2} + \frac{1}{W_1}S + 1}{\left(\frac{S}{W_3}+1\right)\left(\frac{S}{W_4}+1\right)} = -K_4 \frac{\frac{S^2}{W_m^2} + \frac{2\xi}{W_m}S + 1}{\left(\frac{S}{W_3}+1\right)\left(\frac{S}{W_4}+1\right)} \quad (5)$$

$$K_4 = \frac{R_4}{R_3} \text{VOLTS/VOLT} \quad (6)$$

$$\frac{1}{W_1} = \frac{R_1(2R_2+R_3)C_1}{R_1+R_2} \quad (7)$$

$$\frac{1}{W_2} = \frac{R_2R_3C_1}{2R_2+R_3} \quad (8)$$

$$\frac{1}{W_3} = \frac{2R_1R_2C_1}{R_1+R_2} \quad (9)$$

$$\frac{1}{W_4} = \frac{1}{R_4C_2} \quad (10)$$

$$W_m = \sqrt{W_1W_2} \quad (11)$$

$$W_1 = \frac{W_m}{2\xi} \quad (12)$$

$$W_2 = 2\xi W_m \quad (13)$$

The filter 94 increases the apparent frequency response of the servo valve, thereby yielding a faster, more accurate X axis servo system. The filter has a response that is inverse to that of the servo valve 84, $\omega_m$ and $\xi$ have been selected to by 1000 rad/sec and 0.5, respectively, in order to match the servo valve 84. $\omega_3$ and $\omega_4$ are have been selected to be 10,000 rad/sec and 12,000 rad/sec, i.e. approximately equal and 10 to 12 times larger than $\omega_m$. $K_4$ equals 1 and yields the desired low frequency gain (X=1) through the circuit. For $R_4$ = 27,000 ohms then the remaining elements are determined from the following expressions:

$$R_3 = \frac{R_4}{K_4} \quad (14)$$

$$R_2 = \frac{R_3}{2\left[\frac{W_3}{W_1}-1\right]} \quad (15)$$

$$R_1 = \frac{R_2}{4\frac{R_2}{R_3}\left(\frac{W_3}{W_m}\right)^2 - 1} \quad (16)$$

$$C_2 = \frac{1}{R_4W_4} \quad (17)$$

$$C_1 = \frac{2\frac{W_3}{W_m}}{R_3W_m} \quad (18)$$

Figure 7:
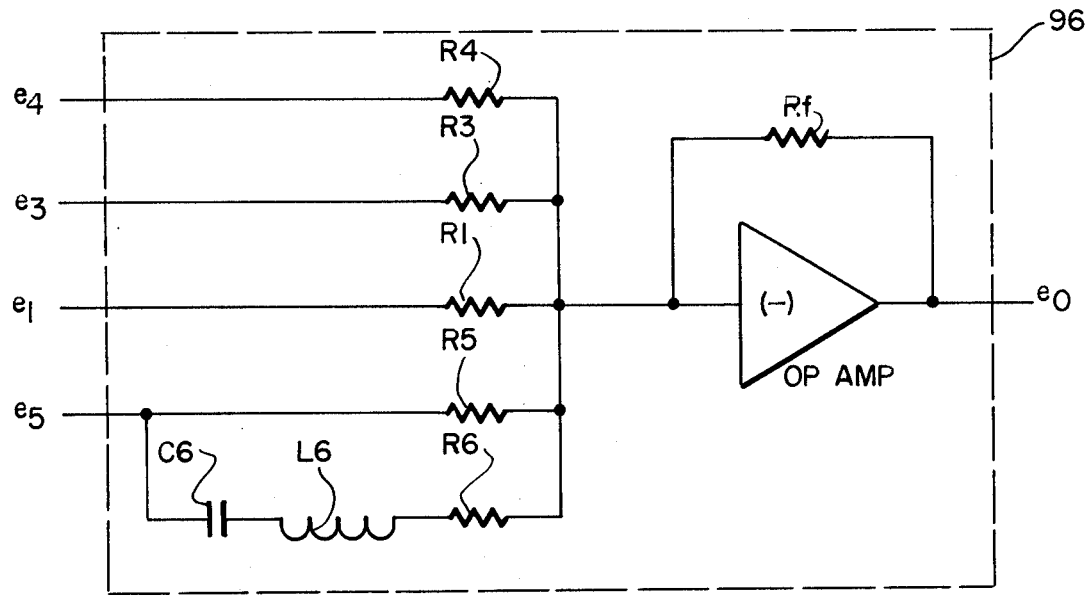
FIG. 7 shows in schematic form an exemplary circuit configuration for the summing amplifier-differentiator in the X axis servo positioning system of FIG. 4A.

The summing amplifier-differentiator 96 is shown in FIG. 7. That configuration may be characterized by the following expressions which relate to the gain expressions of FIG. 4A.

$$e_0 = -\left(\frac{R_f}{R_4}\right)e_4 - \left(\frac{R_f}{R_3}\right)e_3 - \left(\frac{R_f}{R_1}\right)e_1 - \left(\frac{R_f}{R_5}\right)e_5 - \frac{(R_fC_6)S}{L_6C_6S^2+(R_6C_6)S+1}e_5 \quad (19)$$

$$G_1K_{51} = -\frac{R_f}{R_1} \text{VOLTS/VOLT} \quad (20)$$

$$G_3K_{53} = -\frac{R_f}{R_3} \text{VOLTS/VOLT} \quad (21)$$

$$G_4K_{54} = -\frac{R_f}{R_4} \text{VOLTS/VOLT} \quad (22)$$

$$G_5K_{55} = -\frac{R_f}{R_5} \text{VOLTS/VOLT} \quad (23)$$

$$G_6K_{11}K_{56} = -(R_fC_6) \frac{\text{VOLTS}}{\text{VOLTS/SEC}} \quad (24)$$

$$\frac{(R_fC_6)S}{L_6C_6S^2+(R_6C_6)S+1} = \frac{G_6K_{11}K_{56}}{\frac{S^2}{W_m^2}+\frac{2\xi}{W_m}S+1} \quad (25)$$

This circuit provides a weighted sum of the signals $e_1$, $e_3$, $e_4$ and $e_5$ and the time derivative of signal $e_5$. In the differentiator portion, the inductor $L_6$ causes the differentiator gain to drop off at frequencies beyond 10,000 rad/sec, in order to reduce noise. $\omega_m$ is selected to be 10,000 rad/sec and $\xi = 0.4$. It will be noted that $R_6$ includes the resistance of the inductor $L_6$. Using the above noted values, the remaining elements are determined from the following expressions:

$$C_6 = \frac{G_6K_{11}K_{56}}{R_f} \quad (26)$$

$$L_6 = \frac{1}{C_6W_m^2} \quad (27)$$

$$R_6 = \frac{2\xi}{C_6W_m} = \frac{2\xi W_m}{L_6} \quad (28)$$

Figure 8:
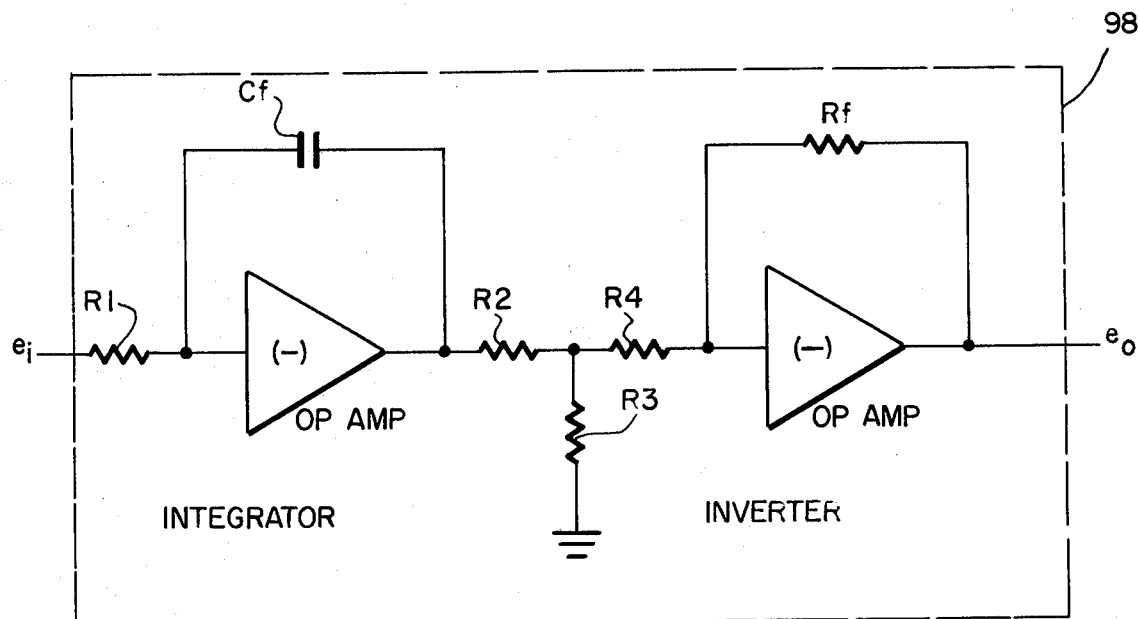
FIG. 8 shows in schematic form an exemplary circuit configuration for the integrator-inverter in the X axis servo positioning system of FIG. 4A.
Figure 9:
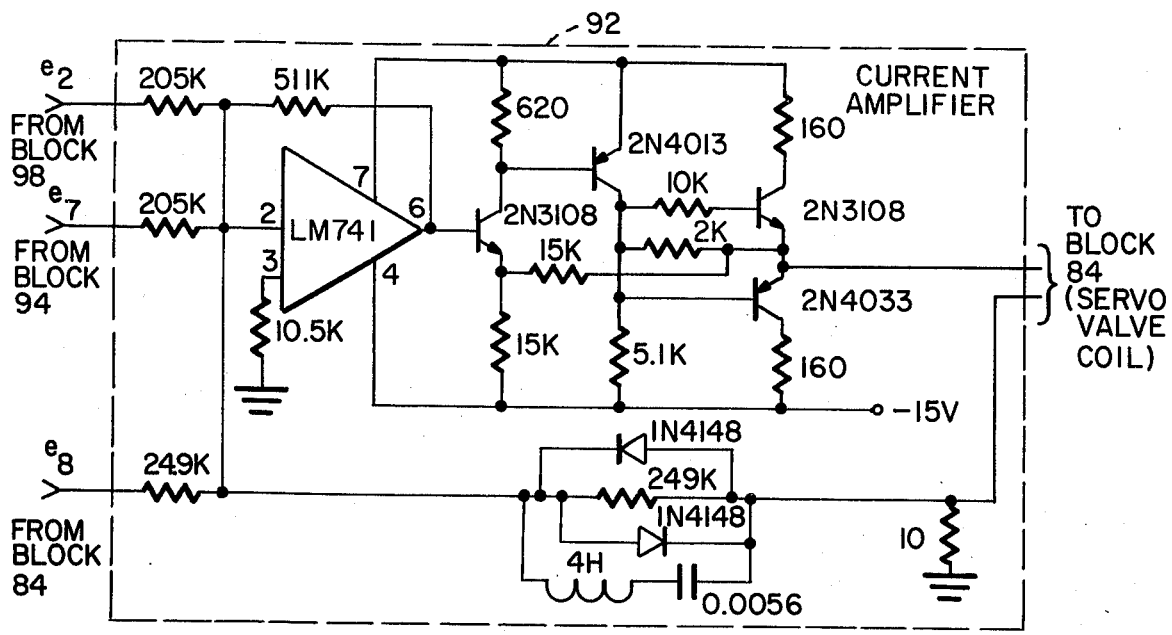
FIG. 9 shows in schematic form an alternative configuration for the circuit of FIG. 5.
Figure 10:
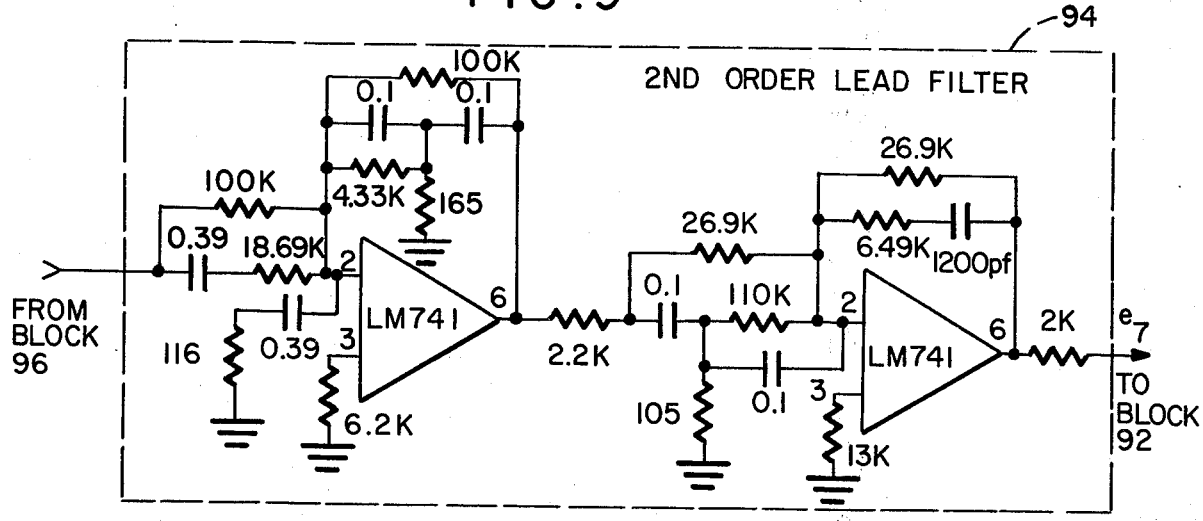
FIG. 10 shows in schematic form an alternative circuit configuration for the circuit of FIG. 6.
Figure 12:
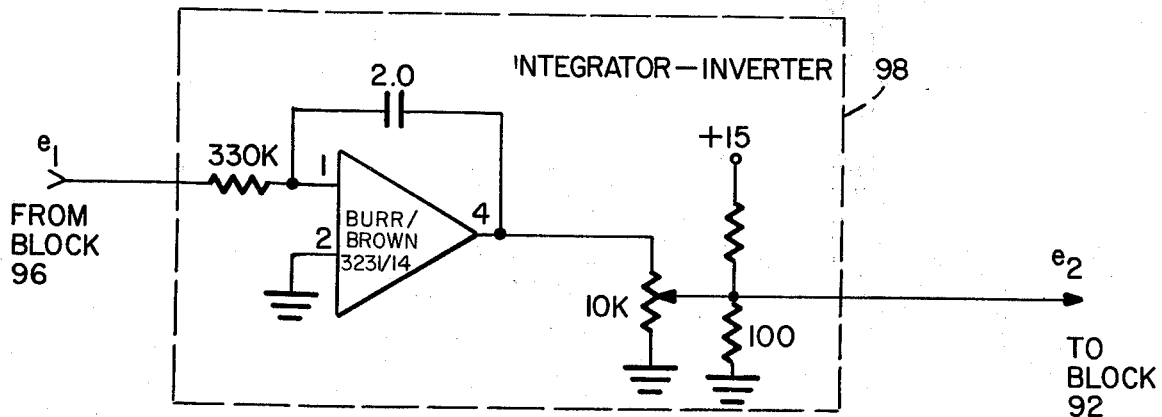
FIG. 12 shows in schematic form an alternative configuration for the circuit of FIG. 8.

The load position error integrator 98 is shown in FIG. 8. This circuit may be characterized by the following expressions which relate the gain expressions of FIG. 4A.

$$\frac{e_o}{e_i} = \frac{R_F}{R_4} \left[ \frac{R_3(\frac{R_4}{R_3+R_4})}{R_2+R_3(\frac{R_4}{R_3+R_4})} \right] \left[ \frac{1/R_1C_F}{S} \right] \quad (29)$$

$$K_7 = \frac{-1}{R_1C_F} \quad \frac{1}{SEC} \quad (30)$$

$$G_2 = \frac{R_3(\frac{R_3}{R_3+R_4})}{R_2+R_3(\frac{R_3}{R_3+R_4})} \quad \text{VOLTS}/_{VOLT} \quad (31)$$

$$K_6 = -\frac{R_F}{R_4} \quad \text{VOLTS}/_{VOLT} \quad (32)$$

This circuit provides correction for relatively slow valve null wander and amplifier bias shifts. In addition, this circuit substantially reduces the errors due to valve nonlinearity and hydraulic supply pressure changes. The inverter portion allows the integrator output to be added back into the system with the proper signal phase relation.

The load velocity transducer 86 is a type LMV 879/25, manufactured by G. L. Collins Corporation, Long Beach, California. The transducer 86 is rigidly and stiffly mounted to the machine base 61. The load position transducer 88 is an optical incremental type LMS 50, manufactured by Dynamics Research Company, Wilmington, Mass.

FIGS. 9–12 show an alternative circuit configuration for blocks 92, 94, 96 and 98, respectively of FIGS. 4A–B. In this alternative configuration, it is assumed that the Moog series 76–104 valve is utilized in block 84.

b. C Axis Servo System

Figure 13:
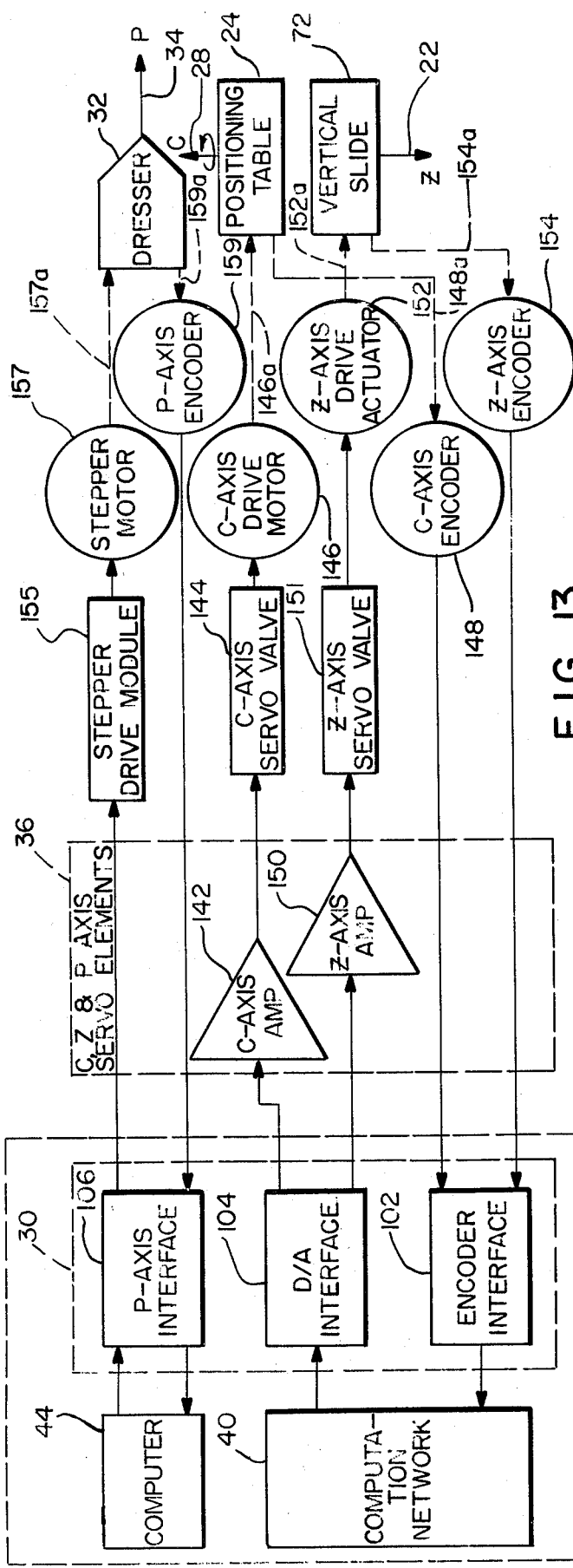
FIG. 13 shows in block diagram form the C, Z and P axes servo positioning systems for the embodiment of FIG. 1.
Figure 14:
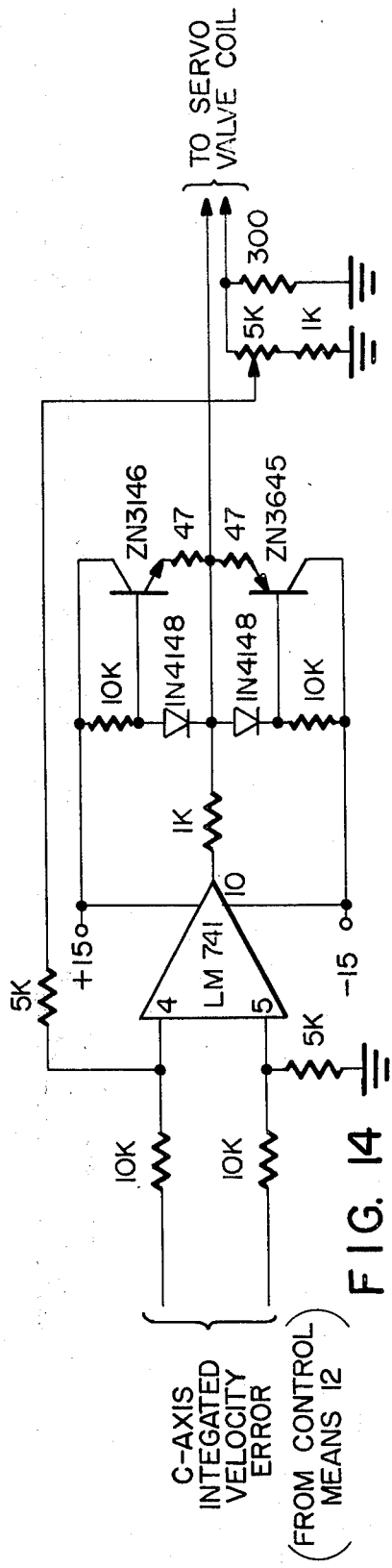
FIG. 14 shows in schematic form an exemplary circuit configuration for the amplifiers in FIG. 13.

The C axis servo system for the machine tool 10 is shown in FIG. 13 to include the computation network 40, digital-to-analog interface 104 and encoder interface 102 (all in control means 12), amplifier 142 (of servo loop element block 36), and the C axis servo valve 144, drive motor 146, support table 24 and encoder 148 (all in machine tool 10). The broken lines 146a and 148a indicate the mechanical coupling between both motor 146 and encoder 148 to the support table 24. For the presently described embodiment, the amplifier 142 is shown in schematic form in FIG. 14. The valve 144 is a Moog series 76–104 valve, and the motor 146 is a type SN-110, manufactured by Scanomatic, Racine, Wisconsin. The encoder 148 provides one pulse for each 0.01 revolution of the support table 24, and is a model 35-2X13-9000, manufactured by Dynamics Research Corporation, Wilmington, Mass. In operation, the C axis servo system drives the support table in response to follow the C axis drive signal as applied by the control means 12.

c. Z Axis Servo System

The Z axis servo system is also shown in FIG. 13, and has the same block diagram format as the C axis servo system, including computation network 40, interfaces 104 and 102, amplifier 150, servo valve 151, actuator 152, vertical slide 72, and encoder 154. The broken lines 152a and 154c indicate the mechanical coupling between both actuator 152 and encoder 154 with the vertical slide 72. Amplifier 150 is identical to the C axis amplifier 142 shown in FIG. 14, and valve 151 is a Moog series 76–104. Actuator 152 is a 12 inch stroke, 3 inch bore hydraulic cylinder manufactured by Parker-Hannifin, Des Plaines, Illinois. The encoder 154 is a model 29-10-BO3-750, manufactured by Dynamics Research Corporation, Wilmington, Mass., which is coupled to slide 72 via a rack and pinion to provide one pulse for every 0.001 inch movement of vertical slide 72. In operation, the Z axis servo system drives the vertical slide 72 in response to the Z position signals as applied by the control means 12.

d. P Axis Servo System

The P axis servo system is also shown in FIG. 13 in block diagram form. This system utilizes the computer 40 and the P axis interface 106 (in control means 12) and stepper drive module 155, stepping motor 157, dresser 32 and encoder 159 (all in machine tool 10). The broken lines 157a and 159a indicate the mechanical coupling between both the motor 157 and the encoder 159 to the dresser 32. In this embodiment, the stepper drive module 155 is a series 29-B-02 drive module manufactured by Sigma Instruments Incorporated, Braintree, Massachusetts. The stepping motor 157 is a series 20-3437-D200-FO-3A, also manufactured by Sigma Instruments. The encoder 159 is a model 29-10-BO3-200, manufactured by Dynamics Research Corporation, Wilmington, Mass., coupled by a rack and pinion to the dresser 32. In operation, the P axis servo system drives the dresser 32 in response to the P position signals applied by the control means 12.

B. Control Means

Figure 15:
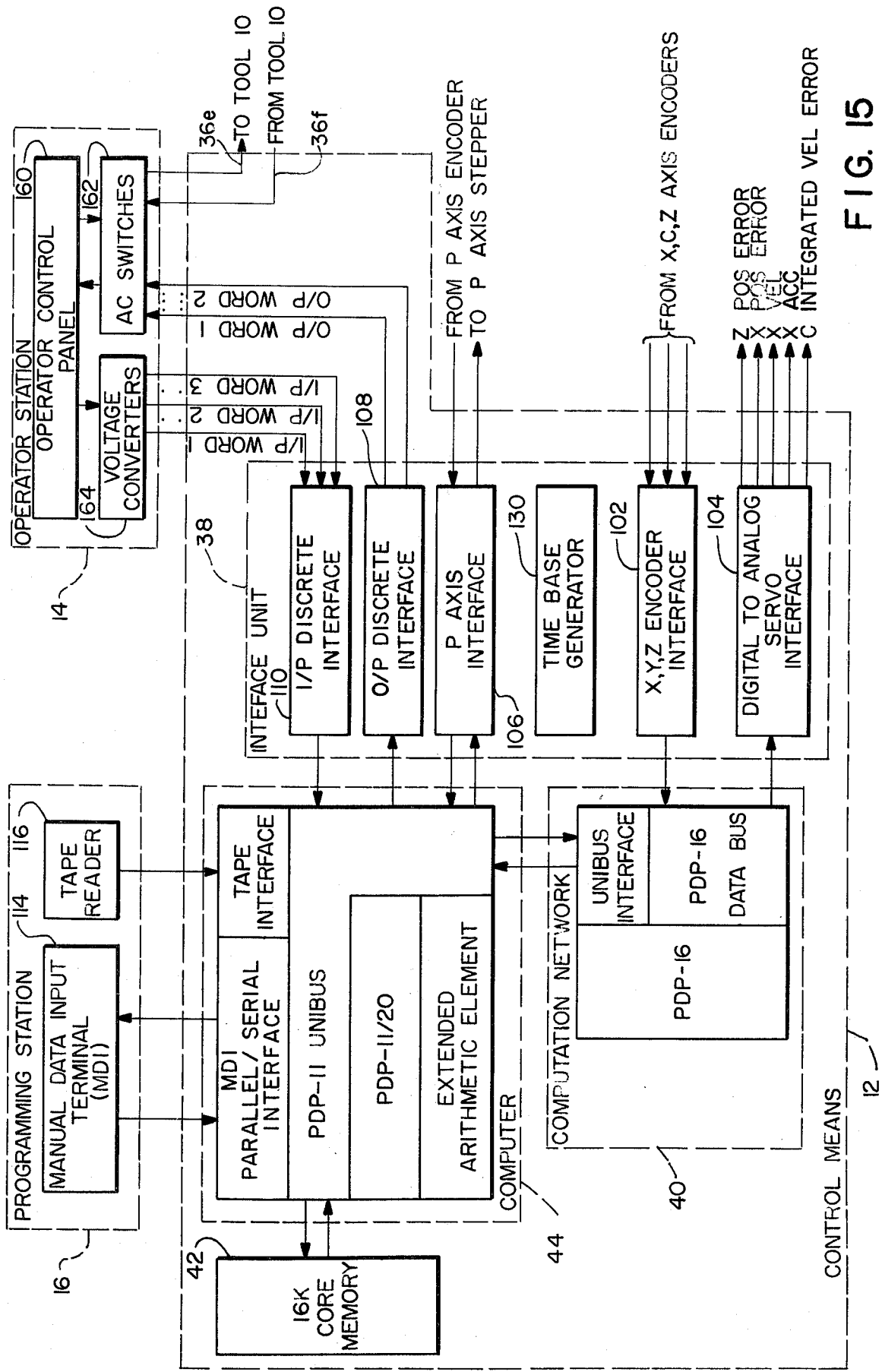
FIG. 15 shows in detailed block diagram form the control means, programming station, and operator station of the embodiment of FIG. 1.
Figure 16:
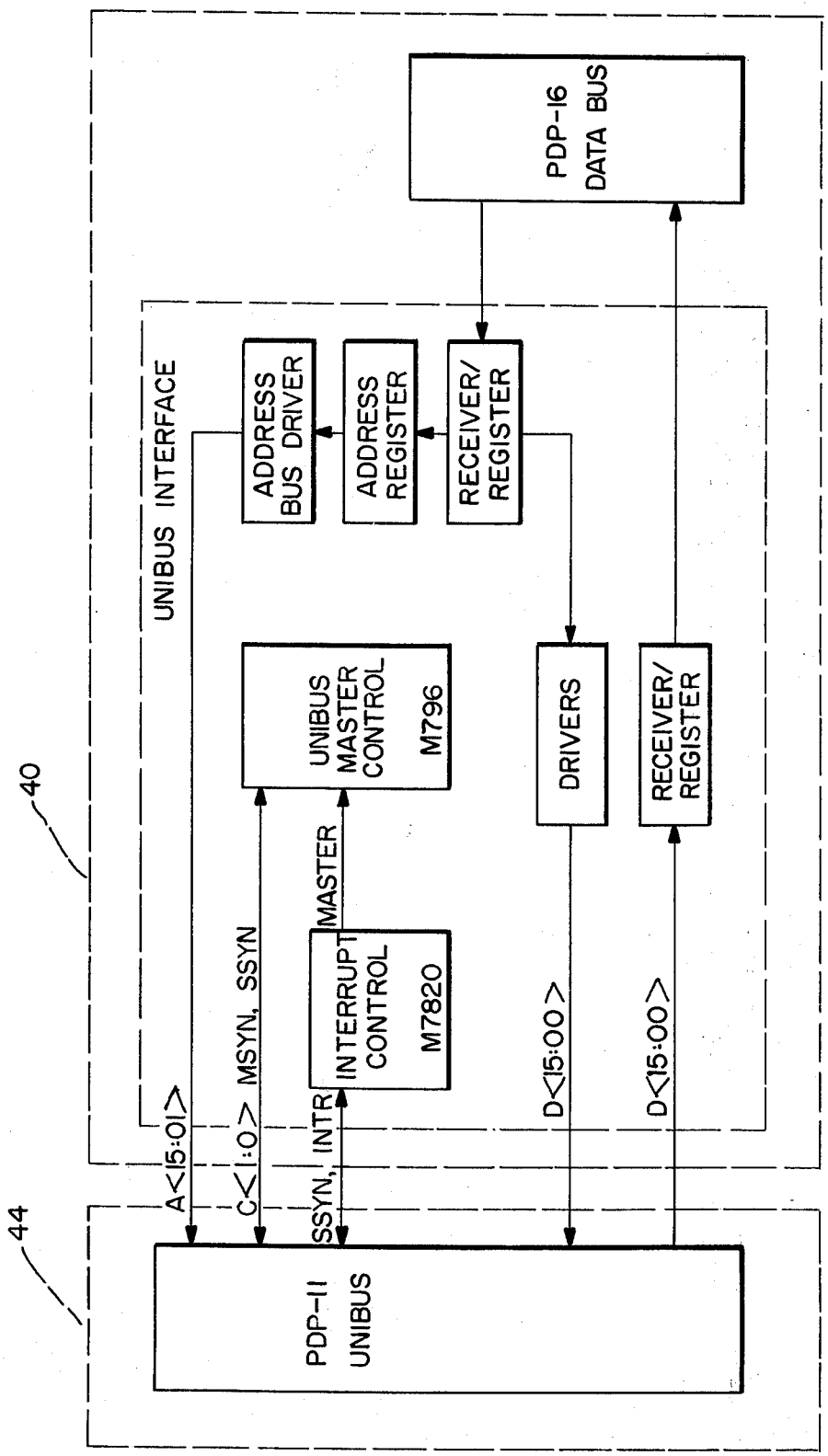
FIG. 16 shows in block diagram form the interconnection between the computation network and computer in the configuration of FIG. 15.

The control means 12 is shown in FIG. 15 in detailed block diagram form, together with the operator station 14 and programming station 16. The computer 44 comprises a programmed PDP-11/20 system and a type KE-11A Extended Arithmetic Element, both manufactured by Digital Equipment Corporation (DEC), Maynard, Massachusetts. The computation network 40 comprises a PDP-16 computer with a hard-wired program also manufactured by DEC. The memory system 42 comprises a core storage system having 16,384 words × 16 bits associated with the PDP-11. It will be understood that the indicated connection of network 40 and memory 42 (in FIG. 1) is accomplished by a connection from the data bus of computation network 40 via a unibus inter-face in network 40 and then by way of the computer 44 data bus (PDP-11 unibus). In this manner, the computation network 40 may access the memory 42. The unibus interface comprises standard DEC modules, configured as shown in block diagram form in FIG. 16, and described in the DEC "Unibus Interface Manual" and Part II of the DEC "Peripherals and Interfacing Handbook".

The interface unit 38 comprises an X, C, Z encoder interface 102 for transferring the position indicating data signals from the X, C, and Z axis position encoders to the computation network 40. The X axis portion of the encoder Interface 102 comprises a clocked quadrature decoder connected to an up-down counter (DEC M 236 modules).

Alternatively, a type 6019-6400 unit, manufactured by Dynamics Research Corporation, Wilmington, Mass., may be utilized to transform the X axis position encoder data to a form suitable for use by computer 44.

In addition, interface 38 includes the digital-to-analog servo interface 104 which transforms digital servo system command signals (applied from the data bus of the computation network 40) to analog form for the following signals: Z axis position, X axis position error, X axis velocity, X axis acceleration, and C axis integrated velocity error. These signals are subsequently applied to the servo systems (block 36 of FIG. 1) for the respective axis. The D-to-A converters of interface 104 are configured from DEC A 613 analog modules. The analog signals vary between plus or minus 5 volts and have a settling time less than 50 microseconds with a maximum output current of 10 milliamps.

Figure 17:
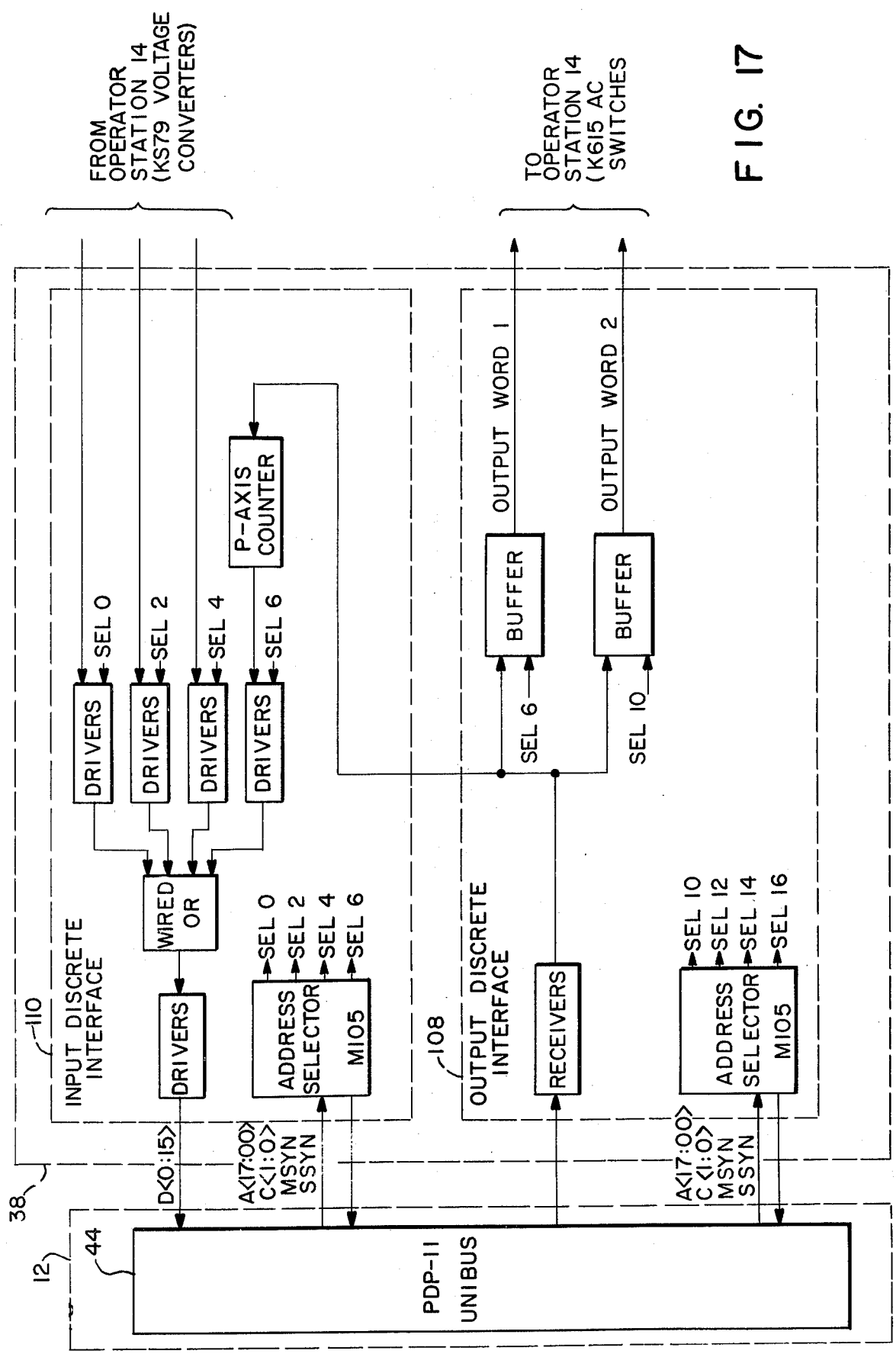
FIG. 17 shows in detailed block diagram form the interconnection between the operator station and control means in the configuraton of FIG. 15.

Input and output discrete interfaces 110 and 108 (shown in FIG. 17 in block diagram form) couple the PDP-11 to the operator control panel 160 of operator station 14. These interfaces utilize standard DEC modules configured in accordance with the DEC "Peripherals and Interface Handbook". The output discrete interface 108 transfers 24 output discrete signals from the DDP-11 unibus to associated a.c. switches 162 (type K 615 manufactured by DEC) at the operator station 14. The input discrete interface 110 transfers 48 input discrete signals from voltage convertors 164 (type K 579, manufactured by DEC) at operator station 14 to the PDP 11 unibus. Table III identifies the various input and output discrete signals for the present embodiment.

The P axis interface 106 (FIG. 15) provides a network for transferring dresser position signals from the P axis encoder to the PDP-11 unibus and also for transferring dresser command signals from the PDP-11 unibus to the P axis stepper drive motor.

In addition, the computer 44 is coupled to a manual data input terminal (MDI) 114 and a tape reader 116, both included in the programming station 16. The computer 44 includes parallel/serial interface networks between the MDI 114 and the PDP-11, and a tape interface between the tape reader 116 and the PDP-11.

The MDI 114 is a RTO1 terminal manufactured by Digital Equipment Corporation. The tape reader 116 is a Model RRSO305RX1/660/FRX/5000 (with PDP-11 interface), manufactured by Remex, Santa Ana, Calif.

The interface unit 38 further includes a time base generator/data synchronizer. Generator/synchronizer 130 includes a counter driven by a crystal controlled oscillator to provide a 5MHZ a clock pulse signal and an associated count down network to provide a signal making time periods of 2–11 seconds. It will be understood that both clock pulse signals are utilized throughout the control means 12.

In addition, generator/synchronizer 130 provides a data synchronizing function in control means 12 to accommodate the independent time bases associated with the various system elements. Data transfer from the PDP-11 unibus is synchronized through use of Master Sync and Slave Sync signals. The unibus master control (in the unibus interface) provides a master sync signal (MSYN) when data is awaiting transfer from the PDP-11 data bus. The receiving system detects the MSYN and generates a slave sync signal (SSYN) when synchronization is attained to transfer the data. Upon completion of the data transfer, the MSYN is discontinued by the unibus master control and, in response thereto, the SSYN is discontinued by the receiving system. The generator/synchronizer 130 synchronizes each of the encoder interfaces with the PDP-11 unibus by inhibiting the clock signal associated with the respective encoders until synchronism is attained.

TABLE III

| Bit No. | Code | Description | Mnemonic |
|---|---|---|---|
| | INPUT DISCRETE WORD ONE | | |
| 0–3 | 0000 | Axis Speed=1 or Dresser= Home/Reset | AM |
| | 0001 | Axis Speed=2 or Dresser= Rapid In | |
| | 0010 | Axis Speed=3 or Dresser = 100 In | |
| | 0011 | Axis Speed=4 or Dresser= 10 In | |
| | 0100 | Axis Speed=5 or Dresser= 1 In | |
| | 0101 | Axis Speed=6 or Dresser= 1 Out | |
| | 0110 | Axis Speed=7 or Dresser= 10 Out | |
| | 0111 | Axis Speed=8 or Dresser= 100 Out | |
| | 1000 | Axis Speed=9 or Dresser=Rapid Out | |
| 4 | 0 | Axis Direction is positive | AXDIR |
| | 1 | Axis Driection is negative | |
| 5–6 | 00 | Mode = Test — TESTMD | MODE |
| | 01 | Mode = Manual — MANMD | |
| | 10 | Mode = Override — OVERMD | |
| | 11 | Mode = Automatic — AUTOMD | |
| 7 | 0 | No emergency stop requested | EMER |
| | 1 | Emergency stop requested | |
| 8 | 0 | No cycle hold requested | HOLD |
| | 1 | Cycle hold requested | |
| 9 | 0 | No stop cycle requested | STOPC |
| | 1 | Stop cycle requested | |
| 10 | 0 | No cycles start requested | START |
| | 1 | Cycle start requested | |
| 11 | 0 | No jog selected axis requested | JOG |
| | 1 | Jog selected axis requested | |
| 12 | 0 | No Run selected axis requested | RUN |
| | 1 | Run selected axis requested | |
| 13 | 0 | No stop axis requested | STOP |
| | 1 | Stop axis requested | |
| 14 | 0 | Hydraulic pressure below limits | HYDRO |
| | 1 | Hydraulic pressure above limits | |
| 15 | 0 | Power off | POWER |
| | 1 | Power on | |
| Bit No. | Code | INPUT DISCRETE WORD TWO Description | Mnemonic |
| 0 | 0 | Table normal | TNF |
| | 1 | Table free | |
| 1 | 0 | No guard limit sensed | LSG |
| | 1 | Guard limit sensed | |
| 2 | 0 | No clamp limit sensed | LSC |
| | 1 | Clamp limit sensed | |
| 3 | 0 | Z axis below upper limit switch | ZULS |
| | 1 | Z axis at upper limit switch | |

TABLE III-continued

| Bit No. | Code | Description | Mnemonic |
|---|---|---|---|
| 4 | 0 | Wheel power low | WPS |
|  | 1 | Wheel power high |  |
| 5 | 0 | No manual dress requested | MD |
|  | 1 | Manual dress requested |  |
| 6 | 0 | Open guard request | GUARD |
|  | 1 | Close guard request |  |
| 7 | 0 | Open clamp request | CLAMP |
|  | 1 | Close clamp request |  |
| 8 | 0 | No dresser move requested | DM |
|  | 1 | Dresser move requested |  |
| 9 | 0 | Stop spindle | SSS |
|  | 1 | Start spindle |  |
| 10 | 0 | No manual coolant No. 2 requested | MC2 |
|  | 1 | Manual coolant No. 2 requested |  |
| 11 | 0 | No manual coolant No. 1 requested | MC1 |
|  | 1 | Manual coolant No. 1 requested |  |
| 12 | 0 | No table zero reset requested | TZR |
|  | 1 | Table zero reset requested |  |
| 13 | 0 | No floating zero reset requested | FZR |
|  | 1 | Floating zero reset requested |  |
| 14 | 0 | No reference zero reset requested | RZR |
|  | 1 | Reference zero reset requested |  |
| 15 | 0 | No dresser reset requested | DR |
|  | 1 | Dresser reset requested |  |

INPUT DISCRETE WORD THREE

| Bit No. | Code | Description | Mnemonic |
|---|---|---|---|
| 0–3 | BCD | Table slide offset low order digit | TSO |
| 4–7 | BCD | Table slide offset second digit |  |
| 8 | 0 | Positive table slide offset | TSOSGN |
|  | 1 | Negative table slide offset |  |
| 9–11 | 000 | Axis = Home — AXSH | AXS |
|  | 001 | Axis = Z — AXSZ |  |
|  | 010 | Axis = P — AXSP |  |
|  | 011 | Axis = X — AXSX |  |
|  | 100 | Axis = C — AXSC |  |
| 12 | 0 | Vertical drive in Feed | VSDS |
|  | 1 | Vertical drive in oscillate |  |
| 13 | 0 | MDI switch in setup | MDI |
|  | 1 | MDI switch in operate |  |
| 14 | 0 | Stop after executing a block | RCB |
|  | 1 | Don't stop after executing a block |  |
| 15 | 0 | Guard mode manual | GMA |
|  | 1 | Guard mode automatic |  |

OUTPUT DISCRETE WORD ONE

| Bit No. | Code | Description | Mnemonic |
|---|---|---|---|
| 0 | 0 | Don't indicate incorrect reset | OIR |
|  | 1 | Indicate incorrect reset |  |
| 1 | 0 | Don't indicate table motion error | OTM |
|  | 1 | Indicate table motion error |  |
| 2 | 0 | Don't indicate wheel not dressed error | OWND |
|  | 1 | Indicate wheel not dressed error |  |
| 3 | 0 | Not under minimum wheel diameter | OUWHL |
|  | 1 | Under minimum wheel diameter |  |
| 4 | 0 | Not over maximum wheel diameter | OWHL |
|  | 1 | Over maximum wheel diameter |  |
| 5 | 0 | X axis control within tolerance | OAE |
|  | 1 | X axis control out of tolerance |  |
| 6 | 0 | Open guards |  |
|  | 1 | Close guards | OG |
| 7 | 0 | Open clamps |  |
|  | 1 | Close clamps | OCC |
| 8 | 0 | Indicate not override mode | OVER |
|  | 1 | Indicate override mode |  |
| 9 | 0 | not used |  |
|  | 1 | not used |  |
| 10 | 0 | No coolant No. 2 | OC2 |
|  | 1 | Supply coolant No. 2 |  |
| 11 | 0 | No coolant No. 1 | OC1 |
|  | 1 | Supply coolant No. 1 |  |

OUTPUT DISCRETE WORD TWO

| Bit No. | Code | Description | Mnemonic |
|---|---|---|---|
| 0–3 |  | Not Used |  |
| 4 | 0 | Allow normal X axis operation | O4 |
|  | 1 | Hold X axis on left, (-) stop |  |
| 5 | 0 | Indicates axis is not P | OD |
|  | 1 | Indicates axis in P |  |
| 6 | 0 | Indicates mode is not manual | OM |
|  | 1 | Indicates mode is manual |  |
| 7 | 0 | Indicates cycle not in process | OCOH |
|  | 1 | Indicates cycles in process |  |
|  | Alternative | Indicates cycle holding |  |
| 8 | 0 | Indicates X below low set-up point | OXH |
|  | 1 | Indicates X above low set-up point |  |
| 9 | 0 | Indicates X above high set-up point | OXL |
|  | 1 | Indicates X below high set-up point |  |
| 10 | 0 | No power to spindle | OSP |
|  | 1 | Supply power to spindle |  |
| 11 | 0 | No power to controller | OCP |

TABLE III-continued

| 1 | Supply power to controller |

1. Computer 44

The computer 44 comprises a PDP-11/20 computer with an Extended Arithmetic Element. The computer 44 is programmed with a main Program which includes an Executive Program and the following six sub-programs: Part Program Loader, γ-C-V Table Generator, Manual Data Input, Axis Motion Control, Discrete Processor, and Part Program Executer. The Executive Program allows interlocks between and scheduling of the several tasks to be performed by each of the sub-programs. The sub-programs direct the specific functions necessary for the tasks which control the machine tool operations. A listing for the Main Program is shown below in Appendix I. A Table of Contents for that listing (which indexes the various sub-programs and the Executive Program to the line numbers of the Main Program listing) is shown in Table III.

TABLE IV

TABLE OF CONTENTS

| | |
|---|---|
| 5 | PROGRAMMABLE COMPUTER CONTROL SOFTWARE |
| 51 | SYSTEM DEFINITIONS |
| 510 | 0. EXECUTIVE PROGRAM |
| 828 | 1. PART PROGRAM LOADER |
| 1785 | 1.1 SPECIALIZED CONVERSION ROUTINES |
| 1940 | 1.2 PAPER TAPE READER ROUTINE |
| 1995 | 2. X-C TABLE GENERATOR |
| 2785 | 2.1 TRANSCENDENTAL FUNCTION ROUTINES |
| 3064 | 3. MANUAL DATA INPUT PROGRAM |
| 3795 | 3.1 COMMAND BUFFER ROUTINES |
| 3897 | SET UP TABLES |
| 3940 | 4. AXIS MOTION CONTROL |
| 3946 | 4.1 OSCILLATE Z AXIS DRIVER |
| 3992 | 4.2 HOME AXES DRIVER |
| 4066 | 4.3 C-X AXIS MOTION ROUTINE |
| 4257 | 4.4 X AXIS MOTION ROUTINE |
| 4354 | 4.5 Z AXIS MOTION ROUTINE |
| 4468 | 4.6 P AXIS MOTION ROUTINE |
| 4591 | 4.7 SPECIAL ROUTINES |
| 4616 | 5. DISCRETE PROCESSOR |
| 5299 | 5.1 BASIC TEST ROUTINE |
| 5368 | 6. PART PROGRAM EXECUTER |
| 6034 | SYSTEM INITIALIZATION |
| 6182 | SYSTEM TABLES |
| 6675 | SYSTEM TASK HEADERS |
| 6716 | SYSTEM SEMAPHORES |
| 6800 | | a. Executive Program

The Executive Program provides an interface between the hardware and the software and provides scheduling, processes interrupts, provides interlocks, and provides time delays as requested by the tasks. The Executive Program is a multiuse routine and is logically separable from the sub-programs.

b. Part Program Loader Subprogram

The Part Program Loader Sub-program is activated in response to an operator generated signal produced at the Manual Data Input terminal (MDI) 114. In response thereto, the computer 44 activates the tape reader 116 and effectively reads the eight-level paper tape encoded EIA characters that represent the Part Program (i.e. the Part Process and Part Description) for a particular part-to-be-machined (i.e. workpiece) on a machine tool 10. The present embodiment utilizes EIA standard RS244A for character code with EIA standard RS274 format. The Part Program as applied by the tape reader 116 includes three portions: the Header, the Body (comprising the Part Process) and the Part Description. The Header portion of the tape data (with code numbers, part numbers and limiting parameters) is stored in table form in the memory 42 and denoted as the Machine Status Block. Similarly, the Body data (with the Part Process) and the Part Description data are also stored in table form in the memory 42. The Head, Body and Part Description will be more fully described together with an exemplary Part Program in a separate section below.

c. γ-C-V Table Generator Sub-Program

The γ-C-V Table Generator Sub-program is effective to transform the ΔR-Δθ-Δα data (as stored in the Part Description Table in the memory 42) to γ-C-V data, and to store that γ-C-V data in table form in the memory 42 for subsequent use by the computation network 40. As noted above in the Description of System Operation, each block of Part Description (ΔR-Δθ-Δα) data is transformed to a corresponding block of γ-C-V data. Accordingly, for the $n^{th}$ contour point defined for the desired workpiece contour, the γ-C-V Table Sub-program generates and stores three words, $\gamma_n$, $C_n$, and $V_n$.

The first word, $\gamma_n$, is representative of the angle of the support table 24 about the C axis relative to the C axis angular zero 55 when the cutting element 20 has a lateral surface point in contact with the $n^{th}$ contour point defined by the associated ΔR-Δθ-Δα data block, with the cutting element 20 being aligned with the workpiece at the associated pressure angle, αn. This first word is determined by the computer 44, as programmed by the Δ-C-V Table Generator Sub-program, in accordance with the following expressions:

$$\gamma_n = \theta_n + \phi_n,$$

where $\theta_n$ is defined as $$\theta_n = \sum_{i=1}^{n} \Delta\theta_i ,$$

with each $\Delta\theta_i$ being equal to the same constant (e.g. 0.1°) and being representative of the angular displacement between successive desired workpiece contour points and where $\phi_n$ (as defined in FIG. 2) is determined from:

$$\phi_n = \sin^{-1}(\frac{W_r}{X_n} \sin \alpha_n) = \tan^{-1} \frac{W_r \sin \alpha_n}{\sqrt{X_n^2 - W_r^2 \sin^2 \alpha_n}}$$

The second word, $C_n$, is representative of the ratio of the change in X to the change in $$\gamma, \frac{\Delta X_n}{\Delta \gamma_n},$$

where the values $\Delta X_n$ and $\Delta \gamma_n$ correspond to the required changes in support table 24 position to move the contact point from the contour point associated with the $n^{th}$ ΔR-Δθ-Δα data block to the contour point associated with $n+1^{th}$ ΔR-Δθ-Δα data block. The second word is determined in accordance with the expressions:

$$C_n = \frac{X_{n+1} - X_n}{\gamma_{n+1} - \gamma_n}$$

where, for internal parts, $$X_n = \sqrt{R_n^2 W_r^2 - 2R_n W_r \cos \alpha_n}$$

and, for external parts, $$X_n = \sqrt{R_n^2 + W_r^2 + 2R_n W_r \cos \alpha_n}.$$

The third word, $V_n$, is representative of the angular velocity of the support table 24 about the C axis which is required to achieve the surface velocity $V_s$ which is specified for the contact point along the workpiece contour. The third word is determined from:

$$V_n = V_s \cos \alpha_n \frac{\gamma_n - \gamma_{n-1}}{R_n \Delta \theta}.$$

In addition, to calculating the γ, C, and V for each contour point represented in the Part Description Table, the γ-C-V Table Generator sub-program may add or delete γ-C-V data blocks. Such blocks are added if the difference in slope between two intervals specified by the Part Description is likely to cause a significant error in the generated X command. Points are deleted if the table rotational velocity is great enough that the data point is likely to be skipped entirely.

Generally, the jigging of the workpiece on support table 24 is accomplished in a manner having θ=0 of the workpiece (in the part description) out of alignment with the C axis angular zero (i.e. γ=0 of the support table 24). This misalignment is corrected by the computer 40 following the calculation of the γ-C-V table by "rotating" (in core memory 42) the γ-C-V Table so that the first entry in that table is γ=0. In alternative embodiments, a "pointer" notation may be utilized to effectively align the workpiece with the support table.

d. Manual Data Input Sub-program

In response to a change in status of the key board at MDI 114, the Manual Data Input Sub-program, computer 44 receives data from MDI 114. By proper sequencing of the keyboard operation, data transferred to the computer 44 via the MDI 114 may be stored as the Override Table in memory 42. Access to this table by the Part Program Executer (described below) is available only when the "override mode" signal is applied to control means 12 from the operator station 14. The MDI-introduced data does not change the Part Program loaded through the tape reader 116 and thus reversion to the "normal" mode (from "override") directs computer 44 to follow the original Part Program.

e. Axis Motion Control Sub-program

Although the computation network 40 provides the actual control signals to the X, C and Z axis servo systems, the computer 44 influences these signals in accordance with the Axis Motion Control Sub-program comprising five control routines. There is an axis motion control routine for the X-C axis combination and for each of the X, C, Z and P axes. There are also two drivers (oscillate Z and home axis drivers) which are the axis motion routines to perform a combination of functions.

The C-X axis motion routine has four separate functions. The contents of a register (denoted R3) in computer 44 determines which of these functions is performed. The first function, indicated by 0 stored in register R3, directs the computation network 40 to generate X and C axis control signals which first move support table 24 along and about the X and C axes in accordance with a dummy γ-C-V Table to a specified γ value. The routine then directs "stop" and indicates "done". The dummy γ-C-V table includes entries from which network 40 directs the table 24 to rotate at a constant rate.

In response to a 1 in register R3, network 40 indicates "done" when set up on the dummy γ-C-V Table. In this case, the computation network 40 directs motion according to a dummy table γ-C-V dummy table until a further directive is received. Such a directive may be generated by the Discrete Processor to effect operator-directed manual motions.

In response to a value of 2 in register R3, the C-X axis motion routine starts the "hardware algorithm" operation (as described below) on the Part Description Table. The routine indicates "done" when the contour points associated with the entire Part Description Table (and γ-C-V Table) have been reached by cutting element 20. The coordinated rotational and translational motion of the table 24 is accomplished according to the Part Description and utilizing the stored feedrate.

A −1 in register R3 instructs the network 40 to direct the rotation support table 24 for specified number of full revolutions in accordance with the Part Description table and the hardware algorithm and then indicate "done". This function is used by the Part Program Executor for dwelling, as described below.

The X axis motion routine controls the U (offset) variable in the X position data block. The desired X position comprises the sum of the X value (controlled by the Part Description Table) and the U (offset) value controlled by this routine. A 0 in R3 directs motion of support table 24 along the X axis at the specified feedrate to a specified U value and stop and then indicate "done". The sign of the feedrate is adjusted to direct motion in the proper direction to achieve the desired U value.

In response to a 1 in the register R3, the routine establishes the desired feedrate and indicates "done". This operation may be activated by the Discrete Processor for manually directed motion of support table 24.

If the register R3 contains a −1, the routine direct motion of table 24 along the X axis and indicates "done" upon reaching a U value. However, the routine does not set the feedrate to zero so as to stop further motion.

When the register R3 contains a 2 the routine will stop at the U value. This function is utilized by the Part Program Executor in conjunction with a special command sequence. The stop value and the feed rate are stored for this motion routine.

The Z axis motion routine performs the same functions as the X axis motion routines for values of 0, 1 and −1 in control register R3. However, a 2 in control register R3 directs an operation similar to that directed by a 0, wherein the cutting element 20 is directed along the Z axis to a stop value. However, after reaching that stop value, the cutting element remains stationary until the Z axis error signal is reduced to a predetermined tolerance. Thereafter, cutting element 20 remains stationary for a specified dwell time before the sub-program indicates done. This operation is utilized in conjunction with the Z Oscillate Driver to prevent effective oscillation limits from being a function of the Z feedrate and to achieve good cutout at the top and bottom of the part.

A control value of 3 in register R3 directs the Z axis motion to stop when an upper limit signal is received. This control value directs the cutting element 20 to translate along the Z axis to the home position.

In a manner similar to the X axis motion routine, the feedrate, stop, and dwell time value, are stored in memory 42.

The P axis motion routine always operates in the same manner, wherein the register R1 contains a desired change in dressing element 32 position. The P axis motion routine will indicate "done" when the change has been achieved. This routine determines, based on the amount of change specified, whether to run in one of three modes. The first mode is for changes of less than 20 pulses (with each pule representing a predetermined incremental distance). In this case, the computer 44 applies a pulse the P axis stepper motor drive every 10 milliseconds until the desired change is achieved. In this case, the encoder of the P axis is only used to check for achieving the desired position.

If the change requested is between 20 pulses and 3,200 pulses, the normal speed control is used. In this mode the encoder is used to generate further pulses to a stepper motor until the desired change is achieved. Normally the stepper will overshoot about 7 pulses, but the routine is pre-compensated to avoid this overshoot.

For larger changes the feed scheme for normal speed is used, but after the stepper motor is running, a pulse is added. This causes the stepper to run at a rate greater than 5,000 pulses per second. In the third mode, the overshoot is large but is precompensated. The remaining move is achieved by one of the slow speed modes of operation.

The oscillate Z driver uses the Z axis motion routine to oscillate between two values that are transferred in registers when called by the Part Program Executer. This oscillation will continue until the stop oscillation flag is set. When this flag is set, the Z axis returns to the lower limit and indicates done.

The Home axis driver uses the motion routines to drive all axes home. This routine is used by the discrete Processor.

f. Discrete Processor Sub-Program

The Discrete Processor sub-program directs computer 44 to evaluate discrete conditions. Discretes are "off-on" type functions such as reset actions, start-stop coolant, wheel spindles, workpiece clamps. This sub-program monitors the status of all discretes every 0.08 seconds to determine if a change has taken place in a discrete condition between successive monitoring periods or a different discrete has been set, or a routine scheduled to move an axis.

There are two types of discretes: Output or Input. Output discretes are conditions set by the computer 44. Input discretes are conditions indicated to the computer 44 by automatic or manual means (from operator station 14 or tool 10).

The Discrete Processor sub-program also directs condition monitoring of the general condition of the machine tool 10 every 0.08 seconds and upon detection of predetermined conditions corrective steps may be initiated or the system may be shut down. Such monitoring operations include checks of panel switches and the following:

1. monitoring the support table 24 zeroing action which ensures correct angular relationship of the workpiece with respect to C axis angular zero.
2. monitoring the translating slide 66 zeroing action.
3. monitoring the Dresser zeroing action to ensure correct cutting element diameters.
4. monitoring hydrostatic bearings to warn of illegal motion without pressure that could result in damaged bearings,
5. monitoring the cross-slide (X axis) position to ensure that the X axis error signal is below a preset value,
6. monitoring the cutting element power consumption, and
7. monitoring the wheel diameter via the dresser position.

g. Part Program Executer Sub-program

The Part Program Executer steps through any part program Body tables stored in memory 42 and directs the performance of functions specified for as many as six machine tools (similar to tool 10) that are connected to control means 12. In response to the sub-program, computer 44 sets discretes as required by the associated Body table, indicates the need for the Axis Motion Program to function, calls for P axis dressing motions and activates the X-C Table Generator sub-program to calculate new γ-C-V Table values.

2. Computation Network

The computation network 40 comprises a PDP-16 minicomputer. Network 40 is hard-wired to perform a series of high speed calculations in accordance with the "hardward algorithm" whereby the actual position of the support table 24 along and about the X and C axes is monitored approximately every 0.5 milliseconds and appropriate corrective control signals generated for application to the various servo systems during the next interrogation interval. These corrective signals are determined according to an interpolative process, as described above in the Description of System Operation, in order to maintain the contact point between the cutting element 20 and the workpiece along the desired workpiece contour (i.e. defined by the piecewise linear path connecting the contour specified by the Part Description, as modified by the offset and feedrate parameters). Appendix II includes a wire list for the point-to-point hardwiring of the PDP-16 in the present embodiment.

The effect of the operation of computation network 40 is to provide the computational speed required for the contouring operation, and also reduce the computational load on the computer 44 so that the computer may control as many as six machine tools at the same time, with each machine tool having an associated computation network (and interface) interconnected with the single computer 44.

It will be understood that each computation network may access the memory 42 by way of the unibus interface portion of network 40 and the data bus of computer 44 (PDP-11 unibus). There are two levels of interface between each computation network and computer 44. On the first level, the computation network 40 includes flip-flop storage locations for three control words, the discrete algorithm control word and the discrete P axis control and data words. The computer 44 treats these locations as part of its own memory, although these flip-flops can be set or reset by either the computer 44 or network 40. The network 40 further includes three output discrete word registers and two input discrete word registers, all of which are also referenced as computer 44 memory.

The second level of interface is a direct memory access arrangement. At this level, the network 40 controls access to the memory 42 and may draw constants from locations in that memory. Such constants may be required for calculations by network 40. In addition, network 40 may also store data requested by computer 44 in the memory 42. Table V shows memory addresses utilized by network 40 for as many as six computation networks.

TABLE V

| BASE ADDRESS DEFINITIONS | | |
|---|---|---|
| Computation Network Number | K Octal | C Octal |
| 1 | 20000 | 196400 |
| 2 | 20100 | 196420 |
| 3 | 20200 | 196440 |
| 4 | 20300 | 196460 |
| 5 | 20400 | 196500 |
| 6 | 20500 | 196520 |

| MEMORY LOCATIONS IN COMPUTATION NETWORK 40 | |
|---|---|
| Name | Address in Octal |
| Discrete Input Word 1 | C+0 |
| Discrete Input Word 2 | C+2 |
| Discrete Input Word 3 | C+4 |
| Discrete Output Word 1 | C+6 |
| Discrete Output Word 2 | C+10 |
| Discrete P-Axis Control Word | C+12 |
| Discrete Algorithm Control Word | C+14 |
| Discrete P-Axis Data Word | C+16 |

COMPUTATION NETWORK MEMORY ACCESS

| Network 40 → Memory 42 | | | |
|---|---|---|---|
| Address In Computation Network 40 | | Address In Memory 42 | Variable |
| | K+ | | |
| Decimal | Octal | Decimal | |
| 0 | 40 | 32 | TIME |
| 1 | 42 | 34 | XP |
| 2 | 44 | 36 | U |
| 3 | 46 | 38 | XD |
| 4 | 50 | 40 | PT/2 |
| 5 | 52 | 42 | XV |
| 6 | 54 | 44 | XA |
| 7 | 56 | 46 | TIME |
| 8 | 60 | 48 | V |
| 9 | 62 | 50 | HGAMMA |
| 10 | 64 | 52 | EGAMMA |
| 11 | 66 | 54 | PT/2 |
| 12 | 70 | 56 | VCH |
| 13 | 72 | 58 | TIME |
| 14 | 74 | 60 | ZD |
| 15 | 76 | 62 | ZE |

COMPUTATION NETWORK MEMORY ACCESS

| Memory 42 | Network 40 |
|---|---|
| CONTROL TABLE | |
| Address In Memory 42 | Variable |
| PTZ − 6 | $\gamma_1 = 0$ |
| PTZ − 4 | $C_{x1} = CX$ |
| PTZ − 2 | $C_{v1} = CV$ |
| PTZ | $\gamma_2 = $ GAMMA |
| PTZ + 2 | $C_{x2}$ |
| PTZ + 4 | $C_{v2}$ |
| ⋮ | ⋮ |
| PTZ + N*6 | $\gamma_N$ |
| PTZ + N*6+2 | $C_{xN}$ |
| PTZ + N*6+4 | $C_{vN}$ |
| PTZ + N*6+6 | 1777778 |
| Address in Memory 42 | Variable |
| K | CZ |

TABLE V-continued

| K+2 | F |
|---|---|
| K+4 | TVAL |
| K+6 | XD |
| K+8 | XV |
| K+10 | XA |
| K+12 | VCH |
| K+14 | ZD |
| K+16 | HGAMMA |
| K+18 | EGAMMA |
| K+20 | PT/2 |
| K+22 | PTZ/2 |
| K+24 | U |
| K+26 | Not used |
| K+28 | START ADDRESS FOR INPUT |
| K+30 | -NUMBER TO BE TRANSFERRED |

Figure 18A:
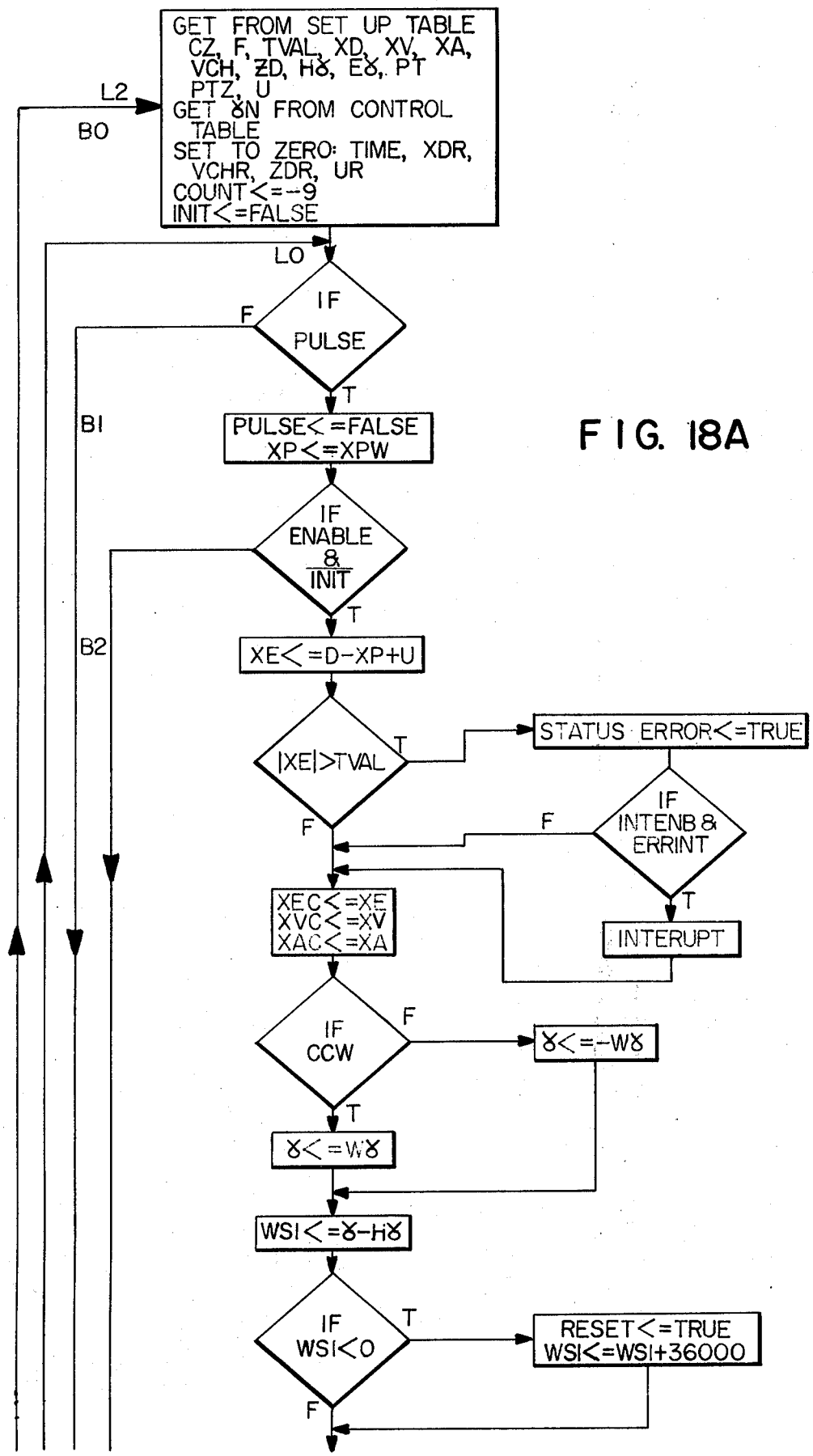
FIGS. 18A–C show in flow chart form, the algorithm followed by the computation network in the control means of FIG. 15.
Figure 18B:
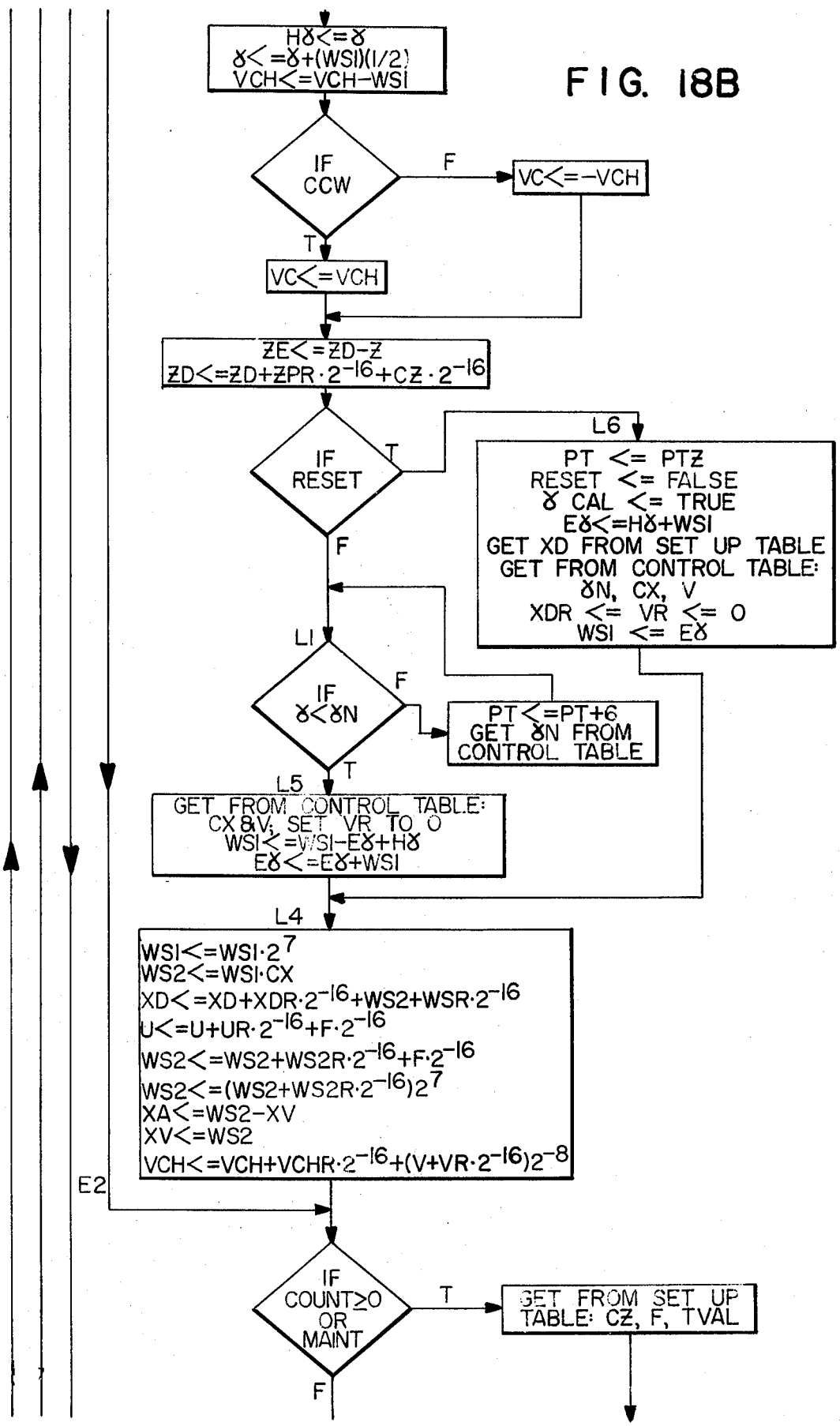
Figure 18C:
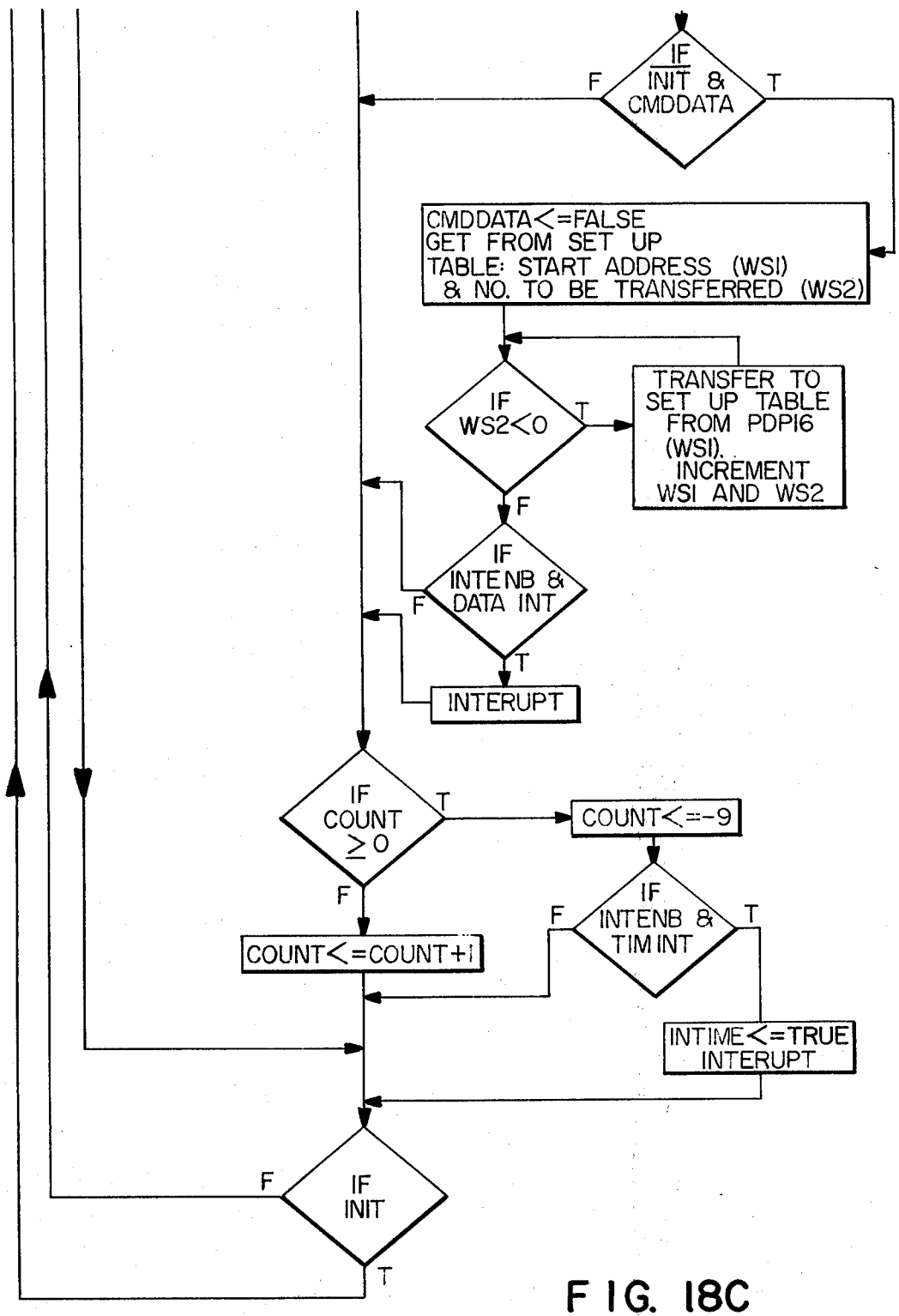

Table VI-A shows the hardware algorithm of the computation network 40 as written in the ALGOL language and Table VI-B includes symbol definitions used in the algorithm. FIGS. 18A–C shows the algorithm in flowchart form.

It will be understood that for each desired contour point set forth in the Part Description, a $\gamma$ value and associated C and V values are stored in the $\gamma$-C-V table in memory 42, (except for points added and deleted, as described above in conjunction with the $\gamma$-C-V Table Generator Sub-program). As noted above, X is the X axis position of support table 24 and $\gamma$ is the angular displacement of the support table 24 about the C axis. Accordingly, $C_n$ equals $$\frac{X_{n+1} - X_n}{\gamma_{n+1} - \gamma_n}$$

and is representative of the ratio of the change in X to the change in $\gamma$ required to reposition the contact point from the $n^{th}$ contour point. Similarly, $V_n$ equals $$\frac{d\gamma}{dt}$$

required to achieve this repositioning at the desired surface velocity. The primary function of the hardware algorithm is to perform the operations described above in the section entitled Description of System operation. This includes the determination of the appropriate $\gamma$-C-V Table entry to be used in the calculation and the calculation of the X axis position error signal $X_E$, X axis velocity signal $X_V$, X axis acceleration signal $X_A$, and the C axis velocity error signal $V_C$. The algorithm further determines the Z axis position error signal. In addition, the algorithm directs reset operation each time the C axis passes through the C axis angular zero in order to remove accumulated error. Referring to the hardware algorithm flowchart (FIGS. 18A–C), the operation of the algorithm will now be briefly described.

Starting from the label L2, the set up table initialization is accomplished by transferring the contents of the indicated memory locations to the set up table locations. This portion of the algorithm is used only when power is brought up. The values drawn from the computer memory are such that no motion occurs at the machine tool 10 if the machine was left properly in home position.

The L0 label indicates the normal return point for the algorithm. The first decision point is used to establish the basic timing of the algorithm. At the start of each interrogation interval and thereafter, once every $2^{-11}$ seconds (approximately 0.5 milliseconds), the time base generator 130 sets PULSE location equal to "true". Until this occurs, the algorithm merely checks for that condition. When the algorithm finds PULSE equal to true, the PULSE location is reset and the algorithm reads the X axis position encoder. Consequently, the X axis encoder signal is transferred into the computer even when the hardware algorithm is not enabled by the Axis Motion Sub-Program of Computer 44.

At this point in time, if the algorithm has not been enabled, control is transferred around the servo loop calculations and only timing interrupts and data transfers are performed. Normally, the encoders are read and monitored for excessive X axis error. Then, the C axis reading is evaluated to determine if the C axis encoder has passed through the transition from 360° to 0°. If so, control is transferred to label L6 where the γ-C-V table pointer is returned to the first table entry and the value of X for γ equal to 0 is restored in the hardware algorithm memory (from the memory 42). If the C axis has not been reset, a search is made in the γ-C-V Table for the correct C and V values to use in determining the $X_E$, $X_V$, $X_A$ and $V_C$ machine tool drive data for application to the X and C axis servo systems during the next interrogation interval.

Thereafter, control goes to label L4. This portion of the algorithm is the merging point for the two paths determined by whether the C axis has been reset or not. The desired positions for support Table 24 are calculated and stored for the next entry into the algorithm.

Determination is now made as to whether the algorithm is either in the "maintenance mode" or in the tenth pass through the algorithm during an interrogation interval. If neither of these is true, data transfer is not considered. Normally, the algorithm is not run in maintenance mode and consequently, data requested by the computer 44 is only transferred once every $2^{-11} \times 10$ seconds (approximately 5 milliseconds). At these points in time, the Z axis feedrate and the X axis tolerance values are read again from the memory 42.

Subsequently, if data is requested by computer 44, that data is transferred thereto whereby the computer 44 is interrupted if requested. If the algorithm is in the tenth pass during an interrogation interval, the computer 44 is interrupted with a time interrupt. If an initialization is requested by computer 44, control is transferred back to label L2; otherwise, control is transferred back to label L0 and the algorithm awaits the start at the next interrogation interval.

TABLE VI-A

```
            HARDWARE ALGORITHM
         BEGIN                                      B0
L2:CZ    ← PDP11OUT (K);
         F ← PDP11OUT (K+2);
         TVAL ← PDP11OUT (K+4);
         TIME ← 0;
         XD ← PDP11OUT (K+6);
         XDR ← 0;
         XV ← PDP11OUT (K+8);
         XA ← PDP11OUT (K+10);
         VCH ← PDP11OUT (K+12);
         VCHR ← 0;
         ZD ← PDP11OUT (K+14);
         ZDR ← 0;
         HGAMMA ← PDP11OUT (K+16);
         EGAMMA ← PDP11OUT (K+18);
         PT ← PDP11OUT (K+20);
         PTZ ← PDP11OUT (K+22);
         U ← PDP11OUT (K+24);
         UR ← 0;
         GAMMAN ← PDP11OUT (PT);
```

TABLE VI-A-continued

```
         COUNT ← −9;
         INIT ← FALSE;
L0:      IF PULSE THEN
         BEGIN                                      B1
         PULSE ← FALSE;
         XP ← XPW;
         IF ENABLE AND NOT INIT THEN
            BEGIN                                   B2
            XE ← XD−XP+U;
            IF XE GT TVAL OR XE LT −TVAL THEN
               BEGIN
               STATUSERR ← TRUE;
               IF INTENB AND ERRINT THEN INTERUPT
               END;
            XEC ← XE;
            XVC ← XV;
            XAC ← XA;
            IF CCW THEN GAMMA ← −WGAMMA ELSE
            GAMMA ← WGAMMA;
            WS1 ← GAMMA−HGAMMA;
            IF WS1 LT −32768 THEN
               BEGIN                                B3
               RESET ← TRUE;
               WS1 ← WS1+36000
               END;                                 E3
            HGAMMA ← GAMMA;
            GAMMA ← GAMMA+WS1*2**−1;
            VCH ← VCH−WS1;
            IF CCW THEN VC ← VCH ELSE VC ← −VCH;
            ZE ← ZD−Z;
            ZEC ← ZE;
         ZD ← (ZD+ZDR*2**−16)+CZ*2**−16;
         IF RESET THEN GOTO L6;
L1:IF    GAMMA LT GAMMAN THEN GOTO L5;
         PT ← PT+6;
         GAMMAN ← PDP11OUT(PT);
         GOTO L1;
L5:CX    PDP11OUT(PT−4);
         V ← PDP11OUT(PT−2)
         VR ← 0;
         WS1 ← WS1−EGAMMA+HGAMMA;
         EGAMMA ← EGAMMA+WS1;
L4:WS1   WS1*2**7;
         WS2 ← WS1*CX;
         XD ← (XD+XDR*2**−16)+(WS2+WS2R*2**−16);
         U ← (U+UR*2**−16)+F*2**−16;
         WS2 ← (WS2+WS2R*2**−16)+F*2**−16;
         WS2 ← (WS2+WS2R*2**−16)*2**7;
         XA ← WS2−XV
         XV ← WS2;
         IF NOT VSTP THEN VCH ← (VCH+VCHR*2**−16)+
         (V+VR*2**−16)*2**−8 END;                   E2
         IF COUNT GTE O OR MAINT THEN
            BEGIN                                   B4
            CZ ← PDP11OUT(K);
            F ← PDP11OUT(K+2);
            TVAL ← PDP11OUT(K+4);
            IF NOT INIT AND CMDDATA THEN
               BEGIN                                B5
               CMDDATA ← FALSE;
               WS1 ← PDP11OUT(K+28);
               WS2 ← PDP11OUT(K+30);
L3:IF WS2 LT O THEN
               BEGIN                                B6
               (PDP11IN(K+32+WS1*2**1)
               MEM(WS1);
               WS1 ← WS1+1;
               WS2 ← WS2+1;
               GOTO L3
               END                                  E6
            IF INTENB AND DATAINT THEN
            INTERUPT
            END                                     E5
         END;
         IF COUNT GTE O THEN                        E4
            BEGIN                                   B7
            COUNT ← −9;
         IF INTENB AND TIMEINT THEN
            BEGIN                                   B8
            INTTIME ← TRUE;
            INTERUPT;
            END;                                    E8
         END                                        E7
         ELSE COUNT ← COUNT+1
         END;                                       E1
         IF INIT THEN GOTO L2;
         GOTO L0;
L6:PT    ← PDP11OUT(K+22)
         RESET ← FALSE;
         GAMCAL ← TRUE;
         EGAMMA ← HGAMMA+WS1;
         CX ← PDP11OUT(PT−4);
         V ← PDP11OUT(PT−2);
```

TABLE VI-A-continued

```
GAMMAN ← PDP11OUT(PT);
XD ← PDP11OUT(K+6);
WS1 ← EGAMMA;
XDR ← VR ← 0;
GOTO L4
END;                                                           E0
```

TABLE VI-B

NOMENCLATURE FOR HARDWARE ALGORITHM

| | |
|---|---|
| CCW: | Flip-flop of the control word from computer 44 - "true" counter clockwise rotation of the table 24 (i.e. equivalent to rotating the cutting element counter clockwise with respect to the workpiece.) |
| CMDDATA: | Flip-flop to control transferring data to computer 44; set by function lines from computer 44. |
| COUNT: | Counter to determine 4.88 ms clock signal. |
| CX or C: | Rate of change of X with respect to $\gamma$. |
| DATAINT: | Flip-flop to control data interrupt; set by either computer 44 or network 40. |
| EGAMMA OR $\gamma_E$ | Expected value of GAMMA at the next interrogation interval (PULSE = true) |
| ENABLE: | Flip-flop controlled by the computer 44. |
| ERRINT: | Flip-flop to allow error interrupt and controlled by the computer 44. |
| F: | X axis feedrate. |
| GAMCAL: | Flip-flop to indicate GAMMA=0 has occurred. |
| GAMMA or $\gamma$: | Table angle corrected for rotation direction. |
| GAMMAN or $\gamma_N$ | $\gamma$-C-V Table angle above which the calculation constants must be changed. |
| HGAMMA or $\gamma_H$ | Value of GAMMA from previous interrogation interval (PULSE = true). |
| HXV: | XV from previous interrogation interval (PULSE = true). |
| INIT: | Initiate flip-flop set by function line from computer 44 and cleared by computation network 40. |
| INTENB: | Interrupt enable flip-flop controlled by the computer 44. |
| INTERUPT: | Procedure to interrupt program of computer 44 with hardward priority five. |
| INTTIME: | Flip-flop indicating each 4.88 ms period (10 interrogation intervals). |
| K: | Address constant of computer 44; address of the z axis control constant in the memory 42. |
| MAINT: | Flip-flop indicating maintenance mode. |
| MEM(X): | Procedure to extract contents of location X from computation network 40 scratch pad memory. |
| PDP11IN(X): | Procedure to transfer data to the memory 42, location X. |
| PDP11OUT(X): | Procedure to extract the contents of memory 42 location X. |
| PT: | Dynamic pointer to table of constants in memory 42. |
| PTZ: | Pointer set to first entry + 6 of the table of constants. |
| PULSE: | Flip-flop set true by the 0.488 ms period clock signal (defines interrogation interval). |
| RESET: | Flip-flop to control the reset calculation when $\gamma$ goes thru zero. |
| STATUSERR: | Error Flip-flop and status line to computer 44. |
| TIMEINT: | Flip-flop to control interrupting based on time. (set by the computer 44) |
| TVAL: | Tolerance value from computer 44. |
| U: | X Axis offset. |
| V: | Desired C axis angular velocity. |
| VC: | C axis integrated velocity error-output (D/A convertor). |
| VCH: | C axis integrated velocity error from previous interrogation interval (PULSE = true). |
| VCHR: | VCH remainder |
| VR: | Desired C axis angular velocity remainder. |
| WS2: | Working storage location which get the results of all multiplications. |
| WGAMMA or $\gamma_W$ | Actual support table C axis angle WGAMMA increases for clockwise rotation of the table 24. |
| WS1: | Working Storage. |
| WS2R: | Remainder register for WS2. |
| XA: | X acceleration. |
| XE: | X position error. |
| XEC: | X position error command-output. |

TABLE VI-B-continued

| | |
|---|---|
| XAC: | X acceleration command-output. |
| XD: | X desired position. |
| XDR: | X desired position remainder. |
| XP: | X position. |
| XPW: | X actual position - input (up/down counter). |
| XV: | X velocity. |
| XVC: | X velocity command-output (D/A convertor). |
| Z: | Z axis actual position. |
| ZEC: | Z axis error command-output (D/A convertor) |
| ZD: | Z axis desired position. |
| ZDR: | Z axis desired position remainder. |

C. Operator Station

The operator station 14 is shown in FIG. 15 to include an operator control panel 160, a.c. switches 162 and voltage convertors 164. Station 14 provides means for the operator to generate and receive the input and output discrete signals respectively as required for the operation of the machine tool 10. The various input and output discrete signals are described above in conjunction with Table III. It will be understood that when a single control means 12 is controlling more than one machine tool, each machine tool has an operator station associated therewith.

Figure 19:
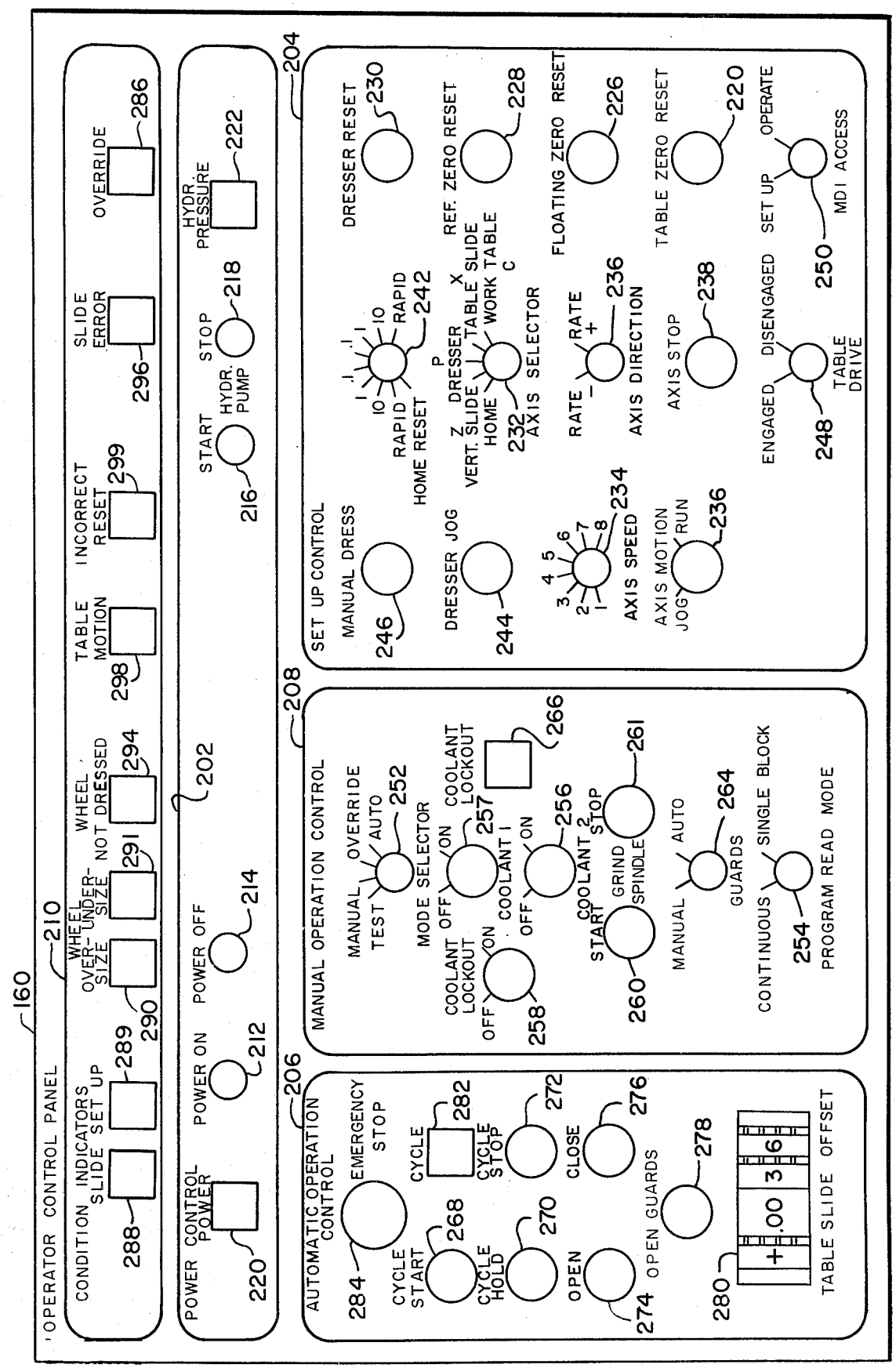
FIG. 19 shows a plan view of the control panel for use with the operator station of FIG. 15.

The operator panel 160 is shown in FIG. 19. In that figure, the rectangular areas represent indicator lights and the circular areas represent operator controlled switches. As shown in FIG. 19, the switches are grouped in four areas:

Power Control 202, Set-up control 204, automatic operation control 206 and manual operation control 208. In addition, most of the indicators are grouped as Condition Indicators 210. It will be noted below that four additional indicators are grouped with the associated control switches.

Power control 210 includes the following switches:

1. Power on 212 - for turning power on in the control panel 160;
2. Power off 214 - for removing power from console 160;
3. Hydraulic pump start 216 - for initiating the hydraulic system operation and;
4. Hydraulic pump stop 218 - for shutting down the hydraulic system operation.

In addition, power control 202 includes power indicator 220, which is illuminated when control panel 160 is in a "power on" state, and hydraulic pressure indicator 222 which indicates that the hydraulic system is operating and pressure is in a normal operative state.

The set-up control 204 includes the following switches:

1. Table zero reset 224 -directs the loading of a reference value for C axis alignment;
2. Slide reference zero reset 228 - directs the loading of a reference value for X-axis slide alignment;
3. Floating zero reset 226 - directs the loading of a reference value for the X-axis to permit X-axis slide alignment which may vary with each workpiece operation;
4. Dresser rest 230 - directs the loading of a reference value for the P-axis dresser with respect to the cutting element center line;
5. Axis selector switch 232 - for selecting axis to be moved manually during set-up operation;
6. Axis speed control 234 - for selecting a speed for the manual motion to be performed;

7. Axis direction control 236 - for selecting a direction for the manual motion;

8. Axis motion control 237 - for producing a selected axis motion in jog or run form;

9. Axis stop pushbutton 238 - for stopping an axis motion started by the axis motion pushbutton 237;

10. Dresser speed control 242 - for selecting a desired speed for the dresser motion;

11. Dresser jog pushbutton 244 - for selecting dresser motion in jog form;

12. Manual dress pushbutton 246 - for directing motion of the vertical slide between two programmed points at a programmed rate for dressing the cutting element;

13. Table drive switch 248 - for selectively disengaging the support table 24 to permit manual rotation of the table by the operator during fixturing of the workpiece and operating table zero reset 226; and 14. MDI access switch 250 - for controlling the entry of new data to control means 12 by the MDI terminal 114.

The manual operation control 208 includes the following controls:

1. Mode selector 252 - for selecting from the following modes: Manual, automatic, override.

2. Program read mode switch 254 - for enabling the program to be read continuously or in single block form.

3. Coolant controls 256–258 - for controlling coolant flow;

4. Grind spindle controls 260, 261 - for starting and stopping the cutting element, and 5. Guard switch 264 for selecting either manual (operator controlled) guard opening or automatic (machine controlled) guard opening.

Coolant lockout indicator 266 is illuminated when the switch 258 is in the "on" position.

The automatic operation control 206 includes the following controls:

1. Cycle start pushbutton 268 - for initiating an automatic cycle (either in automatic or override mode);

2. Cycle hold pushbutton 270 - for interrupting the cycle mode of operation (permitting continuation of operation in the cyle mode upon subsequent depression of cycle start pushbutton 268);

3. Cycle stop pushbutton 272 - for interrupting a cycle mode of operation and directing the controlled retraction of the slides to the "home" position in the same manner as at the end of a completed cycle of operation (and from which the cycle mode can only be reinitiated from the starting point);

4. Open and close clamp pushbuttons 274 and 276 - for directing part clamps to release and to secure the workpiece, respectively;

5. Guard open pushbutton 278 - for opening the guards when guard switch 254 is in the "manual" position;

6. Table slide offset thumb wheel set switches 280 for providing an X-axis offset to modify actual base diameter of workpiece (and correcting minor errors in setup of X-axis and wheel diameter); and 7. Emergency stop switch 284 - for interrupting machine tool 10 operation.

The cycle indicator 282 is illuminated when the machine tool 10 is in the cycle mode.

The condition indicators 210 include the following:

1. Override indicator 286 - for advising the operator that a modified program is currently being utilized.

2. Slide setup indicators 288 and 289 - indicate that the "home" position of the X-axis was correctly set in accordance with the data on the header portion of the program (if both indicators are illuminated) or incorrectly set (if only one indicator is illuminated);

3. Wheel size indicators 290 and 291 - indicate that the cutting element, (as dressed during the initial manual dressing operation), is outside the limits specified in the header portion of the Part Program;

4. Wheel not dressed indicator 294 - indicates that cycle mode has been initiated prior to initial dressing operation;

5. Slide error indicator 296 - indicates that machine tool 10 motion is producing position errors on X-axis beyond preset limits (and that for this reason, the cycle mode has been interrupted);

6. Table motion indicator 298 - indicates that motion of support table 24 was attempted without normal hydraulic pressure conditions (potentially damaging to hydrostatic bearings); and 7. Incorrect reset indicator 299 - indicates setup procedure error in the operation of the reset pushbuttons.

D. Programming Station

Figure 20:
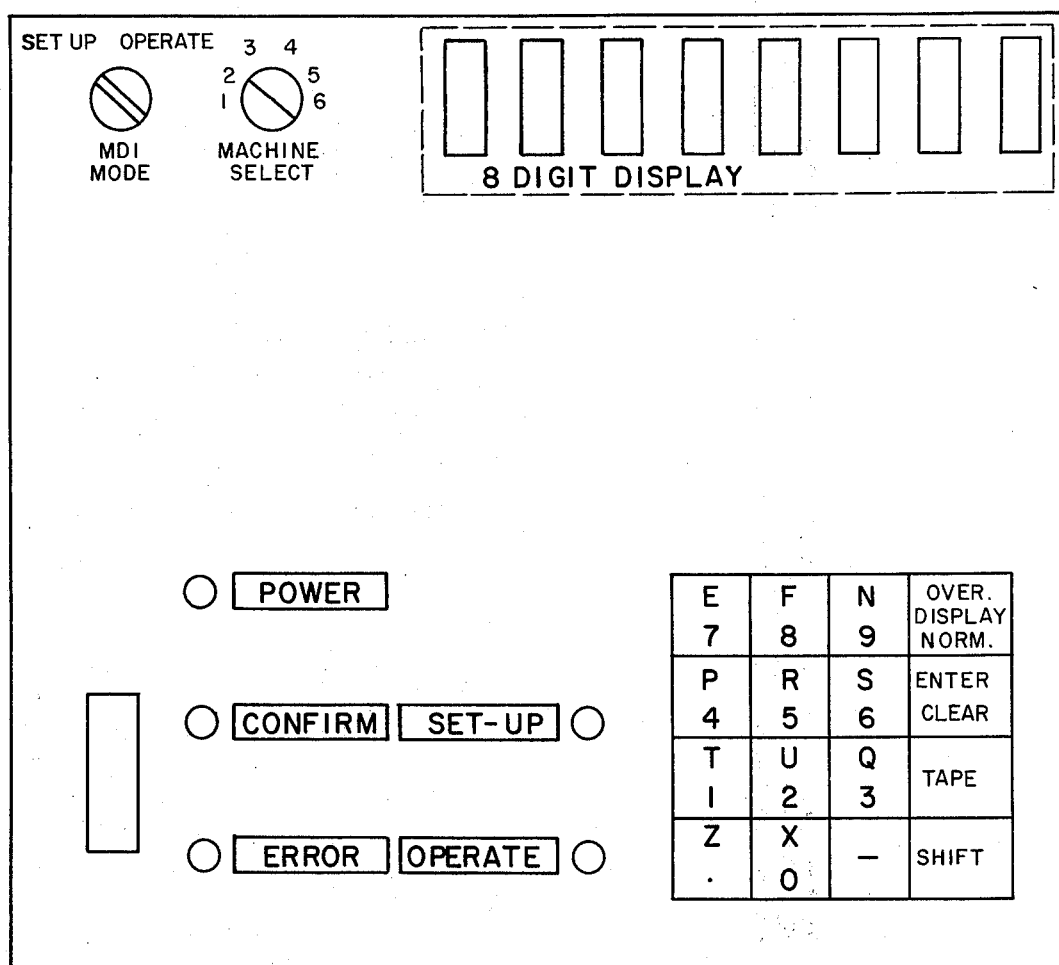
FIG. 20 shows a plan view of the control panel of the manual data input terminal in the configuration of FIG. 15.

The programming station 16 includes the manual data input terminal 114 and tape reader 116, as shown in FIG. 15. The control panel and keyboard for terminal 114 are shown in FIG. 20. The MDI terminal 114 may be utilized to display store data associated with a Part Program currently being performed by any of the six machine tools which may be connected to control means 12. In addition, terminal 114 may display and enter new data to supercede the already programmed data. The precise format of the Part Program is described in the next section. Using terminal 114, revisions of the stored data may include changes in the speed, feed, or offset data along any axis. Terminal 114 may not be used to revise any data contained in the Part Description. That data may only be changed via a new tape as entered by the tape reader 116.

The machine operator can change the following data through use of the MDI terminal 114:

Z dimension word - Z axis position limit
U dimension word - X-axis offset
R dimension word - Z-axis oscillation limit
P dimension word - dresser position
F dimension word - feed rate, X or Z-axis
E dimension word - feed rate, C-axis
S dimension word - rotational speed of cutting element
Q dimension word - revolution of C-axis count In addition to these data, the operator may access all other stored data excepting that stored in the part description tables.

E. Part Program

As described above, the Part Program comprises a sequence of data blocks which are grouped as follows: the Header, Body and Part Description. Table VII shows the format for the Part Program data blocks. The three groups will now be briefly described, followed by an exemplary Part Program (Table VIII).

The Header comprises four data blocks denoted N1-N4. These blocks made up of all data in blocks 1 through 4 have the form:

N1: "$x_1x_2x_3x_4x_5x_6x_7x_8x_9$" - nine symbol program identifier

N2: "$d_1d_2d_3d_4d_5d_6d_7d_8d_9$" - nine symbol part identifier

N3: G37 T[14] T[14] X[+15 ] - The maximum and minimum wheel radius and the X axis home position, $R_H$ (wherein $R_H$ is defined as a reference or "Home" distance between the Z and C axes)

N4: G36 Z[23] R[23] F[3] - the minimum and maximum Z coordinates for manual dress and the manual transverse rate.

The format of all data blocks on the input tape is:

"$d_1d_2$. ." - Any symbol sequence surrounded by quotes is defined as a character string wherein:

$d$ = digit (a number 0 through 9)

X = alphanumeric ($a$ through $z$ or 0 through 9)

N1 or G36 - the specific characters used (i.e. N followed by 1 or G followed by 36,)

[14] or [+15] - format information [14] means up to five characters, one to the left of the decimal, four to the right, with leading zero suppress. Thus, 138 under format [14] means 0.0138. A plus indicates a sign is also accepted. Each input tape begins and ends with an End of Block (EOB) character. Also, each input tape ends with an End of Record (EOR) character. Neither of these characters are shown in the examples in this section.

The body comprises the main section of the Part Process and includes data blocks 5 through 99 (or the final block if there are fewer than 99 blocks). The Body identifies the offsets, feedrates, speeds, and miscellaneous functions to be performed. The ordering of the sequences of the Body is the order in which the functions are to be performed. There are five types of functions which may be specified by the Body:

i. Establish axis speeds: Through E and S codes, the operator specifies the desired angular speed of the workpiece support table 24 about the rotary (C) axis and of cutting element 20 about the Z axis, respectively. These values represent desired speed and it will be understood that the actual speed is not changed to the specified value until a miscellaneous function code (M03, M04, M05, M13, M14, M20, and/or M21) is encountered in a subsequent block. The C axis speed will also change if a P axis motion occurs, indicating a wheel dress operation has initiated a γ-C-V Table generation.

EXAMPLE:

N5 G27 U-280 F0 E150 S110 M20 M14 - set the values to 150 fpm and 11000 rpm, start the C axis (M20), counter-clockwise (G27), start the cutting ele-

TABLE VII

Format Detail:
N4,G2,X+15,Z23,U+04,R23,P+14,C+32,D+24,F04,F3,E3,S3,Q2,M2,T14

| Character | Address For | Format Detail | Min-Max Value |
|---|---|---|---|
| X | X Axis Motion Dimension | X+15 | 0–9.99999 |
| Z | Primary Z Axis Limit Dimension | Z23 | 0–14.000 |
| U | X Axis Offset Dimension | U+04 | 0–0.9999 |
| R | Secondary Z Axis Limit Dimension | R23 | 0–14.000 |
| P | P Axis Motion Dimension | P+14 | 0–2.5000 |
| C | Angular Dimension | C+32 | 0–359.99 |
| D | Angular Dimension | D+24 | 0–45.0000 |
| F | Feed Function X Axis, Inches per Rev. | F04 | 0–.0999 |
| F | Feed Function Z Axis, Inches per Minute | F3 | 0–999 |
| E | Feed Function C Axis, Feet Per Minute | E3 | 0–999 |
| S | Cutting Element Speed, Revolutions per minute — 100 | S3 | 0–999 |
| T | Tool Function X Axis, Wheel Radius Limits | T14 | 0–9.9999 |
| Q | Dwell Function C Axis, Rev. Count | Q2 | 0–99 |

Note: Trailing Zero Suppression Applies to all Dimension Words.

C Codes
04 Dwell — timed by Revolution count on C axis (Q)
25 Oscillate Z axis between Z and R limits with cylinder drive
26 Oscillate Z axis between Z and R limits with ball screw drive
27 Oscillate X axis per programmed sequence, ccw rotation
28 Oscillate X axis per programmed sequence, cw rotation
29 Repeat program between sequence $N_a$ through $N_x$
36 Manual Dress Cycle
37 Limiting Parameters
90 Absolute Dimension Programming
91 Incremental Dimensional Programming M Codes
02 *End of Program
03 Cutting Element Start CW (clockwise)
04 Cutting Element Start CCW (counter-clockwise)
05 Cutting Element Stop
07 Coolant No. 2 Start — Dresser Coolant
08 Coolant No. 1 Start — Work Coolant
09 Coolant Stop — All Coolant
10 Clamp
11 Unclamp
12 Coolant Stop No. 2 Only
13 Cutting Element Start Clockwise with Coolant No. 1
14 Cutting Element Start Counter-Clockwise with Coolant No. 1
20 Support Table Start
21 Support Table Stop
22 Dresser Advance — Rapid
23 Dresser Retract — Rapid
02 Causes Stop on X axis — moves to home position
    Stop on C axis — on zero position
    Stop on Cutting Element
    Stop on Coolant
    opens doors ment 20 counterclockwise (M14) (the meaning of block N5 will be further discussed further under below).

ii. Set axis position and feed rates: The values of the X axis offset, Z axis position, and P axis position, and the feed rates for these axes are set or modified in response to data blocks having codes of the following form:

The G91 code means that the axis value will be incremental - that is, added to or subtracted from the previous value.

The G90 code always means that the axis value will be absolute, i.e. the axis value will replace the previous value.

The X axis offset is specified by U, and must be accompanied by the X axis feed rate, specified by F. The general form of this type data block is then either N[4] G90[+04] F[4] or N[4] G91 U[+04] F[4]

EXAMPLE:

N7 G90 U-20 F3 means set the new X axis offset value to −.0020 inches. Set the feed rate to .0003 inches per minute.

N8 G91 U-20 F3 - means set the new X axis offset value to the previous value minus .0020 inches. Set the X axis feed rate to .0003 inches per minute.

The Z axis position is specified by Z, and must be accompanied by the Z axis feed rate, specified by F. The general form of this block is then N[4] G90 Z[23] F[3] or N[4] G91 Z[23] F[3]

EXAMPLE:

N6 G90 Z625 F150 - means move the Z axis to position 1625 at a rate of 150 inches per minute N7 G91 Z625 F150 - means move the Z axis .625 inches from the current position at a rate of 150 inches per minute.

The P axis position is specified by P. The P axis always moves at a maximum rate which is not controlled by the Part Program. The position is always incremental and direction dependent on sign. A rapid traverse motion to and from the specified position is commanded by the M code. M 22 means move the P axis to the commanded position from the previous position. M23 means move the P axis from the previous position to the home position. The form of the M22 command is: N[4] G91 P[+14] M[2]

EXAMPLE:

N12 G91 P10 M22 - means move the P axis +.0010 inches from the current position.

It will be understood that the P axis position is direction-dependent on sign. Thus, the 0.0010 is from the last P position. The M23 command does not have the form of the M22 command and may be considered a miscellaneous function. M23 means retract to home. The Z axis and P axis is always moving in synchronization with the X axis. Thus, the X axis command U specifies a new offset value while the Z and P commands specify actual desired position.

iii. Oscillate the Z axis: There are two types of Z axis oscillation: cylinder drive and ball screw drive. The forms of the command to perform this are: N[4] G25 Z[23] R[23] F[3] - cylinder drive N[4] G26 Z[23] R[23] F[3] - ball screw drive

EXAMPLE:

N7 G25 Z685 R1185 F40 - means to oscillate the Z axis between absolute positions .685 inches and 1.185 inches at a rate of 40 inches per minute using the cylinder drive.

In the context of program execution, if the Z current position does not match the Z position specified in the data block, an implied Z move will take place at the previous non-zero Z feed rate until the specified position is reached. At that time the Z oscillation will start at the specified rate. Thus, Ng G90 Z625 F150 will move the Z axis to .625 at a rate of 150 inches per minute N7 G25 Z685 R1185 F40 will first move the Z axis to .685 at a rate of 150 inches per minute, then oscillate the Z axis between .685 and 1.185 at a rate of 40 inches per minute.

iv. Dwell: This command allows the system to dwell (operate in the same manner as just before the dwell) for some number of revolutions of the C axis. The form is:

N[4] G04 Q[2]

where the number of revolutions is given as the argument of Q.

EXAMPLE:

N9 G04 Q8 means dwell for 8 revolutions v. Miscellaneous Functions: One Step action blocks specified by the form M[2]

Such blocks are scattered throughout the Body, usually contained as part of the other blocks set forth above. The miscellaneous functions may be combined with the other data blocks as desired.

EXAMPLE:

N5 G27 U-280 FOE150 S110 M20 M14 - means set offset the X axis to the left by U diameter, the C axis velocity to 150 feet per minute CCW, the spindle speed to 11,000 rpm, start the spindle CCW, start the C axis.

The Part Description follows the Body and starts with block number 100 and can go as high as block number 9999. The Part Description includes the data which describes the desired workpiece contour (which data is subsequently transformed to signals for controlling the X and C axes movement). The data blocks may have one of the following four formats:

i. N100 G27 X [+15] or N100 G28 X[+15] These forms are for the block number 100 on y, i.e. at the beginning of a Subroutine. The G27 or G28 specifies direction of rotation and whether the part-to-be-machined is an external or internal part. The X portion specifies the initial point on the workpiece contour by identifying the X position at $\theta$ = zero with the constraint that the pressure angle is zero at $\theta$ = 0.

Thus,

N100 G27 X515000 - means counter clockwise rotation and internal part with R=5.15000 inches (where R is the distance between the C axis and the initial contour point, as defined in FIG. 2)

ii. N[4] G90 Z[+15] C[+32] This form gives a range for $\theta$ over which the pressure angle, $\alpha$, is zero and the radius, R, is constant at the value given in X. The range of $\theta$ is specified by C. It is assumed that at N101, the initial values of $\theta$ and $\alpha$ are all zero. Thus, N101 G90 X515000 C200 means that there is a range of 20.0° over which R = 5.15000 inches.

iii. N[4] G91 X[+15] C[+32] D[+24] This form gives increments for R and $\theta$, and specifies an increment for $\alpha$, the pressure angle. $\Delta R$ is specified by X, $\Delta\theta$ by C, and $\Delta\alpha$ by D. Thus, following the example above with N102 G91 X200 C10 D1000 - means set ΔR = .00200, Δθ = .1°, and Δα = .1° so the result would be a point at (5.15200,20.1) with a pressure angle of .1° iv. N[4] G29 N[4] N[4] This form repeats the statements between the second N[4] value and the third N[4] value inclusive. Thus, N326 G29 N114 N125 - means to repeat steps 114 through 125. Note that the second and third values of N must be less than the first or a logical inconsistency occurs.

The data blocks are specified in ascending sequence of absolute values of θ. In a G27 program, the data blocks use positive angles for θ measured in a counter-clockwise direction; and in a G28 program, the data blocks use positive angles for θ measured in a clockwise direction.

An exemplary Part Program is shown in Table VIII. Using this Part Program, the hereindescribed embodiment of the present invention will generate a contour connecting 720 spatial points on a workpiece, a 0.5° angular separation of the adjacent radii connecting the various points. The resultant contour is a 4-inch circle having 0.5 inch eccentricity to the center of rotation (i.e., the C axis).

TABLE VIII

| HEADER | PART DESCRIPTION (Cont.) |
|---|---|
| N1PDMTG1LCG | N131G91X-132C50D-601 |
| N210000000 | N132G91X-136C50D-600 |
| N3G37T22500T1410X110500 | N133G91X-140C50D-598 |
| N4G37Z11812R14000F35 | N134G91X-144C50D-597 |
|  | N136G91X-148C50D-595 |
|  | N136G91X-152C50D-593 |
| BODY | N137G91X-156C50D-591 |
|  | N138G91X-160C50D-589 |
| N5G27U-550F0E120S40M04M20 | N139G91X-164C50D-588 |
| N6G90Z7600F100M08 | N140G91X-168C50D-586 |
| N7G25Z767R8000F100 | N141G91X-172C50D-584 |
| N8G90U-20F100 | N142G91X-176C60D-582 |
| N9G04Q10 | N143G91X-180C50D-580 |
| N10G90U-100F0 | N144G91X-184C50D-577 |
| N11G90Z14000F100E80 | N145G91X-188C50D-575 |
| N12G91P20M22 | N146G91X-192C50D-573 |
| N13G90Z11812F35M23M12M20 | N147G91X-196C50D-571 |
| N14G90Z7600F100M08 | N148G91X-200C50D-568 |
| N15G25Z7675R8000F60 | N149G91X-204C50D-566 |
| N16G90U-25F0 | N150G91X-207C50D-564 |
| N17G90U0F30 | N151G91X-211C50D-561 |
| N18G04Q10 | N152G91X-215C50D-559 |
| N19G90U-100F0M09 | N153G91X-219C50D-556 |
| N20G90Z14000F100M02 | N154G91X-222C50D-554 |
|  | N155G91X-226C50D-551 |
|  | N156G91X-230C50D-548 |
| PART DESCRIPTION | N157G91X-233C50D-546 |
|  | N168G91X-237C50D-543 |
| N100G27X450000 | N159G91X-240C50D-540 |
| N101G91X-2C50D-625 | N160G91X-244C50D-537 |
| N102G91X-7C50D-625 | N161G91X-247C50D-535 |
| N103G91X-11C50D-625 | N162G91X-251C50D-532 |
| N104G91X-15C50D-625 | N163G91X-254C50D-529 |
| N105G91X-20C50D-624 | N164G91X-258C50D-526 |
| N106G91X-24C50D-624 | N165G91X-261C50D-523 |
| N107G91X-29C50D-624 | N166G91X-265C50D-520 |
| N108G91X-33C50D-624 | N167G91X-268C50D-517 |
| N109G91X-37C50D-623 | N168G91X-271C50D-513 |
| N110G91X-42C50D-623 | N169G91X-274C50D-510 |
| N111G91X-46C50D-622 | N170G91X-278C50D-507 |
| N112G91X-50C50D-622 | N171G91X-281C50D-504 |
| N113G91X-55C50D-621 | N172G91X-284C50D-501 |
| N114G91X-59C50D-620 | N173G91X-287C50D-497 |
| N115G91X-64C50D-620 | N174G91X-290C50D-494 |
| N116G91X-68C50D-619 | N175G91X-294C50D-490 |
| N117G91X-72C50D-618 | N176G91X-297C50D-487 |
| N118G91X-77C50D-617 | N177G91X-300C50D-484 |
| N119G91X-81C50D-616 | N178G91X-303C50D-480 |
| N120G91X-85C50D-615 | N179G91X-306C50D-477 |
| N121G91X-89C50D-615 | N180G91X-309C50D-473 |
| N122G91X-94C50D-613 | N181G91X-311C50D-469 |
| N123G91X-98C50D-612 | N182G91X-314C50D-466 |
| N124G91X-102C50D-611 | N183G91X-317C50D-462 |
| N125G91X-107C50D-610 | N184G91X-320C50D-458 |
| N126G91X-111C50D-608 | N185G91X-323C50D-455 |
| N127G91X-115C50D-607 | N186G91X-325C50D-451 |
| N128G91X-119C50D-606 | N187G91X-328C50D-447 |

TABLE VIII-continued

| HEADER | PART DESCRIPTION (Cont.) |
|---|---|
| N129G91X-123C50D-604 | N188G91X-331C50D-443 |
| N130G91X-128C50D-603 | N189G91X-333C50D-439 |
| N190G91X-336C50D-435 | N249G91X-428C50D-164 |
| N191G91X-339C50D-431 | N250G91X-429C50D-159 |
| N192G91X-341C50D-428 | N251G91X-430C50D-153 |
| N193G91X-344C50D-424 | N252G91X-430C50D-148 |
| N194G91X-346C50D-420 | N253G91X-430C50D-143 |
| N195G91X-349C50D-415 | N254G91X-431C50D-138 |
| N196G91X-351C50D-411 | N255G91X-431C50D-133 |
| N197G91X-353C50D-407 | N256G91X-431C50D-128 |
| N198G91X-356C50D-403 | N257G91X-432C50D-123 |
| N199G91X-358C50D-399 | N258G91X-432C50D-117 |
| N200G91X-360C50D-395 | N259G91X-432C50D-112 |
| N201G91X-363C50D-391 | N260G91X-432C50D-107 |
| N202G91X-365C50D-386 | N261G91X-433C50D-102 |
| N203G91X-367C50D-382 | N262G91X-433C50D-97 |
| N204G91X-369C50d-378 | N263G91X-433C50D-92 |
| N205G91X-371C50D-373 | N264G91X-433C50D-86 |
| N206G91X-373C50D-369 | N265G91X-433C50D-81 |
| N207G91X-375C50D-365 | N266G91X-433C50D-76 |
| N208G91X-377c50D-360 | N267G91X-433C50D-71 |
| N209G91X-379C50D-356 | N268G91X-433C50D-65 |
| N210G91X-381C50D-352 | N269G91X-433C50D-60 |
| N211G91X-383C50D-347 | N270G91X-433C50D-55 |
| N212G91X-385C50D-343 | N271G91X-433C50D-50 |
| N213G91X-387C50D-338 | N272G91X-432C50D-45 |
| N214G91X-388C50D-334 | N273G91X-432C50D-39 |
| N215G91X-390C50D-329 | N274G91X-432C50D-34 |
| N216G91X-392C50D-324 | N275G91X-432C50D-29 |
| N217G91X-393C50D-320 | N276C91X-431C50D-24 |
| N218G91X-396C50D-315 | N277G91X-431C50D-18 |
| N219G91X-397C50D-311 | N278G91X-431C50D-13 |
| N220G91X-398C50D-306 | N279G91X-430C50D-8 |
| N221G91X-400C50D-301 | N280G91X-430C50D-3 |
| N222G91X-401C50D-297 | N281G91X-429C50D3 |
| N223G91X-403C50D-292 | N282G91X-429C50D8 |
| N224G91X-404C50D-287 | N283G91X-428C50D13 |
| N225G91X-406C50D-282 | N284G91X-428C50D18 |
| N226G91X-407C50D-278 | N285G91X-427C50D24 |
| N227G91X-408C50D-273 | N286G91X-427C50D29 |
| N228G91X-410C50D-268 | N287G91X-426C50D34 |
| N229G91X-411C50D-263 | n288G91X-425C50D39 |
| N230G91X-412C50D-258 | N289G91X-425C50D45 |
| N231G91X-413C50D-253 | N290G91X-424C50D50 |
| N232G91X-414C50D-249 | N291G91X-423C50D55 |
| N233G91X-415C50D-244 | N292G91X-423C50D60 |
| N234G91X-416C50D-239 | N293G91X-422C50D65 |
| N235G91X-418C50D-234 | N294G91X-421C50D71 |
| N236G91X-419C50D-229 | N295G91X-420C50D76 |
| N237G91X-420C50D-224 | N296G91X-419C50D81 |
| N238G91X-420C50D-219 | N297G91X-418C50D86 |
| N239G91X-421C50D-214 | N298G91X-417C50D92 |
| N240G91X-422C50D-209 | N299G91X-416C50D97 |
| N241G91X-423C50D-204 | N300G91X-415C50D102 |
| N242G91X-424C50D-199 | N301G91X-414C50D107 |
| N243G91X-425C50D-194 | N302G91X-413C50D112 |
| N244G91X-425C50D-189 | N303G91X-412C50D117 |
| N245G91X-426C50D-184 | N304G91X-411C50D123 |
| N246G91X-427C50D-179 | N305G91X-410C50D128 |
| N247G91X-427C50D-174 | N306G91X-409C50D133 |
| N248G91X-428C50D-169 | N307G91X-408C50D138 |
| N308G91X-406C50D143 | N366G91X-296C40D415 |
| N309G91X-405C50D148 | N367G91X-293C50D420 |
| N310G91X-404C50D153 | N368G91X-291C50D424 |
| N311G91X-403C50D159 | N369G91X-288C50D428 |
| N312G91X-401C50D164 | N370G91X-286C50D431 |
| N313G91X-400C50D169 | N371G91X-283C50D435 |
| N314G91X-399C50D174 | N372G91X-280C50D439 |
| N315G91X-397C50D179 | N373G91X-278C50D443 |
| N316G91X-396C50D184 | N374G91X-275C50D447 |
| N317G91X-394C50D189 | N375G91X-272C50D451 |
| N318G91X-393C50D194 | N376G91X-270C50D455 |
| N319G91X-391C50D199 | N377G91X-267C50D458 |
| N320G91X-390C50D204 | N378G91X-264C50D462 |
| N321G91X-388C50D209 | N379G91X-262C50D466 |
| N322G91X-387C50D214 | N380G91X-259C50D469 |
| N323G91X-385C50D219 | N381G91X-256C50D473 |
| N324G91X-384C50D224 | N382G91X-253C50D477 |
| N325G91X-382C50D229 | N383G91X-250C50D480 |
| N326G91X-380C50D234 | N384G91X-248C50D484 |
| N327G91X-379C50D239 | N385G91X-245C50D487 |
| N328G91X-377C50D244 | N386G91X-242C50D490 |
| N329G91X-375C50D249 | N387G91X-239C50D494 |
| N330G91X-373C50D253 | N388G91X-236C50D497 |
| N331G91X-372C50D258 | N389G91X-233C50D501 |
| N332G91X-370C50D263 | N390G91X-230C50D504 |
| N333G91X-368C50D268 | N391G91X-228C50D507 |
| N334G91X-366C50D273 | N392G91X-225C50D510 |
| N335G91X-364C50D278 | N393G91X-222C50D513 |
| N336G91X-362C50D282 | N394G91X-219C50D517 |
| N337G91X-361C50D287 | N395G91X-216C50D520 |

TABLE VIII-continued

| HEADER | PART DESCRIPTION (Cont.) |
|---|---|
| N338G91X-359C50D292 | N396G91X-213C50D523 |
| N339G91X-357C50D297 | N397G91X-210C50D526 |
| N340G91X-355C50D301 | N398G91X-207C50D529 |
| N341G91X-353C50D306 | N399G91X-204C40D532 |
| N342G91X-351C50D311 | N400G91X-201C50D535 |
| N343G91X-349C50D315 | N401G91X-198C50D537 |
| N344G91X-347C50D320 | N402G91X-194C50D540 |
| N345G91X-344C50D324 | N403G91X-191C50D543 |
| N346G91X-342C50D329 | N404G91X-188C50D546 |
| N347G91X-340C50D334 | N405G91X-185C50D548 |
| N348G91X-338C50D338 | N406G91X-182C50D551 |
| N349G91X-336C50D343 | N407G91X-179C50D554 |
| N350G91X-334C50D347 | N408G91X-176C50D556 |
| N351G91X-331C50D352 | N409G91X-173C50D559 |
| N352G91X-329C50D356 | N410G91X-169C50D561 |
| N353G91X-327C50D360 | N411G91X-166C50D564 |
| N354G91X-325C50D365 | N412G91X-163C50D566 |
| N355G91X-322C50D369 | N413G91X-160C50D568 |
| N356G91X-320C50D373 | N414G91X-157C50D571 |
| N357G91X-318C50D378 | N415G91X-154C50D573 |
| N358G91X-315C50D382 | N416G91X-150C50D575 |
| N359G91X-313C50D386 | N417G91X-147C50D577 |
| N360G91X-311C50D391 | N418G91X-144C50D580 |
| N361G91X-308C50D395 | N419G91X-141C50D582 |
| N362G91X-306C50D399 | N420G91X-137C50D584 |
| N363G91X-303C50D403 | N421G91X-134C50D586 |
| N364G91X-301C50D407 | N422G91X-131C50D588 |
| N365G91X-298C50D411 | N423G91X-127C50D589 |
| N424G91X-124C50D591 | N480G91X67C50D615 |
| N425G91X-121C50D593 | N481G91X70C50D614 |
| N426G91X-118C50D595 | N482G91X74C50D613 |
| N427G91X-114C50D596 | N483G91X77C50D612 |
| N428G91X-111C50D598 | N484G91C81C50D611 |
| N429G91X-108C50D600 | N485G91X84C50D610 |
| N430G91X-104C50D601 | N486G91X87C50D608 |
| N431G91X-101C50D603 | N487G91X91C50D607 |
| N432G91X-97C50D604 | N488G91X94C50D606 |
| N433G91X-94C50D606 | N489G91X97C50D604 |
| N434G91X-91C50D607 | N490G91X101C50D603 |
| N435G91X-87C50D608 | N491G91X104C50D601 |
| N436G91X-84C50D610 | N492G91X108C50D600 |
| N437G91X-81C50D611 | N493G91X111C50D598 |
| N438G91X-77C50D612 | N494G91X114C50D597 |
| N439G91X-74C50D613 | N495G91X118C59D595 |
| N440G91X-70C50D614 | N496G91X121C50D593 |
| N441G91X-67C50D615 | N497G91X124C50D591 |
| N442G91X-64C50D616 | N498G91X127C50D589 |
| N443G91X-60C50D617 | N499G91X131C50D588 |
| N444G91X-57C50D618 | N500G91X134C50D586 |
| N445G91X-53C50D619 | N501G91X137C50D584 |
| N446G91X-50C50D620 | N502G91X141C50D582 |
| N447G91X-46C50D620 | N503G91X144C50D580 |
| N448G91X-43C50D621 | N504G91X147C50D577 |
| N449G91X-40C50D622 | N505G91X150C50D575 |
| N450G91X-36C50D622 | N506G91X154C50D573 |
| N451G91X-33C50D623 | N507G91X157C50D571 |
| N452G91X-29C50D623 | N508G91X160C50D568 |
| N453G91X-26C40D624 | N509G91X163C50D566 |
| N454G91X-22C50D624 | N510G91X166C50D564 |
| N455G91X-19C50D624 | N511G91X169C50D561 |
| N456G91X-16C50D624 | N512G91X173C50D559 |
| N457G91X-12C50D625 | N513G91X176C50D556 |
| N458G91X-9C50D625 | N514G91X179C50D554 |
| N459G91X-5C50D625 | N515G91X182C50D551 |
| N460G91X-2C50D625 | N516G91X185C50D548 |
| N461G91X2C50D625 | N517G91X188C40D546 |
| N462G91X5C50D625 | N518G91X191C50D543 |
| N463G91X9C50D625 | N519G91X194C50D540 |
| N464G91X12C50D625 | N520G91X198C50D537 |
| N465G91X16C50D624 | N521G91X201C50D535 |
| N466G91X19C50D624 | N522G91X204C50D532 |
| N467G91X22C50D624 | N523G91X207C50D529 |
| N468G91X26C50D624 | N524G91X210C50D526 |
| N469G91X29C50D623 | N525G91X213C50D523 |
| N470G91X33C50D623 | N526G91X216C50D520 |
| N471G91X36C50D622 | N527G91X219C50D517 |
| N472G91X40C40D622 | N528G91X222C50D513 |
| N473G91X43C50D621 | N529G91X225C50D510 |
| N474G91X46C50D620 | N530G91X228C50D507 |
| N475G91X50C50D620 | N531G91X230C50D504 |
| N476G91X53C50D619 | N532G91X233C50D501 |
| N477G91X57C50D618 | N533G91X236C50D497 |
| N478G91X60C50D617 | N534G91X239C50D494 |
| N479G91X64C50D616 | N535G91X242C50D490 |
| N536G91X245C50D487 | N590G91X372C50D258 |
| N537G91X248C50D484 | N591G91X363C50D253 |
| N538G91X250C50D480 | N592G91X375C50D249 |
| N539G91X253C50D377 | N593G91X377C50D244 |
| N540G91X256C50D473 | N594G91X379C50D239 |
| N541G91X259C50D469 | N595G91X380C50D234 |
| N542G91X262C50D466 | N596G91X382C50D229 |

| HEADER | PART DESCRIPTION (Cont.) |
|---|---|
| N543G91X264C50D462 | N597G91X384C50D224 |
| N544G91X267C50D458 | N598G91X385C50D219 |
| N545G91X270C50D455 | N599G91X387C50D214 |
| N546G91X272C50D451 | N600G91X388C50D209 |
| N547G91X275C50D447 | N601G91X290C50D204 |
| N548G91X278C50D443 | N602G91X391C50D199 |
| N549G91X280C50D439 | N603G91X393C50D194 |
| N550G91X283C50D435 | N604G91X394C50D189 |
| N551G91X286C50D431 | N605G91X396C50D184 |
| N552G91X288C50D428 | N606G91X397C50D179 |
| N553G91X291C50D424 | N607G91X399C50D174 |
| N554G91X293C50D420 | N608G91X400C50D169 |
| N555G91X296C50D415 | N609G91X401C50D164 |
| N556G91X298C50D411 | N610G91x403C50D159 |
| N557G91X301C50D407 | N611G91X404C50D153 |
| N558G91X303C50D403 | N612G91X405C50D148 |
| N559G91X306C50D399 | N613G91X406C50D143 |
| N560C91X308C50D395 | N614G91X408C50D138 |
| N561G91X311C50D931 | N615G91X409C50D133 |
| N562G91X313C50D386 | N616G91X410C50D128 |
| N563G91X315C40D382 | N617G91X411C50D123 |
| N564G91X318C50D378 | N618G91X412C50D117 |
| N565G91X320C50D373 | N619G91X413C50D112 |
| N566C91X322C50D369 | N620G91X414C50D107 |
| N567G91X325C50D365 | N612G91X415C50D102 |
| N568G91X327C50D360 | N622G91X416C50D97 |
| N569G91X329C50D356 | N623G91X417C50D92 |
| N570G91X331C50D352 | N624G91X418C50D86 |
| N571G91X334C50D347 | N625G91X419C50D81 |
| N572G91X336C50D343 | N626G91X420C50D76 |
| N573G91X338C50D338 | N627G91X421C50D71 |
| N574G91X340C50D334 | N628G91X422C50D65 |
| N575G91X342C50D329 | N629G91X423C50D60 |
| N576G91X344C50D324 | N630G91X423C50D55 |
| N577G91X347C50D320 | N631G91X424C50D50 |
| N578G91X349C50D315 | N632G91X425C50D45 |
| N579G91X351C50D311 | N633G91X425C50D39 |
| N580G91X353C50D306 | N634G91X426C40D34 |
| N581G91X355C50D301 | N635G91X427C50D29 |
| N582G91X357C50D297 | N636G91X427C50D24 |
| N583G91X359C50D292 | N637G91X428C50D18 |
| N584G91X361C50D287 | N638G91X428C50D13 |
| N585G91X362C50D282 | N639G91X429C50D8 |
| N586G91X364C50D278 | N640G91X429C50D3 |
| N587G91X366C50D273 | N641G91X430C50D-3 |
| N588G91X368C50D268 | N642G91X430C50D-8 |
| N589G91X370C50D263 | N643G91X431C50D-13 |
| N644G91X431C50D-18 | N698G91X403C50D-292 |
| N645G91X431C50D-24 | N699G91X401C50D-297 |
| N646G91X432C50D-29 | N700G91X400C50D-301 |
| N647G91X432C50D-34 | N701G91X398C50D-306 |
| N648G91X432C50D-39 | N702G91X397C50D-311 |
| N649G91X432C50D-45 | N703G91X395C50D-315 |
| N650G91X433C50D-50 | N704G91X393C50D-320 |
| N651G91X433C50D-55 | N705G91X392C50D-324 |
| N652G91X433C50D-60 | N706G91X390C50D-329 |
| N653G91X433C50D-65 | N707G91X388C50D-334 |
| N654G91X433C50D-71 | N708G91X387C50D-338 |
| N655G91X433C50D-76 | N709G91X385C50D-343 |
| N656G91x433C50D-81 | N710G91X383C50D-347 |
| N657G91X433C50D-86 | N711G91X381C50D-352 |
| N658G91X433C50D-92 | N712G91X379C50D-356 |
| N659G91X433C50D-97 | N713G91X377C50D-360 |
| N660G91X433C50D-102 | N714G91X375C50D-365 |
| N661G91X432C50D-107 | N715G91X373C50D-369 |
| N662G91X432C50D-112 | N716G91X371C50D-373 |
| N663G91X432C50D-117 | N717G91X369C50D-378 |
| N664G91X432C50D-123 | N718G91X367C50D-382 |
| N665G91X431C50D-128 | N719G91X365C50D-386 |
| N666G91X431C50D-133 | N720G91X363c50D-391 |
| N667G91X431C50D-138 | N721G91X360C50D-395 |
| N668G91X430C50D-143 | N722G91x358C50D-399 |
| N669G91X430C50D-148 | N723G91X356C50D-403 |
| N670G91X430C50D-153 | N724G91X353C50D-407 |
| N671G91X429C50D-159 | N725G91X351C50D-411 |
| N672G91X428C50D-164 | N726G91X349C50D-415 |
| N673G91X428C50D-169 | N727G91X346C50D-420 |
| N674G91X427C50D-174 | N728G91X344C50D-424 |
| N675G91X427C50D-179 | N728G91X341C50D-428 |
| N676G91X426C50D-184 | N730G91X339C50D-431 |
| N677G91X425C50D-189 | N731G91X336C50D-435 |
| N678G91X425C40D-194 | N732G91X333C50D-439 |
| N679G91X424C50D-199 | N733G91X331C50D-443 |
| N680G91X423C50D-204 | N734G91X328C50D-447 |
| N681G91X422C50D-209 | N735G91X325C50D-451 |
| N682G91X421C50D-214 | N736G91X323C50D-455 |
| N683G91X420C50D-219 | N737G91X320C50D-458 |
| N684G91X420C50D-224 | N738G91X317C50D-462 |
| N685G91X419C50D-229 | N739G91X314C50D-466 |
| N686G91x418C50D-234 | N740G91X311C50D-469 |
| N687G91X416C50D-239 | N741G91X309C50D-473 |

TABLE VIII-continued

| HEADER | PART DESCRIPTION (Cont.) |
|---|---|
| N688G91X415C40D-244 | N742G91X306C50D-477 |
| N689G91X414C50D-249 | N743G91X303C50D-480 |
| N690G91X413C50D-253 | N744G91X300C50D-484 |
| N691G91X412C60D-258 | N745G91X297C50D-487 |
| N692G91X411C50D-263 | N746G91X294C50D-490 |
| N693G91X410C50D-268 | N747G91X290C50D-494 |
| N694G91X408C50D-273 | N748G91X287C50D-497 |
| N695G91X407C50D-278 | N749G91X284C50D-501 |
| N696G91X406C50D-282 | N750G91X281C50D-504 |
| N697G91X404C50D-287 | N751G91X278C50D-507 |
| N752G91X274C50D-510 | N806G91X64C50D-620 |
| N753G91X271C50D-513 | N807G91X59C50D-620 |
| N754G91X268C50D-517 | N808G91X55C50D-621 |
| N755G91x265C50D-520 | N809G91X50C50D-622 |
| N756G91X261C50D-523 | N810G91X46C50D-622 |
| N757G91X258C50D-526 | N811G91X42C50D-623 |
| N758G91X254C50D-529 | N812G91X37C50D-623 |
| N759G91X251C50D-532 | N813G91X33C50D-624 |
| N760G91X247C50D-535 | N813G91X29C50D-624 |
| N761G91X244C50D-537 | N815G91X24C50D-624 |
| N762G91X240C50D-540 | N816G91X20C50D-624 |
| N763G91X237C50D-543 | N817G91X15C50D-625 |
| N764G91X233C50D-546 | N818G91X11C50D-625 |
| N765G91X230C50D-548 | N819G91X7C50D-625 |
| N766G91X226C50D-551 | N820G91X2C50D-625 |
| N767G91X222C50D-554 | |
| N768G91X219C50D-556 | |
| N769G91X215C50D-559 | |
| N770G91X211C50D-561 | |
| N771G91X207C50D-564 | |
| N772G91X204C50D-566 | |
| N773G91X200C50D-568 | |
| N774G91X196C50D-571 | |
| N775G91X192C50D-573 | |
| N776G91X188C50D-575 | |
| N777G91X813C50D-577 | |
| N778G91X180C50D-580 | |
| N779G91X176C50D-582 | |
| N780G91X172C50D-584 | |
| N781G91X168C50D-586 | |
| N782G91X164C50D-588 | |
| N783G91X168C50D-589 | |
| N784G91X156C50D-591 | |
| N785G91X152C50D-593 | |
| N786G91X148C50D-595 | |
| N787G91X144C50D-597 | |
| N788G91X140C50D-598 | |
| N789G91X136C50D-600 | |
| N790G91X132C50D-601 | |
| N791G91X128C50D-603 | |
| N792G91X123C50D-604 | |
| N793G91X119C50D-606 | |
| N794G91X115C50D-607 | |
| N795G91X111C50D-608 | |
| N796G91X107C50D-610 | |
| N797G91X102C50D-611 | |
| N798G91X98C50D-612 | |
| N799G91X94C50D-613 | |
| N800G91X89C50D-614 | |
| N801G91X85C50D-615 | |
| N802G91X81C50D-616 | |
| N803G91X77C50D-617 | |
| N804G91X72C50D-618 | |
| N805G91X68C50D-619 | |

We claim:

1. In a contouring system including a machine tool, said machine tool having a cutting element with a lateral surface which is substantially symmetrical about a first or Z axis, and a workpiece support table having a top surface substantially disposed in a plane perpendicular to said Z axis, wherein said cutting element both rotates about and translates along said Z axis, and wherein said workpiece support table both rotates about a second or C axis, said C axis being parallel to said Z axis, and translates along a third or X axis, said X axis being perpendicular to said Z axis and having a point of intersection with said C and Z axes, the improvement comprising:

a means for controlling said rotating and translating motions of said cutting element and said workpiece support table including:

A. a cutting element drive means for rotating said cutting element at a predetermined angular velocity about said Z axis, and B. a positioning control means for controlling the relative position of said cutting element with respect to a sequence of predetermined spatial points, each of said spatial points bearing a predetermined spatial relationship to said top surface and each of said points having an associated reference tangent line segment passing therethrough, with said tangent line segment disposed parallel to said top surface of said support table at a predetermined angle defined with respect to a reference line segment on said top surface so that said support table is synchronously translated along said X axis and rotated about said C axis and said cutting element is translated along said Z axis, said cutting element having a contact point on the periphery thereof successively located at each of said spatial points and said cutting element further having its lateral surface at said contact point successively tangent to each of said reference tangent line segments at its associated spatial point.

2. In a contouring system including a machine tool, said machine tool having a cutting element with a lateral surface which is substantially symmetrical about a first or Z axis, and a workpiece support table having a top surface substantially disposed in a plane perpendicular to said Z axis, wherein said cutting element both rotates about and translates along said Z axis, and wherein said workpiece support table both rotates about a second or C axis, said C axis being parallel to said Z axis, and translates along a third or X axis, said X axis being perpendicular to said Z axis and having points of intersection with said C and Z axes, and further including a cutting element dressing means, wherein said dressing means translates along a fourth or P axis, said P axis being perpendicular to said Z axis and having a point of intersection with said Z axis, the improvement comprising:

a means for controlling said rotating and translating motions of said cutting element and said workpiece support table including:

A. a cutting element drive means for rotating said cutting element at a predetermined angular velocity about said Z axis, and B. a positioning control means for selectively controlling:

i. the relative position of said cutting element with respect to a sequence of predetermined spatial points, each of said spatial points bearing a predetermined spatial relationship to said top surface and each of said points having an associated reference tangent line segment passing therethrough with said tangent line segment disposed parallel to said top surface of said support table at a predetermined angle defined with respect to a reference line segment on said top surface so that said support table is synchronously translated along said X axis and rotated about said C axis and said cutting element is translated along said Z axis, said cutting element having a contact point on the periphery thereof successively located at each of said spatial points and further having the lateral surface of said cutting element at said contact point tangent to each of said reference tangent line segments at its associated spatial point, and
  ii. the position of said cutting element along said Z axis and the relative position of said dressing means with respect to said cutting element lateral surface, whereby said dressing means is selectively translated along said P axis to dress said lateral surface of said cutting element.

3. A contouring system according to claim 2 wherein said positioning control means further comprises means to store input data including:
  A. contour data representative of the coordinates of each of said sequence of predetermined spatial points, said coordinates being measured with respect to a reference coordinate system on the top surface of said support table,
  B. pressure angle data for each of said spatial points relating said predetermined angle associated with each of said tangent line segments to said coordinates of the associated spatial point, and
  C. wheel radius data representative of the radial dimension of said cutting element.

4. A contouring system according to claim 3 wherein said positioning control means further comprises means to generate sensor data including:
  actual position data representative of the relative position of said cutting element with respect to said reference coordinate system of said top surface.

5. A contouring system according to claim 4 wherein
  A. said contour data is in polar coordinate form providing R and $\theta$ coordinate values for each of said sequence at spatial points, each R value being a measure of a radial line segment extending from said C axis to its associated spatial point and each $\theta$ value being a measure of the angular displacement of said radial line segment from a C axis angular zero reference line segment, and
  B. said pressure angle data providing a pressure angle or $\alpha$ value for each of said sequence of spatial points, said pressure angle value being a measure of the angle formed by a line segment perpendicular to said reference tangent line segment and passing through its associated spatial point, and said radial line segment extending from said C axis to its associated spatial point.

6. A contouring system according to claim 4 wherein:
  A. said coordinate data is in differential polar coordinate form providing R and $\theta$ coordinate values for a first of said sequence of spatial points, said R value being a measure of a radial line segment extending from said C axis to its associated spatial point and said $\theta$ value being a measure of the angular displacement of said radial line segment from a C axis angular zero reference line segment, and providing $\Delta R$ and $\Delta \theta$ coordinate values for each of the remaining spatial points,
  each $\Delta R$ value being a measure of the change in the radial distance from said C axis of the associated spatial point relative to the radial distance from said C axis to the preceding spatial point in said sequence and each $\Delta \theta$ value being a measure of the change in angular displacement of the radial line segment connecting the associated spatial point and said C axis relative to the corresponding angular displacement associated with the preceding spatial point in said sequence, and
  B. said pressure angle data is in differential form providing an $\alpha$ value for the first of said sequence of spatial points and a $\Delta \alpha$ value for each of the others of said sequence of spatial points, each $\Delta \alpha$ value being a measure of the change in pressure angle associated with each spatial point and the corresponding value for the previous spatial point in said sequence of points, said pressure angle value being a measure of the angle formed by a line segment perpendicular to said reference tangent line segment and passing through its associated spatial point, and said radial line segment extending from said C axis to its associated spatial point.

7. A contouring system according to claim 4 wherein said positioning control means further comprises:
  A. a data transformation means for transforming said input data and said sensor data to machine tool drive data, said drive data including:
    i. X-axis position error, velocity and acceleration drive data representative of the required position change, velocity and acceleration of said workpiece support table along said X axis for said cutting element contact point to approach said spatial point,
    ii. C-axis integrated velocity error drive data representative of the required change in angular velocity of said workpiece support table about said C axis for said cutting element contact point to approach said spatial point, and
    iii. Z-axis position drive data representative of the required position change for said cutting element contact point to approach said spatial point along said Z axis,
  B. a drive signal generating means for generating X axis position error, X axis velocity, X axis acceleration, C axis integrated velocity error, Z axis position error signals, and P axis position signals, from said machine tool drive data.

8. A contouring system according to claim 7 wherein said positioning control means further comprises:
  A. an actuating means including:
    i. an X axis servo positioning system for translating said support table along said X axis in response to said X axis position error, X axis velocity and X axis acceleration signals,
    ii. a C axis servo positioning system for rotating said support table about said C axis in response to said C axis integrated velocity error signals,
    iii. a Z axis servo positioning system for translating said cutting element along said Z axis in response to said Z axis position error signals, and
    iv. a P axis servo positioning system for translating said dressing element along said P axis in response to said P axis position signals.

9. A contouring system according to claim 8 wherein said data transformation means comprises:
  A. a first transformation means for transforming said stored input data to axis control data for each of said spatial points in said sequence, and storing said axis control data, said axis control data including:
    i. C axis position data or $\gamma$ data representative of the relative angular displacement of a line segment connecting said Z axis with said C axis measured with respect to a C axis angular zero reference line segment on said support table, with said cutting element having said contact point located at said spatial point and the lateral surface of said cutting element at said contact point being tangent to the tangent line associated with said spatial point, and ii. X-axis position change data or C data representative of the ratio $\Delta X/\Delta \gamma$ of the required change in position of said support table, $\Delta X$, along said X axis to position said cutting element with a contact point located at said spatial point and with the lateral surface of said cutting element at said contact point being tangent to the tangent line associated with said spatial point, from the corresponding position of said support table associated with the immediately preceding spatial point in said sequence of spatial points, to the change in $\gamma$ data, $\Delta \gamma$, associated with said successive points in said sequence, and B. a second transformation means for transforming said axis control data and said sensor data machine tool drive data.

10. A contouring system according to claim 9 wherein said first transformation means includes means for:

A. selectively generating and storing $\gamma$ and C data for additional spatial points between selected pairs of said sequence of spatial points when the difference between the C data associated with a pair of said sequence of spatial points exceeds a predetermined threshold, and B. selectively inhibiting said storage of said axis control data for one of said sequence of spatial points when the difference between the $\gamma$ data associated with that spatial point and the $\gamma$ data associated with the immediately preceding spatial point in said succession is less than a predetermined threshold.

11. A contouring system according to claim 9 wherein said second transformation means comprises a computation means, said computation means including:

A. receiving means for periodically receiving said sensor data, said sensor data being representative of the displacement, $X_{PW}$, along the X axis and rotational displacement $\gamma_W$ about the C axis of the cutting element relative to said support table, the period of said receiving operation being performed during interrogation intervals having duration $\Delta t$, B. an identification means operative during each interrogation interval to identify the $\gamma$ data associated with one of said spatial points as current $\gamma$ data, $\gamma_N$, C. a subtraction means operative during each interrogation interval and following each identification operation performed by said identification to generate a $\Delta \gamma$ signal representative of the difference between $\gamma_W$ and the corresponding angular displacement $\gamma_H$ from the immediately preceding interval, according to the formula: $\Delta \gamma = \Delta_W - \Delta_H$, D. a best estimate of C signal generating means operative during each interrogation interval and following each subtraction operation performed by said subtraction means to generate an intermediate signal, $\gamma_1$, according to the formula:

$$\gamma_1 = \frac{\gamma_W - \gamma_H}{2} + \gamma_W,$$

E. a comparison and identification means operative during each interrogation interval to compare the signals $\gamma_1$ and $\gamma_N$, and when $\gamma_1$ is greater than $\gamma_N$, to direct said identification means to identify the $\gamma$ data associated with the next spatial point in said sequence as current data, $\gamma_N$, and to identify as current C data, the C data stored with the $\gamma$ data associated with $\gamma_N$, F. an estimated $\gamma$ signal generation means operative during each interrogation interval to generate an estimated $\gamma$ signal, $\gamma_E$, according to the formula:

$$\gamma_E = \gamma_W + \Delta \gamma,$$

G. a correction signal and X velocity data generation means operative during each interrogation interval to generate an X position correction data, $\Delta X_d$, representative of the product of the current C data and the difference between $\gamma_E$ and the corresponding value from the immediately preceding interval, according to the formula:

$$\Delta X_d = (\gamma_E - \gamma_{EH}).C,$$

said $\Delta X_d$ data being representative of said X axis velocity drive data,

H. a desired position signal generation means operative during each interrogation interval to generate an X desired position signal $X_d$ representative of the sum of the corresponding X desired position signal from the immediately preceding interval, $X_{dH}$, and $\Delta X_d$, according to the formula:
$X_d = X_{dH} + \Delta X_d,$ I. an X acceleration data generation means operative during each interrogation interval to generate X acceleration data representative of the difference between $\Delta X_d$ and the corresponding signal from the immediately preceding interval $\Delta X_{dH}$, said acceleration data being representative of said X axis acceleration drive data, J. an X position error data generation means operative during each interrogation interval to generate X position error data representative of the difference between $X_{PW}$ and $X_d$, said X position error data being representative of said X axis position error drive data.

12. A contouring system according to claim 8 wherein said positioning control means further comprises:

A. a P axis signal generating means for directing a cutting element dressing operation at predetermined times by generating said P axis position signals and applying said P axis position signals to said P axis servo positioning system, whereby said dressing means is translated along said P axis to dress said cutting element to a predetermined radial dimension, B. a first means associated with said P axis signal generating means for modifying said stored cutting element radius data during each of said cutting element dressing operations, whereby said stored cutting element radius data is representative of the current cutting element radius, C. a second means associated with said P axis signal generating means operative following each of said cutting element dressing operations to direct said drive signal generating means to generate said X axis position error, X axis velocity, X axis acceleration, C axis integrated velocity error and Z axis position error signals from said stored contour data, said stored pressure angle data, said stored modified cutting element radius data.

13. A contouring system according to claim 12 wherein said data transformation means comprises:

A. a first transformation means for transforming said stored input data to axis control data for each of said spatial points in said sequence, and storing said axis control data, said axis control data including:
  i. C axis position data or data representative of the relative angular displacement of a line segment connecting said Z axis with said C axis measured with respect to a C axis angular zero reference line segment on said support table with said cutting element having said contact point located at said spatial point and the lateral surface of said cutting element at said contact point being tangent to the tangent line associated with said spatial point, and
  ii. X-axis position change data or C data representative of the ratio $\Delta X/\Delta \gamma$ of the required change in position of said support table, $\Delta X$, along said X axis to position said cutting element with a contact point located at said spatial point and with the lateral surface of said cutting element at said contact point being tangent to the tangent line associated with said spatial point, from the corresponding position of said support table associated with the immediately preceding spatial point in said sequence of spatial points, to the change in $\gamma$ data, $\Delta \gamma$, associated with said successive points in said sequence, and
B. a second transformation means for transforming said axis control data and said sensor data to said machine tool drive data.

14. A contouring system according to claim 13 wherein said first transformation means is a programmed digital computer.

15. A contouring system according to claim 13 wherein said first transformation means includes means for:
A. selectively generating and storing $\gamma$ and C data for additional spatial points between selected pairs of said sequence of spatial points when the difference between the C data associated with a pair of said sequence of spatial points exceeds a predetermined threshold, and
B. selectively inhibiting said storage of said axis control data for one of said sequence of spatial points when the difference between the $\gamma$ data associated with that spatial point and the $\gamma$ data associated with the immediately preceding spatial point in said succession is less than a predetermined threshold.

16. A contouring system according to claim 13 wherein said first transformation means is operative to transform said stored input data to said axis control data during a first time period, said first time period being associated with each of said cutting element dressing operations and wherein said second transformation means is operative to transform said axis control data and said sensor data to said machine tool drive data during a second time period, said second time period following said first time period and ending prior to the commencement of the next of said cutting element dressing operations.

17. A contouring system according to claim 16 wherein said second transformation means comprises a computation means, said computation means including:
A. receiving means for periodically receiving said sensor data, said sensor data being representative of the displacement, $X_{PW}$, along the X axis and rotational displacement $\gamma_W$ about the C axis of the cutting element relative to said support table, the period of said receiving operation being performed during interrogation intervals having duration $\Delta t$,
B. an identification means operative during each interrogation interval to identify the $\gamma$ data associated with one of said spatial points as current $\gamma$ data, $\gamma_N$,
C. a subtraction means operative during each interrogation interval and following each identification operation performed by said identification to generate a $\Delta \gamma$ signal representative of the difference between $\gamma_W$ and the corresponding angular displacement $\gamma_H$ from the immediately preceding interval, according to the formula:

$$\Delta \gamma = \gamma_W - \gamma_H$$

D. a best estimate of C signal generating means operative during each interrogation interval and following each subtraction operation performed by said subtraction means to generate an intermediate signal, $\gamma_1$, according to the formula:

$$\gamma_1 = \frac{\gamma_W - \gamma_H}{2} + \gamma_W,$$

E. a comparison and identification means operative during each interrogation interval to compare the signals $\gamma_1$ and $\gamma_N$, and when $\gamma_1$ is greater than $\gamma_N$, to direct said identification means to identify the $\gamma$ data associated with the next spatial point in said sequence as current data, $\gamma_N$, and to identify as current C data, the C data stored with the $\gamma$ data associated with $\gamma_N$, F. an estimated $\gamma$ signal generation means operative during each interrogation interval to generate an estimated $\gamma$ signal, $\gamma_E$, according to the formula:

$$\gamma_E = \gamma_W + \Delta \gamma,$$

G. a correction signal and X velocity data generation means operative during each interrogation interval to generate an X position correction data, $\Delta X_d$, representative of the product of the current C data and the difference between $\gamma_E$ and the corresponding value from the immediately preceding interval, according to the formula:

$$\Delta X_d = (\gamma_E - \gamma_{EH}) \cdot C,$$

said $\Delta X_d$ data being representative of said X axis velocity drive data,

H. a desired position signal generation means operative during each interrogation interval to generate an X desired position signal $X_d$ representative of the sum of the corresponding X desired position signal from the immediately preceding interval, $X_{dH}$, and $\Delta X_d$, according to the formula:

$$X_d = X_{dH} + \Delta X_d,$$

I. an X acceleration data generation means operative during each interrogation interval to generate X acceleration data representative of the difference between $\Delta X_d$ and the corresponding signal from the immediately preceding interval $\Delta X_{dH}$, said acceleration data being representative of said X axis acceleration drive data, J. an X position error data generation means operative during each interrogation interval to generate X position error data representative of the difference between $X_{PW}$ and $X_d$, said X position error data being representative of said X axis position error drive data.

18. A contouring system according to claim 2 wherein said positioning control means further controls the relative position of said cutting element whereby the period of time between positioning said contact point at successive ones of said spatial points is directly proportional to the distance between said successive spatial points, with a predetermined constant of proportionality.

19. A contouring system according to claim 18 wherein said positioning control means further comprises means to store input data including:
A. contour data representative of the coordinates of each of said sequence of predetermined spatial points, said coordinates being measured with respect to a reference coordinate system on the top surface of said positioning table,
B. pressure angle data for each of said spatial points relating said predetermined angle associated with each of said tangent line segments to said coordinates of the associated spatial points,
C. wheel radius data representative of the radial dimension of said cutting element, and
D. surface velocity or $V_s$ data representative of said predetermined constant of proportionality relating said periods of time associated with the positioning of said contact point between successive ones of said spatial points to the distance between said successive spatial points.

20. A contouring system according to claim 19 wherein said positioning control means further comprises means to generate sensor data including:
actual position data representative of the relative position of said cutting element with respect to said reference coordinate system of said top surface.

21. A contouring system according to claim 20 wherein:
A. said contour data is in polar coordinate form providing R and $\theta$ coordinate values for each of said sequence at spatial points, each R value being a measure of a radial line segment extending from said C axis to its associated spatial point and each $\theta$ value being a measure of the angular displacement of said radial line segment from a C axis angular zero reference line segment, and
B. said pressure angle data providing a pressure angle or $\alpha$ value for each of said sequence of spatial points, said pressure angle value being a measure of the angle formed by a line segment perpendicular to said reference tangent line segment and passing through its associated spatial point, and said radial line segment extending from said C axis to its associated spatial point.

22. A contouring system according to claim 20 wherein:
A. said coordinate data is in differential polar coordinate form providing R and $\theta$ coordinate values for a first of said sequence of spatial points, said R value being a measure of a radial line segment extending from said C axis to its associated spatial point and said $\theta$ value being a measure of the angular displacement of said radial line segment from a C axis angular zero reference line segment, and providing $\Delta R$ and $\Delta\theta$ coordinate values for each of the remaining spatial points,
each $\Delta R$ value being a measure of the change in the radial distance from said C axis of the associated spatial point relative to the radial distance from said C axis to the preceding spatial point in said sequence and each $\Delta\theta$ value being a measure of the change in angular displacement of the radial line segment connecting the associated spatial point and said C axis relative to the corresponding angular displacement associated with the preceding spatial point in said sequence, and
B. said pressure angle data is in differential form providing an $\alpha$ value for the first of said sequence of spatial points and a $\Delta\alpha$ value for each of the others of said sequence of spatial points, each $\Delta\alpha$ value being a measure of the change in pressure angle associated with each spatial point and the corresponding value for the previous spatial point in said sequence of points, said pressure angle value being a measure of the angle formed by a line segment perpendicular to said reference tangent line segment and passing through its associated spatial point, and said radial line segment extending from said C axis to its associated spatial point.

23. A contouring system according to claim 20 wherein said positioning control means further comprises:
A. a data transformation means for transforming said input data and said sensor data to machine tool drive data, said drive data including:
i. X-axis position error, velocity and acceleration drive data representative of the required position change, velocity and acceleration of said workpiece support table along said X axis for said cutting element contact point to approach said spatial point,
ii. C-axis integrated velocity error drive data representative of the required change in angular velocity of said workpiece support table about said C axis for said cutting element contact point to approach said spatial point, and
iii. Z-axis position drive data representative of the required position change for said cutting element contact point to approach said spatial point along said axis,
B. a drive signal generating means for generating X axis position error, X axis velocity, X axis acceleration, C integrated velocity error, Z axis position error signals and P axis position signals from said machine tool drive data.

24. A contouring system according to claim 23 wherein said positioning control means further comprises:
A. an actuating means including:
i. an X axis servo positioning system for translating said support table along said X axis in response to said applied X axis position error, X axis velocity and X axis acceleration signals,
ii. a C axis servo positioning system for rotating said positioning table about said C axis in response to said C axis integrated velocity error signals,
iii. a Z axis servo positioning system for translating said cutting element along said Z axis in response to said Z axis error position signals, and
iv. a P axis servo positioning system for translating said dressing element along said P axis in response to said P axis position signals.

25. A contouring system according to claim 24 wherein said data transformation means comprises:
A. a first transformation means for transforming said stored input data to axis control data for each of said spatial points in said sequence, and storing said axis control data, said axis control data including:

i. C axis position data, or $\gamma$ data representative of the relative angular displacement of a line segment connecting said Z axis with said C axis measured with respect to a C axis angular zero reference line segment on said support table with said cutting element having said contact point located at said spatial point and the lateral surface of said cutting element at said contact point being tangent to the tangent line associated with said spatial point, ii. X-axis position change data or C data representative of the ratio of the required change in position of said support table, $\Delta X$, along said X axis to position said cutting element with a contact point located at said spatial point and with the lateral surface of said cutting element at said contact point being tangent to the tangent line associated with said spatial point, from the corresponding position of said support table associated with the immediately preceding spatial points, to the change in $\gamma$ data, $\Delta\gamma$, associated with said successive points in said sequence, iii. C axis angular velocity, V, representative of the required angular velocity of said positioning table about said C axis to approach said spatial point with the contact point having said predetermined surface velocity, and B. a second transformation means for transforming said axis control data and said sensor data to said machine tool drive data.

26. A contouring system according to claim 25 wherein said first transformation means includes means for:

A. selectively generating and storing $\gamma$, C and V data for additional spatial points between selected pairs of said sequence of spatial points when the difference between the C data associated with a pair of said sequence of spatial points exceeds a predetermined threshold, and B. selectively inhibiting said storage of said axis control data for one of said sequence of spatial points when the difference between the $\gamma$ data associated with that spatial point and the $\gamma$ data associated with the immediately preceding spatial point in said succession is less than a predetermined threshold.

27. A contouring system according to claim 25 wherein said second transformation means comprises a computation means, said computation means including:

A. receiving means for periodically receiving said sensor data, said sensor data being representative of the displacement, $X_{PW}$, along the X axis and rotational displacement $\gamma_W$ about the C axis of the cutting element relative to said support table, the period of said receiving operation being performed during interrogation intervals having duration $\Delta t$, B. an identification means operative during each interrogation interval to identify the $\gamma$ data associated with one of said spatial points as current $\gamma$ data, $\gamma_N$, C. a subtraction means operative during each interrogation interval and following each identification operation performed by said identification to generate a $\Delta\gamma$ signal representative of the difference between $\gamma_W$ and the corresponding angular displacement $\gamma_H$ from the immediately preceding interval, according to the formula:

$$\Delta\gamma = \gamma_W - \gamma_H$$

D. a best estimate of C signal generating means operative during each interrogation interval and following each subtraction operation performed by said subtraction means to generate an intermediate signal, $\gamma_1$, according to the formula:

$$\gamma_1 = \frac{\gamma_W - \gamma_H}{2} + \gamma_W,$$

E. a comparison and identification means operative during each interrogation interval to compare the signals $\gamma_1$ and $\gamma_N$, and when $\gamma_1$ is greater than $\gamma_N$, to direct said identification means to identify the $\gamma$ data associated with the next spatial point in said sequence as current data, $\gamma_N$, and to identify as current C and current V data the C and V data stored with the $\gamma$ data associated with $\gamma_N$, F. an estimated $\gamma$ signal generation means operative during each interrogation interval to generate an estimated $\gamma$ signal, $\gamma_E$, according to the formula:

$$\gamma_E = \gamma_W + \Delta\gamma,$$

G. a correction signal and X velocity data generation means operative during each interrogation interval to generate an X position correction data, $\Delta X_d$, representative of the product of the current C data and the difference between $\gamma_E$ and the corresponding value from the immediately preceding interval, according to the formula:

$$\Delta X_d = (\gamma_E - \gamma_{EH}).C,$$

said $\Delta X_d$ data being representative of said X axis velocity drive data,

H. a desired position signal generation means operative during each interrogation interval to generate an X desired position signal $X_d$ representative of the sum of the corresponding X desired position signal from the immediately preceding interval, $X_{dH}$, and $\Delta X_d$, according to the formula:

$$X_d = X_{dH} + \Delta X_d,$$

I. an X acceleration data generation means operative during each interrogation interval to generate X acceleration data representative of the difference between $\Delta X_d$ and the corresponding signal from the immediately preceding interval $\Delta X_{dH}$, said acceleration data being representative of said X axis acceleration drive data, J. an X position error data generation means operative during each interrogation interval to generate X position error data representative of the difference between $X_{PW}$ and $X_d$, said X position error data being representative of said X axis position error drive data, and K. a C axis integrated velocity error generation means operative during each interrogation interval for generating $V_C$ data representative of the difference between said current V data and the sum of $\Delta\gamma$ and the corresponding $V_C$ value from the immediately preceding interval, said $V_C$ data being representative of said C axis integrated velocity error data.

28. A contouring system according to claim 24 wherein said positioning control means further comprises:

A. a P axis signal generating means for directing a cutting element dressing operation at predetermined times by generating said P axis position signals and applying said P axis position signals to said P axis servo positioning system, whereby said dressing means is translated along said P axis to dress said cutting element to a predetermined radial dimension, B. a first means associated with said P axis signal generating means for modifying said stored cutting element radius data during each of said cutting element dressing operations, whereby said stored cutting element radius data is representative of the current cutting element radius, C. a second means associated with said P axis signal generating means operative following each of said cutting element dressing operations to direct said drive signal generating means to generate said X axis position error, X axis velocity, X axis acceleration, C axis integrated velocity error and Z axis position error signals from said stored contour data, said stored pressure angle data, and said stored modified cutting element radius data and said surface velocity data.

29. A contouring system according to claim 28 wherein said data transformation means comprises:

A. a first transformation means for transforming said stored input data to axis control data for each of said spatial points in said sequence, and storing said axis control data, said axis control data including:

i. C axis position data or $\gamma$ data representative of the relative angular displacement of a line segment connecting said Z axis with said C axis measured with respect to a C axis angular zero reference line segment on said support table with said cutting element having said contact point located at said spatial point and the lateral surface of said cutting element at said contact point being tangent to the tangent line associated with said spatial point, ii. X-axis position change data or C data representative of the ratio $\Delta X/\Delta\gamma$ of the required change in position of said support table, $\Delta X$, along said X axis to position said cutting element with a contact point located at said spatial point and with the lateral surface of said cutting element at said contact point being tangent to the tangent line associated with said spatial point, from the corresponding position of said support table associated with the immediately preceding spatial point in said sequence of spatial points, to the change in $\gamma$ data, $\Delta\gamma$, associated with said successive points in said sequence, iii. C axis angular velocity, V, representative of the required angular velocity of said positioning table about said C axis to approach said spatial point with the contact point having said predetermined surface velocity, and B. a second transformation means for transforming said axis control data and said sensor data to said machine tool drive data.

30. A contouring system according to claim 29 wherein said first transformation means is a programmed digital computer.

31. A contouring system according to claim 29 wherein said first transformation means includes means for:

A. selectively generating and storing $\gamma$, C and V data for additional spatial points between selected pairs of said sequence of spatial points when the difference between the C data associated with a pair of said sequence of spatial points exceeds a predetermined threshold, and B. selectively inhibiting said storage of said axis control data for one of said sequence of spatial points when the difference between the $\gamma$ data associated with that spatial point and the $\gamma$ data associated with the immediately preceding spatial point in said succession is less than a predetermined threshold.

32. A contouring system according to claim 29 wherein said first transformation means is operative to transform said stored input data to said axis control data during a first time period, said first time period being associated with each of said cutting element dressing operations, and wherein said second transformation means is operative to transform said axis control data and said sensor data to said machine tool drive data during a second time period, said second time period following said first time period and ending prior to the commencement of the next of said cutting element dressing operations.

33. A contouring system according to claim 32 wherein said second transformation means comprises a computation means, said computation means including:

A. receiving means for periodically receiving said sensor data, said sensor data being representative of the displacement, $X_{PW}$, along the X axis and rotational displacement $\gamma_W$ about the C axis of the cutting element relative to said support table, the period of said receiving operation being performed during interrogation intervals having duration $\Delta t$, B. an identification means operative during each interrogation interval to identify the $\gamma$ data associated with one of said spatial points as current $\gamma$ data, $\gamma_N$, C. a subtraction means operative during each interrogation interval and following each identification operation performed by said identification to generate a $\Delta\gamma$ signal representative of the difference between $\gamma_W$ and the corresponding angular displacement $\gamma_H$ from the immediately preceding interval, according to the formula:

$$\Delta\gamma = \gamma_W - \gamma_H$$

D. a best estimate of C signal generating means operative during each interrogation interval and following each subtraction operation performed by said subtraction means to generate an intermediate signal, $\gamma_1$, according to the formula:

$$\gamma_1 = \frac{\gamma_W - \gamma_H}{2} + \gamma_W,$$

E. a comparison and identification means operative during each interrogation interval to compare the signals $\gamma_1$ and $\gamma_N$, and when $\gamma_1$ is greater than $\gamma_N$, to direct said identification means to identify the $\gamma$ data associated with the next spatial point in said sequence as current data, $\gamma_N$, and to identify as current C and current V data the C and V data stored with the $\gamma$ data associated with $\gamma_N$, F. an estimated γ signal generation means operative during each interrogation interval to generate an estimated γ signal, $\gamma_E$, according to the formula:

$$\gamma_E = \gamma_W + \Delta\gamma,$$

G. a correction signal and X velocity data generation means operative during each interrogation interval to generate an X position correction data, $\Delta X_d$, representative of the product of the current C data and the difference between $\gamma_E$ and the corresponding value from the immediately preceding interval, according to the formula:

$$\Delta X_d = (\gamma_E - \gamma_{EH}) \cdot C,$$

said $\Delta X_d$ data being representative of said X axis velocity drive data,

H. a desired position signal generation means operative during each interrogation interval to generate an X desired position signal $X_d$ representative of the sum of the corresponding X desired position signal from the immediately preceding interval, $X_{dH}$, and $\Delta X_d$, according to the formula:

$$X_d = X_{dH} + \Delta X_d,$$

I. an X acceleration data generation means operative during each interrogation interval to generate X acceleration data representative of the difference between $\Delta X_d$ and the corresponding signal from the immediately preceding interval $\Delta X_{dH}$, said acceleration data being representative of said X axis acceleration drive data, J. an X position error data generation means operative during each interrogation interval to generate X position error data representative of the difference between $X_{PW}$ and $X_d$, said X position error data being representative of said X axis position error drive data, and K. a C axis velocity error generation means operative during each interrogation interval for generating $V_C$ data representative of the difference between said current V data and the sum of $\Delta\gamma$ and the corresponding $V_C$ value from the immediately preceding interval, said $V_C$ data being representative of said C axis integrated velocity error data.

34. In a contouring system including a machine tool, said machine tool having a cutting element with a lateral surface which is substantially symmetrical about a first or Z axis, and a workpiece support table having a top surface substantially disposed in a plane perpendicular to said Z axis, wherein said cutting element both rotates about and translates along said Z axis, and wherein said workpiece support table both rotates about a second or C axis, said C axis being parallel to said Z axis, and translates along a third or X axis, said X axis being perpendicular to said Z axis and having points of intersection with said C and Z axes, and further including a cutting element dressing means, wherein said dressing means translates along a fourth or P axis, said P axis being perpendicular to said Z axis and having a point of intersection with said Z axis, the improvement comprising:

a means for controlling said rotating and translating motions of said cutting element and said workpiece support table including:

A. a cutting element drive means for rotating said cutting element at a predetermined angular velocity about said Z axis, and B. a positioning control means for selectively controlling:

i. the relative position of said cutting element with respect to a sequence of predetermined spatial points, each of said spatial points bearing a predetermined spatial relationship to said top surface and each of said points having an associated reference tangent line segment passing therethrough with said tangent line segment disposed parallel to said top surface of said support table at a predetermined angle defined with respect to a reference line segment on said top surface so that said support table is synchronously translated along said X axis and rotated about said C axis and said cutting element is translated along said Z axis, said cutting element having a contact point on the periphery thereof successively located at one of a set of intermediate points wherein ach intermediate point is offset by a predetermined distance along said X axis from an associated one of said succession of spatial points, said predetermined offset distance being a decreasing function of time, and said cutting element further having its lateral surface at said contact point successively tangent to one of a set of offset line segments, each of said offset line segments being parallel to an associated reference tangent line segment and passing through one of said intermediate points, and ii. the position of said cutting element along the Z axis and the relative position of said dressing means with respect to said cutting element lateral surface, whereby said dressing means is selectively translated along the P axis to dress said lateral surface of said cutting element.

35. Method of generating a contour utilizing a computer controlled machine tool, said machine tool having a cutting element with a lateral surface which is substantially symmetrical about a first or Z axis, and a workpiece support table having a top surface substantially disposed in a plane perpendicular to said Z axis, wherein said cutting element both rotates about the translates along said Z axis, and wherein said workpiece support table both rotates about a second or C axis, said C axis being parallel to said Z axis, and translates along a third or X axis, said X axis being perpendicular to said Z axis and having points of intersection with said C and Z axes, said method comprising the steps of:

A. storing R-θ-Z-$V_s$-$W_r$-α input data representative of:

i. the coordinates of a predetermined sequence of spatial points on said contour, said coordinates being measured with respect to a reference coordinate system on said top surface, ii. a predetermined pressure angle associated with each of said spatial points, said pressure angle bearing a predetermined relation to said coordinate system, iii. the surface velocity at which a contact point on the periphery of said cutting element is to pass through each of said spatial points, iv. an initial radial dimension of said cutting element, B. periodically dressing said cutting element at predetermined dressing times whereby the radial dimension of said cutting element is reduced to a value differing by a predetermined increment from the corresponding value associated with the immediately preceding dressing time, C. periodically modifying said stored cutting element radial dimension data at said predetermined dressing times so that the modified radial dimension data is representative of the previously stored cutting element radial dimension data as reduced by said predetermined increment, D. transforming said stored data to $\gamma$-C-V axis control data for each of said spatial points during a first time period associated with each of said predetermined dressing times, E. periodically detecting and generating sensor data representative of the actual cutting element position relative to said support table during a second time period associated with each of said predetermined dressing times, each of said second time periods following the associated one of said first time periods and ending prior to the commencement of the next of said dressing steps, F. transforming said $\gamma$-C-V axis control data and said sensor data to $X_E$-$X_V$-$X_A$-$V_C$ machine tool drive data during each of said second time periods, and G. controlling said support table according to said machine tool drive data to synchronously translate along said X axis and rotate about said C axis, and controlling said cutting element to translate along said Z axis, said cutting element having a contact point on the periphery thereof successively located at each of said spatial points and said cutting element being disposed at each of said spatial points at the pressure angle associated with said point, and such that the period of time between positioning said contact point at successive ones of said spatial points is directly proportional to the distance between said successive spatial points, with a predetermined constant of proportionality.

36. A contouring system according to claim 1 wherein said positioning control means further comprises means to store input data including:

A. contour data representative of the coordinates of each of said sequence of predetermined spatial points, said coordinates being measured with respect to a reference coordinate system on the top surface of said support table, B. pressure angle data for each of said spatial points relating said predetermined angle associated with each of said tangent line segments to said coordinates of the associated spatial point, and C. wheel radius data representative of the radial dimension of said cutting element.

37. A contouring system according to claim 36 wherein said positioning control means further comprises means to generate sensor data including:
actual position data representative of the relative position of said cutting element with respect to said reference coordinate system of said top surface.

38. A contouring system according to claim 37 wherein

A. said contour data is in polar coordinate form providing R and $\theta$ coordinate for each of said sequence at spatial points, each R value being a measure of a radial line segment extending from said C axis to its associated spatial point and each $\theta$ value being a measure of the angular displacement of said radial line segment from a C axis angular zero reference line segment, and B. said pressure angle data providing a pressure angle or $\alpha$ value for each of said sequence of spatial points, said pressure angle value being a measure of the angle formed by a line segment perpendicular to said reference tangent line segment and passing through its associated spatial point, and said radial line segment extending from said C axis to its associated spatial point.

39. A contouring system according to claim 37 wherein:

A. said coordinate data is in differential polar coordinate form providing R and $\theta$ coordinate values for a first of said sequence of spatial points, said R value being a measure of a radial line segment extending from said C axis to its associated spatial point and said $\theta$ value being a measure of the angular displacement of said radial line segment from a C axis angular zero reference line segment, and providing $\Delta R$ and $\Delta \theta$ coordinate values for each of the remaining spatial points, each $\Delta R$ value being a measure of the change in the radial distance from said C axis of the associated spatial point relative to the radial distance from said C axis to the preceding spatial point in said sequence and each $\Delta \theta$ value being a measure of the change in angular displacement of the radial line segment connecting the associated dspatial point and said C axis relative to the corresponding angular displacement associated with the preceding spatial point in said sequence, and B. said pressure angle data is in differential form providing an $\alpha$ value for the first of said sequence of spatial points and a $\Delta \alpha$ value for each of the others of said sequence of spatial points, each $\Delta \alpha$ value being a measure of the change in pressure angle associated with each spatial point and the corresponding value for the previous spatial point in said sequence of points, said pressure angle value being a measure of the angle formed by a line segment perpendicular to said reference tangent line segment and passing through its associated spatial point, and said radial line segment extending from said C axis to its associated spatial point.

40. A contouring system according to claim 37 wherein said positioning control means further comprises:

A. a data transformation means for transforming said input data and said sensor data machine tool drive data, said drive data including:

i. X-axis position error, velocity and acceleration drive data representative of the required position change, velocity and acceleration of said workpiece support table along said X axis for said cutting element contact point to approach said spatial point, ii. C-axis integrated velocity error drive data representative of the required change in angular velocity of said workpiece support table about said C axis for said cutting element contact point to approach said spatial point, and iii. Z-axis position drive data representative of the required position change for said cutting element contact point to approach said spatial point along said Z axis, B. a drive signal generating means for generating X axis position error, X axis velocity, X axis acceleration, C axis integrated velocity error, and Z axis position error signals from said machine tool drive data.

41. A contouring system according to claim 40 wherein said positioning control means further comprises:
  A. an actuating means including:
    i. an X axis servo positioning system for translating said support table along said X axis in response to said X axis position error, X axis velocity and X axis acceleration signals,
    ii. a C axis servo positioning system for rotating said support table about said C axis in response to said C axis integrated velocity error signals,
    iii. a Z axis servo positioning system for translating said cutting element along said Z axis in response to said Z axis position error signals.

42. A contouring system according to claim 41 wherein said data transformation means comprises:
  A. a first transformation means for transforming said stored input data to axis control data for each of said spatial points in said sequence, and storing said axis control data, said axis control data including:
    i. C axis position data or $\gamma$ data representative of the relative angular displacement of a line segment connecting said Z axis with said C axis measured with respect to a C axis angular zero reference line segment on said support table, with said cutting element having said contact point located at said spatial point and the lateral surface of said cutting element at said contact point being tangent to the tangent line associated with said spatial point, and
    ii. X-axis position change data or C data representative of the ratio $\Delta X/\Delta \gamma$ of the required change in position of said support table, $\Delta X$, along said X axis to position said cutting element with a contact point located at said spatial point and with the lateral surface of said cutting element at said contact point being tangent to the tangent line associated with said spatial point, from the corresponding position of said support table associated with the immediately preceding spatial point in said sequence of spatial points, to the change in $\gamma$ data, $\Delta \gamma$, associated with said successive points in said sequence, and
  B. a second transformation means for transforming said axis control data and said sensor data machine tool drive data.

43. A contouring system according to claim 42 wherein said first transformation includes means for:
  A. selectively generating and storing $\gamma$ and C data for additional spatial points between selected pairs of said sequence of spatial points when the difference between the C data associated with a pair of said sequence of spatial points exceeds a predetermined threshold, and
  B. selectively inhibiting said storage of said axis control data for one of said sequence of spatial points when the difference between the $\gamma$ data associated with that spatial point and the $\gamma$ data associated with the immediately preceding spatial point in said succession is less than a predetermined threshold.

44. A contouring system according to claim 42 wherein said second transformation means comprises a computation means, said computation means including:
  A. receiving means for periodically receiving said sensor data, said sensor data being representative of the displacement, $X_{PW}$, along the X axis and rotational displacement $\gamma_W$ about the C axis of the cutting element relative to said support table, the period of said receiving operation being performed during interrogation intervals having duration $\Delta t$,
  B. an identification means operative during each interrogation interval to identify the $\gamma$ data associated with one of said spatial points as current $\gamma$ data, $\gamma_N$;
  C. a subtraction means operative during each interrogation interval and following each identification operation performed by said identification to generate a $\Delta \gamma$ signal representative of the difference between $\gamma_W$ and the corresponding angular displacement $\gamma_H$ from the immediately preceding interval, according to the formula: $\Delta \gamma = \gamma_W - \gamma_H$,
  D. a best estimate of C signal generating means operative during each interrogation interval and following each subtraction operation performed by said subtraction means to generate an intermediate signal, $\gamma_1$, according to the formula:

$$\gamma_1 = \frac{\gamma_W - \gamma_H}{2} + \gamma_W,$$

E. a comparison and identification means operative during each interrogation interval to compare the signals $\gamma_1$ and $\gamma_N$, when $\gamma_1$ is greater than $\gamma_N$, to direct said identification means to identify the $\gamma$ data associated with the next spatial point in said sequence as current data, $\gamma_N$, and to identify as current C data, the C data stored with the $\gamma$ data associated with $\gamma_N$,
  F. an estimated $\gamma$ signal generation means operative during each interrogation interval to generate an estimated $\gamma$ signal, $\gamma_E$, according to the formula:

$$\gamma_E = \gamma_W + \Delta \gamma,$$

G. a correction signal and X velocity data generation means operative during each interrogation interval to generate an X position correction data, $\Delta X_d$, representative of the product of the current C data and the difference between $\gamma_E$ and the corresponding value from the immediately preceding interval, according to the formula:

$$\Delta X_d = (\gamma_E - \gamma_{EH}) \cdot C,$$

said $\Delta X_d$ data being representative of said X axis velocity drive data,
  H. a desired position signal generation means operative during each interrogation interval to generate an X desired position signal $X_d$ representative of the sum of the corresponding X desired position signal from the immediately preceding interval, $X_{dH}$, and $\Delta X_d$, according to the formula:
  $X_d = X_{dH} + \Delta X_d,$
  I. an X acceleration data generation means operative during each interrogation interval to generate X acceleration data representative of the difference between $\Delta X_d$ and the corresponding signal from the immediately preceding interval $\Delta X_{dH}$, said acceleration data being representative of said X axis acceleration drive data,
  J. an X position error data generation means operative during each interrogation interval to generate X position error data representative of the difference between $X_{PW}$ and $X_d$, said X position error data being representative of said X axis position error drive data.

45. A contouring system according to claim 1 wherein said positioning control means further controls the relative position of said cutting element whereby the period of time between positioning said contact point at successive ones of said spatial points is directly proportional to the distance between said successive spatial points, with a predetermined constant of proportionality.

46. A contouring system according to claim 45 wherein said positioning control means further comprises means to store input data including:
  A. contour data representative of the coordinates of each of said sequence of predetermined spatial points, said coordinates being measured with respect to a reference coordinate system on the top surface of said positioning table,
  B. pressure angle data for each of said spatial points relating said predetermined angle associated with each of said tangent line segments to said coordinates of the associated spatial point,
  C. wheel radius data representative of the radial dimension of said cutting element, and
  D. surface velocity or $V_s$ data representative of said predetermined constant of proportionality relating said periods of time associated with the positioning of said contact point between successive ones of said spatial points to the distance between said successive spatial points.

47. A contouring system according to claim 46 wherein said positioning control means further comprises means to generate sensor data including:
  actual position data representative of the relative position of said cutting element with respect to said reference coordinate system of said top surface.

48. A contouring system according to claim 47 wherein:
  A. said contour data is in polar coordinate form providing R and $\theta$ coordinate values for each of said sequence at spatial points, each R value being a measure of a spatial line segment extending from said C axis to its associated spatial point and each $\theta$ value being a measure of the angular displacement of said radial line segment from a C axis angular zero reference line segment, and
  B. said pressure angle data providing a pressure angle or $\alpha$ value for each of said sequence of spatial points, said pressure angle value being a measure of the angle formed by a line segment perpendicular to said reference tangent line segment and passing through its associated spatial point, and said radial line segment extending from said C axis to its associated spatial point.

49. A contouring system according to claim 47 wherein:
  A. said coordinate data is in differential polar coordinate form providing R and $\theta$ coordinate values for a first of said sequence of spatial points, said R value being a measure of a radial line segment extending from said C axis to its associated spatial point and said $\theta$ value being a measure of the angular displacement of said radial line segment from a C axis angular zero reference line segment, and providing $\Delta R$ and $\Delta\theta$ coordinate values for each of the remaining spatial points,
  each $\Delta R$ value being a measure of the change in the radial distance from said C axis of the associated spatial point relative to the radial distance from said C axis to the preceding spatial point in said sequence and each $\Delta\theta$ value being a measure of the change in angular displacement of the radial line segment connecting the associated spatial point and said C axis relative to the corresponding angular displacement associated with the preceding spatial point in said sequence, and
  B. said pressure angle data is in differential form providing an $\alpha$ value for the first of said sequence of spatial points and a $\Delta\alpha$ value for each of the others of said sequence of spatial points, each $\Delta\alpha$ value being a measure of the change in pressure angle associated with each spatial point and the corresponding value for the previous spatial point in said sequence of points, said pressure angle value being a measure of the angle formed by a line segment perpendicular to said reference tangent line segment and passing through its associated spatial point, and said radial line segment extending from said C axis to its associated spatial point.

50. A contouring system according to claim 47 wherein said positioning control means further comprises:
  A. a data transformation means for transforming said input data and said sensor data to machine tool drive data, said drive data including:
    i. X-axis position error, velocity and acceleration drive data representative of the required position change, velocity and acceleration of said workpiece support table along said X axis for said cutting element contact point to approach said spatial point,
    ii. C-axis integrated velocity error drive data representative of the required change in angular velocity of said workpiece support table about said C axis for said cutting element contact point to approach said spatial point, and
    iii. Z-axis position drive data representative of the required position change for said cutting element contact point to approach said spatial point along said axis,
  B. a drive signal generating means for generating X axis position error, X axis velocity, X axis acceleration, C integrated velocity error, and Z axis position error signals from said machine tool drive data.

51. A contouring system according to claim 50 wherein said positioning control means further comprises:
  A. an actuating means including:
    i. an X axis servo positioning system for translating said support table along said X axis in response to said applied X axis position error, X axis velocity and X axis acceleration signals,
    ii. a C axis servo positioning system for rotating said positioning table about said C axis in response to said C axis integrated velocity error signals,
    iii. a Z axis servo positioning system for translating said cutting element along said Z axis in response to said Z axis error position signals.

52. A contouring system according to claim 51 wherein said data transformation means comprises:
  A. a first transformation means for transforming said stored input data to axis control data for each of said spatial points in said sequence, and storing said axis control data, said axis control data including:
    i. C axis position data, or $\gamma$ data representative of the relative angular displacement of a line segment connecting said Z axis with said C axis measured with respect to a C axis angular zero reference line segment on said support table with said cutting element having said contact point located at said spatial point and the lateral surface of said cutting element at said contact point being tangent to the tangent line associated with said spatial point, ii. X-axis position change data or C data representative of the ratio of the required change in position of said support table, $\Delta X$, along said X axis to position said cutting element with a contact point located at said spatial point and with the lateral surface of said cutting element at said contact point being tangent to the tangent line associated with said spatial point, from the corresponding position of said support table associated with the immediately preceding spatial points, to the change in $\gamma$ data, $\Delta\gamma$, associated with said successive points in said sequence, iii. C axis angular velocity, V, representative of the required angular velocity of said positioning table about said C axis to approach said spatial point with the contact point having said predetermined surface velocity, and B. a second transformation means for transforming said axis control data and said sensor data to said machine tool drive data.

53. A contouring system according to claim 52 wherein said first transformation includes means for:

A. selectively generating and storing $\gamma$, C and V data for additional spatial points between selected pairs of said sequence of spatial points when the difference between the C data associated with a pair of said sequence of spatial points exceeds a predetermined threshold, and B. selectively inhibiting said storage of said axis control data for one of said sequence of spatial points when the difference between the $\gamma$ data associated with that spatial point and the $\gamma$ data associated with the immediately preceding spatial point in said succession is less than a predetermined threshold.

54. A contouring system according to claim 52 wherein said second transformation means comprises a computation means, said computation means including:

A. receiving means for periodically receiving said sensor data, said sensor data being representative of the displacement, $X_{PW}$, along the X axis and rotational displacement $\gamma_W$ about the C axis of the cutting element relative to said support table, the period of said receiving operation being performed during interrogation intervals having duration $\Delta t$, B. an identification means operative during each interrogation interval to identify the $\gamma$ data associated with one of said spatial points as current $\gamma$ data, $\gamma_N$, C. a subtraction means operative during each interrogation interval and following each identification operation performed by said identification to generate a $\Delta\gamma$ signal representative of the difference between $\gamma_W$ and the corresponding angular displacement $\gamma_H$ from the immediately preceding interval, according to the formula:

$$\Delta\gamma = \gamma_W - \gamma_H$$

D. a best estimate of C signal generating means operative during each interrogation interval and following each subtraction operation performed by said subtraction means to generate an intermediate signal, $\gamma$ according to the formula:

$$\gamma_1 = \frac{\gamma_W - \gamma_H}{2} + \gamma_W,$$

E. a comparison and identification means operative during each interrogation interval to compare the signals $\gamma_1$ and $\gamma_N$, and when $\gamma_1$ is greater than $\gamma_N$, to direct said identification means to identify the $\gamma$ data associated with the next spatial point in said sequence as current data, $\gamma_N$, and to identify as current C and current V data the C and V data stored with the $\gamma$ data associated with $\gamma_N$, F. an estimated $\gamma$ signal generation means operative during each interrogation interval to generate an estimated $\gamma$ signal, $\gamma_E$, according to the formula:

$$\gamma_E = \gamma_W + \Delta\gamma,$$

G. a correction signal and X velocity data generation means operative during each interrogation interval to generate an X position correction data, $\Delta X_d$, representative of the product of the current C data and the difference between $\gamma_E$ and the corresponding value from the immediately preceding interval, according to the formula:

$$\Delta X_d = (\gamma_E - \gamma_{EH}) \cdot C,$$

said $\Delta X_d$ data being representative of said X axis velocity drive data,

H. a desired position signal generation means operative during each interrogation interval to generate an X desired position signal $X_d$ representative of the sum of the corresponding X desired position signal from the immediately preceding interval, $X_{dH}$, and $\Delta X_d$, according to the formula:

$$X_d = X_{dH} + \Delta X_d,$$

I. an X acceleratiion data generation means operative during each interrogation interval to generate X acceleration data representative of the difference between $\Delta X_d$ and the corresponding signal from the immediately preceding interval $\Delta X_{dH}$, said acceleration data being representative of said X axis acceleration drive data, J. an X position error data generation means operative during each interrogation interval to generate X position error data representative of the difference between $X_{PW}$ and $X_d$, said X position error data being representative of said X axis position error drive data, and K. a C axis integrated velocity error generation means operative during each interrogation interval for generating $V_C$ data representative of the difference between said current V data and the sum of $\Delta\gamma$ and the corresponding $V_C$ value from the immediately preceding interval, said $V_C$ data being representative of said C axis integrated velocity error data.

* * * * *

UNITED STATES PATENT AND TRADEMARK OFFICE
CERTIFICATE OF CORRECTION

PATENT NO. : 3,970,830
DATED : July 20, 1976
INVENTOR(S) : Philip H. White, Bernard W. Wilterdink and Guy J. Andrews It is certified that error appears in the above-identified patent and that said Letters Patent are hereby corrected as shown below:

Column 11, line 29: "$\Delta R - \Delta \theta - \Delta \gamma$" should read -- $\Delta R - \Delta \theta - \Delta \alpha$ --;

Column 11, line 31: "$\Delta R - \Delta \theta - \Delta \gamma$" should read -- $\Delta R - \Delta \theta - \Delta \alpha$ --;

Column 11, line 42: "specified velocity $V_s$." should read --specified surface velocity $V_s$.--;

Column 12, lines 12-14: "$\frac{\gamma W - \gamma H}{2} + \gamma W$" should read -- $\frac{\gamma_W - \gamma_H}{2} + \gamma_W$ --;

Column 17, line 53: "(X=1)" should read --(= -1)--;

Column 21, line 16: "DDP-11" should read --PDP-11--;

Column 26, line 38: "$\alpha n$" should read -- $\alpha_n$ --;

Column 26, line 40: "$\Delta$-C-V" should read -- $\gamma$-C-V --;

Column 27, line 7: The equation "$X_n = \sqrt{R_n^2 W_r^2 - 2R_n W_r \cos \alpha_n}$" should read -- $X_n = \sqrt{R_n^2 + W_r^2 - 2R_n W_r \cos \alpha_n}$ --;

UNITED STATES PATENT AND TRADEMARK OFFICE
CERTIFICATE OF CORRECTION

PATENT NO. : 3,970,830
DATED : July 20, 1976
INVENTOR(S) : Philip H. White, Bernard W. Wilterdink and Guy J. Andrews It is certified that error appears in the above-identified patent and that said Letters Patent are hereby corrected as shown below:

Column 28, line 41: Page 55, line 16 of the specification has been omitted from the patent. After "controlled by this routine." add the sentence --Register R3 contains a control value for use in this routine.--;

Column 29, line 23: "pule" should read --pulse--;

Column 42, line 9: "Ng" should read --N6--;

Column 51, line 54: "$\Delta\gamma = \Delta_W - \Delta_H$" should read --$\Delta\gamma = \gamma_W - \gamma_H$--;

Column 54, line 68: "$X_{PW}$ and $X_d$" should read --$X_{PW}$ and $X_d$--;

Column 61, line 38: "K. a C axis velocity error generation" should read --K. a C axis integrated velocity error generation--;

Column 62, line 19: "wherein ach intermediate" should read --wherein each intermediate--;

Column 63, line 62: "R and θ coordinate for each" should read --R and θ coordinate values for each--;

Column 64, line 27: "dspatial" should read --spatial--;

UNITED STATES PATENT AND TRADEMARK OFFICE
CERTIFICATE OF CORRECTION

PATENT NO. : 3,970,830
DATED : July 20, 1976
INVENTOR(S) : Philip H. White, Bernard W. Wilterdink and Guy J. Andrews It is certified that error appears in the above-identified patent and that said Letters Patent are hereby corrected as shown below:

Column 66, line 27: "$\gamma_N$, when $\gamma_1$" should read --$\gamma_N$, and when $\gamma_1$--;

Column 67, line 40: "measure of a spatial line" should read --measure of a radial line--;

Column 70, line 43: "acceleratiion" should read --acceleration--.

Signed and Sealed this

Seventeenth Day of October 1978

[SEAL]

Attest:

RUTH C. MASON
Attesting Officer

DONALD W. BANNER
Commissioner of Patents and Trademarks